(12) United States Patent
Aizaki

(10) Patent No.: US 12,205,308 B2
(45) Date of Patent: Jan. 21, 2025

(54) IMAGE PROCESSING APPARATUS, IMAGE PROCESSING METHOD, AND IMAGE PROCESSING SYSTEM FOR ESTIMATING AND CORRECTING COLOR DRIFT BETWEEN OUTPUT IMAGES

(71) Applicant: Ricoh Company, Ltd., Tokyo (JP)

(72) Inventor: Tomoyasu Aizaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 381 days.

(21) Appl. No.: 17/371,818

(22) Filed: Jul. 9, 2021

(65) Prior Publication Data

US 2022/0036570 A1   Feb. 3, 2022

(30) Foreign Application Priority Data

Jul. 31, 2020 (JP) ................................ 2020-131204

(51) Int. Cl.
*G06T 7/33* (2017.01)
*G06T 3/4015* (2024.01)
*G06T 5/50* (2006.01)

(52) U.S. Cl.
CPC ............ *G06T 7/337* (2017.01); *G06T 3/4015* (2013.01); *G06T 5/50* (2013.01)

(58) Field of Classification Search
CPC ......... G06T 7/337; G06T 3/4015; G06T 5/50; G06T 2207/30144; G06T 7/001;
(Continued)

(56) References Cited

U.S. PATENT DOCUMENTS 8,681,379 B2 * 3/2014 Nakamura ........... H04N 1/6055
358/1.9
9,030,710 B2 * 5/2015 Nakamura ........... H04N 1/6052
358/1.9
(Continued)

FOREIGN PATENT DOCUMENTS

CN   103871037 A   6/2014
CN   110971778 A   4/2020
(Continued)

OTHER PUBLICATIONS

Extended European Search Report issued Dec. 3, 2021 in European Patent Application No. 21186017.6, 10 pages.
(Continued)

*Primary Examiner* — Manav Seth
(74) *Attorney, Agent, or Firm* — XSENSUS LLP

(57) ABSTRACT

An image processing apparatus includes circuitry that estimates a first geometric transformation parameter aligning first output image data with the original image data, the first output image data being acquired by reading a first output result, and a second geometric transformation parameter aligning second output image data with the original image data, the second output image data being acquired by reading a second output result. The circuitry associates, based on the first and second geometric transformation parameters, combinations of color components of the first and second output image data, corresponding to pixels of the original image data, to generate pixel value association data, and determines, based on the pixel value association data, a mapping for estimating color drift between the first output image data and the second output image data from the original image data. The original image data is subjected to color conversion based on the mapping.

20 Claims, 35 Drawing Sheets

(58) Field of Classification Search
CPC ......... G06T 7/37; G06T 7/40; H04N 1/00774; H04N 1/387; H04N 1/00379; H04N 1/00681; H04N 1/00702; H04N 1/3872; H04N 1/3873; H04N 1/6005; H04N 1/6055; H04N 1/6052; H04N 1/6019; H04N 1/6025; H04N 1/60; H04N 1/6075; H04N 1/6027; H04N 1/603; H04N 1/0473; H04N 1/12; H04N 1/50; H04N 1/644; H04N 2201/0081; H04N 2201/0082; H04N 2201/0089; H04N 2201/02439; H04N 2201/047; H04N 2201/0471; H04N 2201/04712; H04N 2201/04722; H04N 2201/04731; H04N 2201/04732; H04N 2201/04756; H04N 2201/04794

See application file for complete search history.

(56) References Cited

U.S. PATENT DOCUMENTS

| | | | |
|---|---|---|---|
| 9,407,794 B2* | 8/2016 | Aizaki | H04N 1/603 |
| 2003/0206665 A1 | 11/2003 | Pettigrew | |
| 2006/0280360 A1* | 12/2006 | Holub | G01J 3/0264 |
| | | | 382/162 |
| 2013/0021628 A1* | 1/2013 | Nakamura | H04N 1/6052 |
| | | | 358/1.9 |
| 2013/0027759 A1 | 1/2013 | Nakamura | |
| 2013/0135635 A1 | 5/2013 | Nakamura | |
| 2013/0272606 A1* | 10/2013 | Nakamura | H04N 1/6055 |
| | | | 382/167 |
| 2013/0342557 A1* | 12/2013 | Finlayson | H04N 9/64 |
| | | | 358/1.9 |
| 2014/0161347 A1 | 6/2014 | Stauder et al. | |
| 2015/0130829 A1* | 5/2015 | Aizaki | H04N 1/50 |
| | | | 345/591 |
| 2019/0297226 A1 | 9/2019 | Ohkubo et al. | |
| 2020/0028991 A1* | 1/2020 | Thebault | H04N 1/6058 |
| 2020/0106926 A1 | 4/2020 | Iwaki | |

FOREIGN PATENT DOCUMENTS

| | | | | |
|---|---|---|---|---|
| EP | 2871829 A1 * | 5/2015 | | H04N 1/387 |
| EP | 3557857 A1 * | 10/2019 | | H04N 1/6033 |
| JP | 11-306334 | 11/1999 | | |
| JP | 2013-030996 | 2/2013 | | |
| JP | 2015-111801 | 6/2015 | | |
| JP | 2016-015647 A | 1/2016 | | |
| JP | 2016-201620 A | 12/2016 | | |
| JP | 2017-208715 A | 11/2017 | | |
| JP | 2018-098630 A | 6/2018 | | |
| JP | 6428454 B2 | 11/2018 | | |

OTHER PUBLICATIONS

Chinese Office Action issued Nov. 24, 2023, in corresponding Chinese Patent Application No. 202110871083.1.

Office Action issued Mar. 5, 2024 in Japanese Patent Application No. 2020-131204, 10 pages.

* cited by examiner

IMAGE PROCESSING APPARATUS, IMAGE PROCESSING METHOD, AND IMAGE PROCESSING SYSTEM FOR ESTIMATING AND CORRECTING COLOR DRIFT BETWEEN OUTPUT IMAGES

CROSS-REFERENCE TO RELATED APPLICATIONS

This patent application is based on and claims priority pursuant to 35 U.S.C. § 119(a) to Japanese Patent Application No. 2020-131204, filed on Jul. 31, 2020, in the Japan Patent Office, the entire disclosure of which is hereby incorporated by reference herein.

BACKGROUND

Technical Field

The present disclosure relates to an image processing apparatus, an image processing method, and an image processing system.

Related Art

In a known method for performing color matching between output images in an image outputting apparatus, such as a printing apparatus and a displaying apparatus, color characteristics of the image outputting apparatus are updated based on the result of colorimetry on a color chart output from the image outputting apparatus.

In addition, it has been disclosed that, in order to perform color matching between output images without using any color charts, output images are subjected to color conversion based on the result of determination of two mappings indicating color characteristics of two image outputting apparatuses, respectively.

However, with the background technology, color matching between output images may not be carried out with high accuracy.

SUMMARY

An image processing apparatus according to an aspect of the present invention reproduces a color of a first output result of original image data by a first image outputting apparatus in a second output result of the original image data by a second image outputting apparatus. The image processing apparatus includes circuitry that estimates a first geometric transformation parameter for aligning first output image data, acquired by reading the first output result with a reading apparatus, with the original image data, and a second geometric transformation parameter for aligning second output image data, acquired by reading the second output result with the reading apparatus, with the original image data. The circuitry associates, based on the first geometric transformation parameter and the second geometric transformation parameter, combinations of color components of the first output image data and the second output image data, which combinations correspond to pixels of the original image data, so as to generate pixel value association data. The circuitry determines, based on the pixel value association data, a mapping for estimating color drift between the first output image data and the second output image data from the original image data. The circuitry subjects the original image data to color conversion based on the mapping.

According to another aspect, an image processing system includes a first image outputting apparatus that outputs a first output result from original image data, a second image outputting apparatus that outputs a second output result from the original image data, a reading apparatus that reads the first output result and the second output result, and the above-described image processing apparatus.

According to another aspect, an image processing method performed by the above-described image processing apparatus, and a non-transitory recording medium storing a program for causing a computer system to carryout the image processing method are provided.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
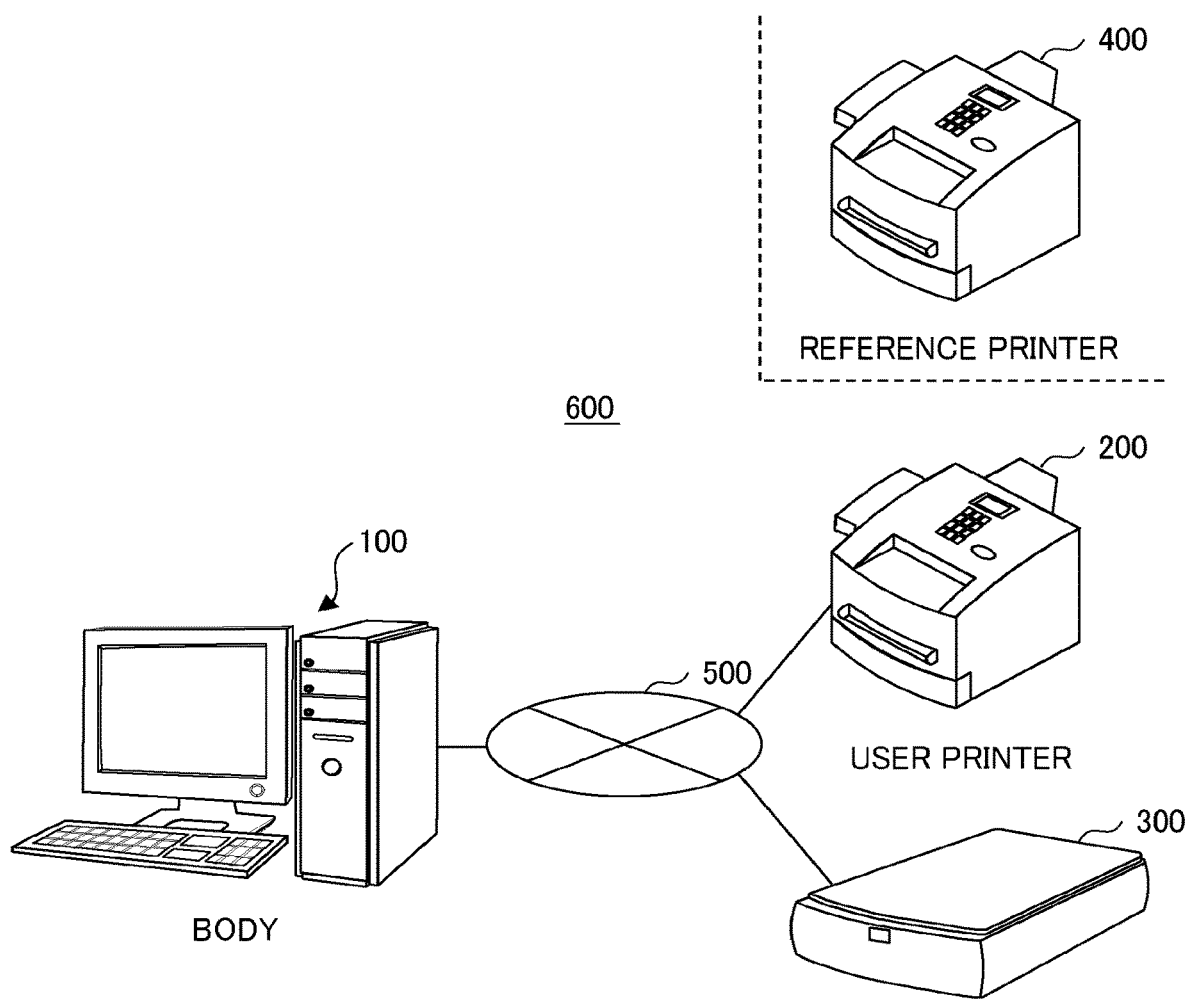
FIG. 1 is a diagram illustrating an example of a general configuration of an image processing system according to a first embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

In the following, description is made on embodiments for implementing the present invention, with reference to the accompanying drawings. In different drawings, the same components are the same in reference sign, and a redundant description is omitted as appropriate. The embodiments to be described below exemplify an image processing apparatus for embodying the technical idea of the present invention, and the present invention is in no way limited to such embodiments.

In the embodiments, color conversion is performed on original image data in order to match colors between a first image outputting apparatus and a second image outputting apparatus. During the color conversion, a single mapping is determined for estimating the color drift between first output image data from the first image outputting apparatus and the original image data and the color drift between second output image data from the second image outputting apparatus and the original image data and, based on the mapping, color conversion is performed on the original image data. Performing color conversion without using a plurality of mappings suppresses color drift estimation errors, leading to the color matching with high accuracy.

First Embodiment

In the present embodiment, the flow of the color conversion to be performed on the original image data in order to match colors between the first image outputting apparatus and the second image outputting apparatus is described based on a combination of the apparatuses below as an example.

The first image outputting apparatus: a printer (referred to as "reference printer").

The second image outputting apparatus: a printer (referred to as "user printer").

An image reading apparatus: a scanner.

The terms to be hereinafter used are defined as follows.

Reference printer: a printer corresponding to an example of the first image outputting apparatus and deemed to be an object of color matching.

User printer: a printer corresponding to an example of the second image outputting apparatus, of which printer the color matching with the reference printer is wanted.

Scanner: an exemplary reading apparatus.

Original image data: image data used by a printer during the output of a printed product.

Reference printed product: a printed product provided by the output of the original image data by the reference printer and deemed to be an object of color matching.

Reference read image data: image data corresponding to an example of the first output image data and acquired by the reading of the reference printed product by an image reading apparatus.

User printed product: a printed product provided by the output of the original image data by the user printer, of which printed product the color matching with the reference printed product is wanted.

User read image data: image data corresponding to an example of the second output image data and acquired by the reading of the user printed product by an image reading apparatus.

In the embodiments, a reference printed product and a user printed product are used to perform color conversion on original image data given to a user printer, so as to attain a user printed product with colors equal to the colors of the reference printed product.

As an apparatus that performs color conversion, the second image outputting apparatus, the scanner or a computer not integrated with the second image outputting apparatus or the scanner may be used. In the present embodiment, description is made assuming that a computer performs color conversion. The computer corresponds to an example of an information processing apparatus and an example of an image processing apparatus.

<Example of General Configuration of Image Processing System 600>

FIG. 1 is a diagram illustrating an example of a general configuration of an image processing system 600 according to the present embodiment.

As illustrated in FIG. 1, the image processing system 600 includes a computer 100, a user printer 200, and a scanner 300 connected to one another over a network 500. The user printer 200 may be replaced by an offset press or a photogravure press, and the scanner 300 may be replaced by a spectral colorimeter or a camera.

A reference printer 400 does not exist on the user's side of the image processing system 600 and, accordingly, is not on the network 500, while the reference printer 400 may be on the network 500. The user of the image processing system 600 has already got a reference printed product provided by the output of reference read image data by the reference printer 400 or is capable of getting a reference printed product.

The network 500 is exemplified by an in-house local area network (LAN), a wide area LAN (WAN), an internet protocol-virtual private network (IP-VPN), and the Internet. A combination of such networks, for instance, is also usable as long as the computer 100, the user printer 200, and the scanner 300 are able to communicate with one another. A telephone line may be included in part of the network 500, and it does not matter whether connection is made in a wired or wireless manner.

The reference printer 400 and the user printer 200 do not need to be different apparatuses, that is to say, color matching may be performed between the past color and the current color on one and the same printer. In addition, the reference printer 400 and the user printer 200 may each have one or more of a scanning function, a faxing function, and a copying function as long as the reference printer 400 and the user printer 200 each have a printing function. Similarly, the scanner 300 may have one or more of a printing function, a faxing function, and a copying function as long as the scanner 300 has a scanning function. An apparatus having two or more of such functions is occasionally referred to as a multifunction peripheral (MFP).

The computer 100 determines a mapping for estimating the color drift between reference read image data and user read image data from three kinds of image data, namely, original image data used by the reference printer 400 during the output of a reference printed product, the reference read image data provided by the reading of the reference printed product by the scanner 300, and the user read image data provided by the reading of a user printed product by the scanner 300, with the user printed product being provided by the output of the original image data by the user printer 200. The original image data may be stored in advance in the user printer 200 or acquired from the reference printer 400. The computer 100, the user printer 200, and the scanner 300 may be installed in a single MFP.

<Hardware Configuration>

Figure 2:
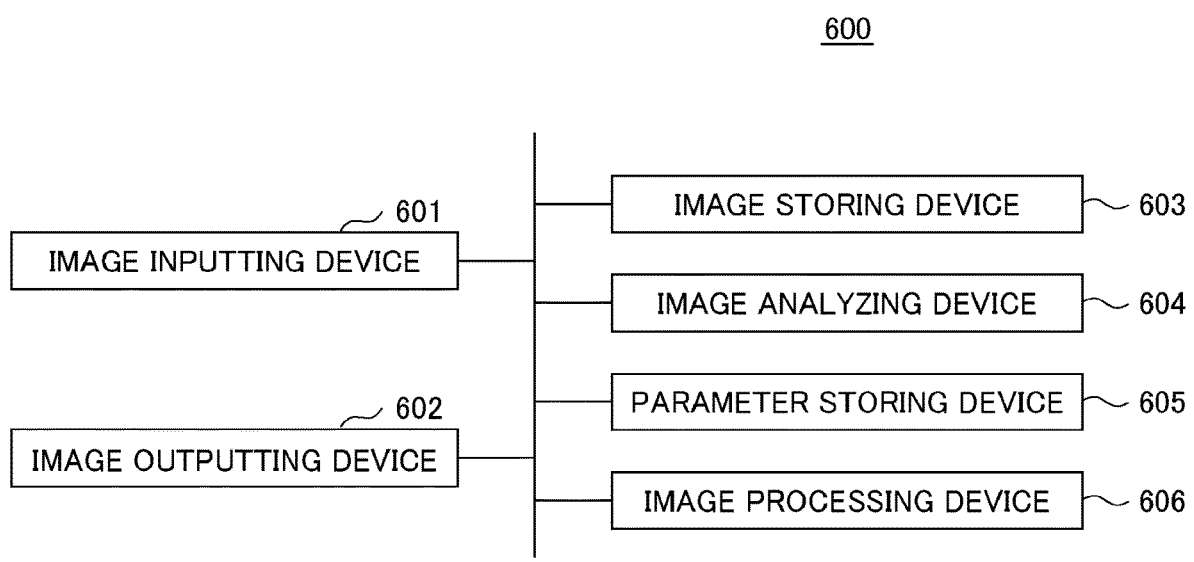
FIG. 2 is a diagram illustrating an example of a hardware configuration of the image processing system according to the first embodiment.

FIG. 2 is a block diagram illustrating an example of a hardware configuration of the image processing system 600. The image processing system 600 includes an image inputting device 601, an image outputting device 602, an image storing device 603, an image analyzing device 604, a parameter storing device 605, and an image processing device 606.

The image inputting device 601 inputs an image output by an image outputting apparatus, and the scanner 300 in FIG. 1 corresponds to the image inputting device 601. The image storing device 603 stores the image data, whose input is accepted by the image inputting device 601, and the computer 100 in FIG. 1 corresponds to the image storing device 603. The image analyzing device 604 analyzes the reference read image data, the user read image data, and the original image data so as to determine a mapping for estimating the color drift between the reference read image data and the user read image data. The computer 100 in FIG. 1 corresponds to the image analyzing device 604. The parameter storing device 605 stores the mapping for estimating the color drift between the reference read image data and the user read image data, which mapping is obtained by image analysis. The computer 100 in FIG. 1 corresponds to the parameter storing device 605. The image processing device 606 subjects the original image data to color conversion based on the obtained mapping for estimating the color drift between the reference read image data and the user read image data. The user printer 200 in FIG. 1 corresponds to the image processing device 606. The image outputting device 602 outputs an image after color conversion, and the user printer 200 in FIG. 1 corresponds to the image outputting device 602.

Figure 3:
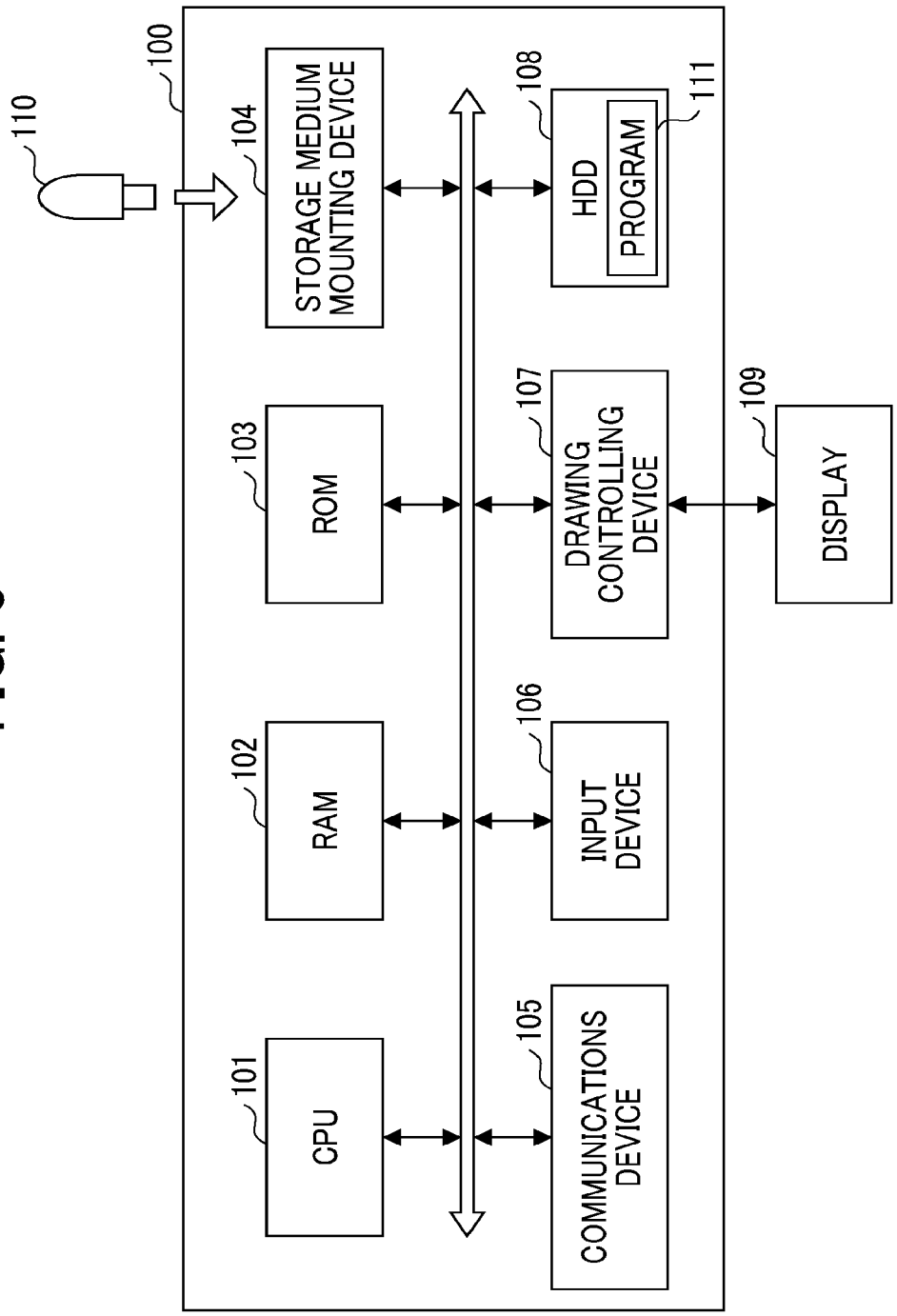
FIG. 3 is a diagram illustrating an example of a hardware configuration of a computer according to an embodiment.

FIG. 3 is a block diagram illustrating an example of a hardware configuration of the computer 100. The computer 100 includes a central processing unit (CPU) 101, a random access memory (RAM) 102, a read only memory (ROM) 103, a storage medium mounting device 104, a communications device 105, an input device 106, a drawing controlling device 107, and a hard disk (HDD) 108 that are connected to one another through buses. The CPU 101 reads an operating system (OS) and a program from the HDD 108 and executes the OS and the program so as to provide various functions, and determines a mapping for estimating the color drift between reference read image data and user read image data.

The RAM 102 serves as a working memory (main storage memory) that temporarily stores data required when the CPU 101 executes a program. Programs for booting a basic input output system (BIOS) and the OS and static data are stored in the ROM 103.

A storage medium 110 is mountable to and dismountable from the storage medium mounting device 104. The storage medium mounting device 104 reads data recorded in the storage medium 110 and stores the data in the HDD 108. The storage medium mounting device 104 is also capable of writing data stored in the HDD 108 into the storage medium 110. The storage medium 110 includes a universal serial bus (USB) memory and a secure digital (SD) card. A program 111 is distributed in a state of being stored in the storage medium 110 or by the download from a server not illustrated.

The input device 106 includes a keyboard, a mouse, and a trackball, and accepts various operation instructions to the computer 100 from a user.

The HDD 108 may be a non-volatile memory such as a solid state disk (SSD). The OS, programs, and various kinds of data including image data are stored in the HDD 108.

The communications device 105 includes a network interface card (NIC) for the connection to a network such as the Internet, and is an Ethernet (registered trademark) card, for instance.

The drawing controlling device 107 interprets a drawing command written in a graphic memory by the CPU 101, which executes the program 111, so as to generate a screen and draw the screen on a display 109.

<Example of Functional Configuration of Image Processing System 600>

Figure 4:
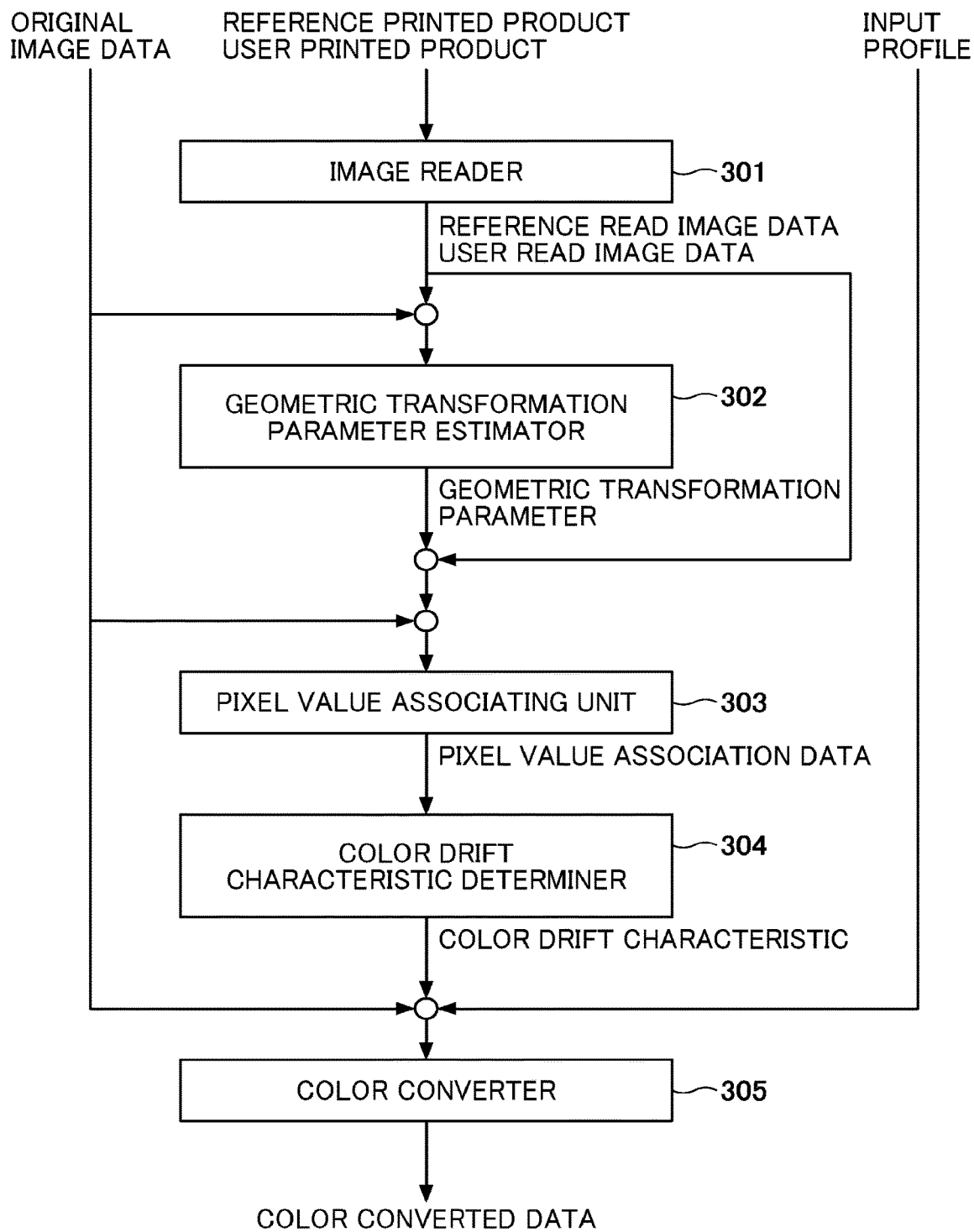
FIG. 4 is a block diagram illustrating an example of a functional configuration of the image processing system according to the first embodiment.

FIG. 4 is a block diagram illustrating an example of a functional configuration of the image processing system 600. The functions illustrated in FIG. 4 may be implemented by a MFP. The same applies to image processing systems according to other embodiments described later.

The image processing system 600 includes an image reader 301, a geometric transformation parameter estimator 302, a pixel value associating unit 303, a color drift characteristic determiner 304, and a color converter 305.

The image reader 301 reads a reference printed product and a user printed product, each as an output result of original image data, so as to acquire reference read image data and user read image data. The image reader 301 is an example of a color space conversion unit that uses a color profile of the scanner 300 to convert each of the reference read image data and the user read image data into a device-independent color space.

The geometric transformation parameter estimator 302 estimates a geometric transformation parameter for the original image data and the reference read image data and a geometric transformation parameter for the original image data and the user read image data. The geometric transformation parameter for the original image data and the reference read image data corresponds to a first geometric transformation parameter, and the geometric transformation parameter for the original image data and the user read image data corresponds to a second geometric transformation parameter.

Exemplary geometric transformation parameters include the displacement magnitude, the rotation angle, and the variable scale factor. To the estimation of such parameters, a known technology, such as a method using a marker as well as a feature point matching method and a phase-only method both using no markers, may be applied.

The method using a marker refers to the method, in which original image data is output with a marker called "register mark" being arranged in each of four corners or at the middle of each side of the original image data, and the displacement of the marker is used to find the displacement magnitude, the rotation angle or the variable scale factor when reference read image data has been read.

The feature point matching method refers to a method for extracting a feature point of the scale-invariant feature transform (SIFT), the speeded up robust features (SURF), the KAZE (meaning "wind" in Japanese) or the like from two images. The feature point to be extracted is not limited to the feature point as above but may be any feature point extractable from an image. The extracted feature points are associated with each other, and the difference in position between associated points is used to find the displacement magnitude, the rotation angle or the variable scale factor.

A phase-only correlation method refers to the method, in which a phase image obtained by performing the discrete Fourier transform on an image is used, and a position where the correlation between two phase images obtained from two images to be compared with each other is highest is detected so as to find the displacement magnitude. A rotation-invariant phase-only correlation method refers to the method, in which the phase image as above is subjected to logarithmic polar conversion so as to make it possible to detect the rotation angle and the variable scale factor as a displacement magnitude on the converted phase image.

After acquiring the geometric transformation parameters, the geometric transformation parameter estimator 302 subjects the reference read image data to geometric transformation. If, during the geometric transformation, pixels are not associated one-to-one before and after the geometric transformation due to the movement or some rotation with subpixel accuracy or the change in scale by an actual value, a pixel interpolation method is appropriately used to calculate pixel values. The pixel interpolation method is exemplified by a bilinear method and a bicubic method.

The pixel value associating unit 303 uses a geometric transformation parameter to detect a pixel of the reference read image data in a position corresponding to a pixel of the original image data and associates pixel values of such pixels for each combination of color components so as to create pixel value association data. Similarly, the pixel value associating unit 303 uses a geometric transformation parameter to detect a pixel of the user read image data in a position corresponding to a pixel of the original image data and associates pixel values of such pixels for each combination of color components so as to create pixel value association data.

The color drift characteristic determiner 304 is an example of a mapping determiner that uses pixel value association data to determine a color drift characteristic (mapping) for estimating the color drift between the reference read image data and the user read image data.

The color converter 305 uses the color drift characteristic between the reference read image data and the user read image data to subject the original image data to color conversion.

<Example of Processing by Image Processing System 600>

Figure 5:
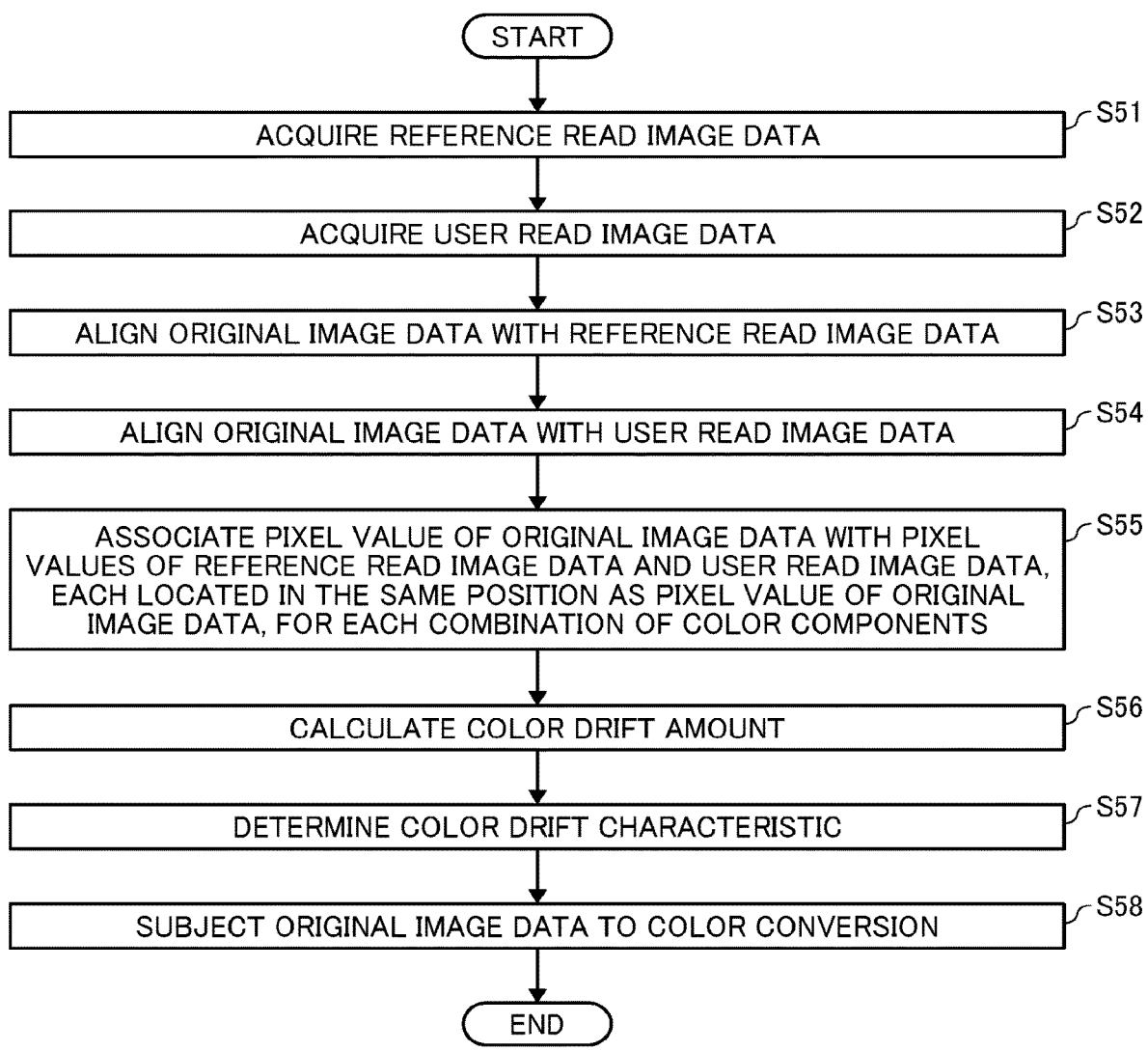
FIG. 5 is a flowchart of an example of processing performed by the image processing system according to the first embodiment.

FIG. 5 is a flowchart illustrating an example of processing performed by the image processing system 600.

Initially in step S51, the image reader 301 reads a reference printed product that has been printed by the reference printer 400 based on original image data, and acquires reference read image data. The reference read image data is converted into a device-independent color space by using the color profile of the scanner 300.

Then in step S52, the image reader 301 reads a user printed product that has been printed by the user printer 200 based on the original image data, and acquires user read image data. The user read image data is converted into a device-independent color space by using the color profile of the scanner 300.

Exemplary device-independent color spaces include an RGB color space, an XYZ color space, and a L*a*b* color space, all of a device-independent type. In the present embodiment, a scanner is used for the image reader 301, so that the reference read image data and the user read image data are each converted into a device-independent color space by using a color profile. Such conversion is unnecessary if a spectral colorimeter or the like is used instead of the scanner 300 and, accordingly, image data in a device-independent color space is directly acquirable. The processes in step S51 and in step S52 can change the order with each other.

In step S53, the geometric transformation parameter estimator 302 aligns the original image data with the reference read image data. Prior to the alignment of the two kinds of image data, the geometric transformation parameter estimator 302 acquires a geometric transformation parameter for the reference read image data in the case of the original image data being assumed as a basis.

Geometric transformation is not indispensable but may be replaced by using a geometric transformation parameter to perform coordinate transformation so as to determine whether positions are the same when acquiring pixels in the same positions in the original image data and the reference read image data in the next step. In that case, pixels having different coordinate values in a coordinate system based on the origin of each image but having the same coordinate values as a result of geometric transformation are to be considered as "pixels in the same positions".

A printed product based on the original image data may have a margin around an image. In that case, the height and the width of a marginal portion are included in the displacement magnitude of geometric transformation and, accordingly, the marginal portion is not referred to, while it is possible to cut out a necessary region in the reference read image data so that the marginal portion may be removed, so as to align the origins of images.

Then in step S54, the geometric transformation parameter estimator 302 aligns the original image data with the user read image data. Such alignment is similar to the alignment described in step S53, so that description is omitted.

In step S55, the pixel value associating unit 303 acquires pixel values of pixels corresponding to one another in the three kinds of image data, namely, the original image data, the reference read image data, and the user read image data after the completion of the alignment of the original image data with the reference read image data and the completion of the alignment of the original image data with the user read image data, and associates the pixel values for each combination of color components so as to generate pixel value association data.

If image data is subjected to geometric transformation and then alignment, "pixels corresponding to one another" are "pixels in the same positions". If image data is not subjected to geometric transformation, positions made to have the same coordinate values by coordinate transformation are assumed as "the same positions", and pixels in such positions are considered as "pixels corresponding to one another".

The method for associating pixel values for each combination of color components so as to generate pixel value association data is exemplified by a method for generating in the form of a list. In the present embodiment, description is made assuming that the original image data is CMYK image data, and the reference read image data and the user read image data are each device-independent L*a*b* image data.

The CMYK image data refers to image data expressed in cyan (C), magenta (M), yellow (Y), and black (K) colors.

Here is described a method for recording in the form of a list. Generation of pixel values by the formation of a list is performed following steps (1) through (4) below: (1) preparing a list form; (2) selecting certain coordinates in the original image data; (3) collectively adding, to the list form, the C component value (Cin), the M component value (Min), the Y component value (Yin), and the K component value (Kin) of a pixel of the original image data that is selected in the step (2), the L* component value (L*out1), the a* component value (a*out1), and the b* component value (b*out1) of a corresponding pixel of the reference read image data, and the L* component value (L*out2), the a* component value (a*out2), and the b* component value (b*out2) of a corresponding pixel of the user read image data; and (4) repeating the steps (1) through (3) for all the coordinates in the original image data. The resultant lists may be rearranged in ascending or descending order as required. For the facilitation of processing, the above steps may not be repeated for all the coordinates in the original image data. The steps may be performed limitedly for coordinates in a particular range or while selecting coordinates at specified intervals. An example of data generated in the form of a list is set forth in Table 1 below.

TABLE 1

| $C_{in}$ | $M_{in}$ | $Y_{in}$ | $K_{in}$ | $L^*_{out1}$ | $a^*_{out1}$ | $b^*_{out1}$ | $L^*_{out2}$ | $a^*_{out2}$ | $b^*_{out2}$ |
|---|---|---|---|---|---|---|---|---|---|
| 10 | 0 | 0 | 0 | 93 | −12 | −1 | 88 | −14 | 1 |
| 20 | 0 | 0 | 0 | 92 | −21 | −4 | 87 | −24 | −2 |
| 30 | 0 | 0 | 0 | 91 | −24 | −6 | 85 | −27 | −5 |
| 40 | 0 | 0 | 0 | 90 | −30 | −6 | 84 | −34 | −4 |
| . | . | . | . | . | . | . | . | . | . |
| . | . | . | . | . | . | . | . | . | . |
| . | . | . | . | . | . | . | . | . | . |
| 0 | 0 | 0 | 60 | 53 | 1 | −1 | 48 | −2 | 1 |
| 0 | 0 | 0 | 70 | 42 | 0 | 0 | 38 | −2 | 1 |
| 0 | 0 | 0 | 80 | 31 | 1 | −1 | 26 | −2 | 2 |
| 0 | 0 | 0 | 90 | 19 | 0 | 0 | 14 | −3 | 2 |
| 0 | 0 | 0 | 100 | 9 | 0 | 0 | 5 | −3 | 2 |

The next description is made on exemplary improvement I in accuracy in color drift characteristic determination.

During the generation of pixel value association data, it is desirable to exclude a contour portion of contents in image data. The reason is that contour portions are hard to completely align during the alignment, which may cause an error in the association of pixel values. Errors in pixel value association may decrease the accuracy in color drift characteristic determination.

Examples of the method for detecting a contour portion include a method using binarization and a method using edge detection. In an exemplary method using binarization, image data is binarized in black and white with a specified threshold, and a place where a white region and a black region are adjacent to each other is determined to be a contour portion. In an exemplary method using edge detection, a Sobel method or the like is used to generate an edge image from image data, and the edge image is binarized with a specified threshold so as to determine a pixel of a value equal to or larger than the threshold to be a contour portion.

There is also a method for suppressing the decrease in accuracy in color drift characteristic determination without removing a contour portion. In an exemplary method, image data is subjected to smoothing so as to make a contour portion smooth and reduce the color difference occurring in the contour portion. To the smoothing, a known technology, such as an averaging filter and a low pass filter, is applicable.

The next description is made on exemplary improvement II in accuracy in color drift characteristic determination.

During the generation of pixel value association data, it is also desirable to perform data cleansing. The data cleansing refers to revealing errors and duplications in pixel value association data and removing heterogeneous data so as to put the pixel value association data in order. The data cleansing improves the data quality.

The term "error in data" herein used means data with an error having occurred in pixel value association. If data with an error having occurred in pixel value association is included, the accuracy in color drift characteristic determination may be decreased.

The method for detecting an "error in data" from pixel value association data is exemplified by a method using the color difference between the reference read image data and the user read image data, which correspond to the same pixel of the original image data. Other exemplary methods include a method using the hue difference and a method using the absolute value of the difference in each color component.

The method using the color difference is described. The color difference refers to the distance between two colors in a L*a*b* color space or a L*u*v* color space. In the present embodiment, a L*a*b* color space is used for the description because a printer is used as an image outputting apparatus.

The color difference $\Delta E^*ab$ in a L*a*b* color space is defined by formula (1) below.

$$\Delta E^*_{ab} = \sqrt{(\Delta L^*)^2 + (\Delta a^*)^2 + (\Delta b^*)^2} \quad (1)$$

In the formula, $\Delta L^*$, $\Delta a^*$, and $\Delta b^*$ each represent the chromaticity difference between two colors in the L*a*b* color space. The above formula is used to calculate the color difference for each combination of a pixel (L*out1, a*out1, b*out1) of the reference read image data and a pixel (L*out2, a*out2, b*out2) of the user read image data, with the pixels corresponding to the same pixel of the original image data.

Once the color difference between the corresponding pixels is found, it is possible to quantitatively assess the occurrence of errors in the association. In other words, if the color difference exceeds a specified value, it is determined that neither pixel is in a position where the reference read image data and the user read image data correspond to each other. Data determined to be data with an error having occurred in pixel value association is excluded from the pixel value association data, which improves the data quality.

In the present embodiment, description is made using the CIE 1976 color difference formula as a color difference formula, to which the present invention is not limited. The CIE 1994 color difference formula, the CIE 2000 color difference formula or the CMC (1:c) color difference formula may be used.

Next, the method using the hue difference is described. The hue difference $\Delta H^*ab$ in the L*a*b* color space is defined by formula (2) below.

$$\Delta H^*_{ab} = \sqrt{(\Delta E^*_{ab})^2 - (\Delta L^*)^2 - (\Delta C^*_{ab})^2} \quad (2)$$

In the formula, $\Delta E^*ab$ represents the color difference, $\Delta L^*$ (or $\Delta a^*$ or $\Delta b^*$) represents the chromaticity difference between two colors, and $\Delta C^*ab$ represents the chroma difference. The chroma $C^*ab$ is defined by formula (3) below.

$$C^*_{ab} = \sqrt{(a^*)^2 + (b^*)^2} \quad (3)$$

While the procedure for finding the hue difference between a pixel of the reference read image data and a pixel of the user read image data, with the pixels corresponding to the same pixel of the original image data, is the same as the procedure for finding the color difference, not the color difference but the hue difference is to be calculated. In addition, methods of determination are the same.

The method using the absolute value of the difference in each color component refers to the method, in which the absolute value of the difference in each color component between a pixel of the reference read image data and a pixel of the user read image data, with the pixels corresponding to the same pixel of the original image data, is taken in a specified color space so as to make an assessment.

Description is made on "duplication in data" as well. The term "duplication in data" herein used means two or more pieces of data in the pixel value association data that are identical to one another in combination of color component values (Cin, Min, Yin, and Kin) of the original image data. An example of duplicating pieces of data is set forth in Table 2 below.

TABLE 2

| $C_{in}$ | $M_{in}$ | $Y_{in}$ | $K_{in}$ | $L^*_{out1}$ | $a^*_{out1}$ | $b^*_{out1}$ | $L^*_{out2}$ | $a^*_{out2}$ | $b^*_{out2}$ |
|---|---|---|---|---|---|---|---|---|---|
| . | . | . | . | . | . | . | . | . | . |
| . | . | . | . | . | . | . | . | . | . |
| . | . | . | . | . | . | . | . | . | . |
| 10 | 20 | 30 | 0 | 76 | 2 | 16 | 74 | 1 | 15 |
| 10 | 20 | 30 | 0 | 72 | 9 | 15 | 74 | −6 | 19 |
| 10 | 20 | 30 | 0 | 72 | 2 | 12 | 81 | −1 | 22 |
| 10 | 20 | 30 | 0 | 76 | 10 | 17 | 83 | −5 | 23 |
| 10 | 20 | 30 | 0 | 73 | 10 | 14 | 73 | 2 | 16 |
| 10 | 20 | 30 | 0 | 71 | 8 | 21 | 77 | 4 | 17 |
| . | . | . | . | . | . | . | . | . | . |
| . | . | . | . | . | . | . | . | . | . |
| . | . | . | . | . | . | . | . | . | . |

The accuracy in color drift characteristic determination may also be decreased by such duplicating pieces of data and, moreover, an increased data quantity may lower the processing speed. For this reason, in the present embodiment, duplicating pieces of data are integrated so as to reduce the data quantity.

The method for integrating duplicating pieces of data is exemplified by a method using the mean of duplicating pieces of data, a method using the median of duplicating pieces of data, and a method using the mode of duplicating pieces of data. An example of the integration of duplicating pieces of data by the mean is set forth in Table 3.

TABLE 3

| $C_{in}$ | $M_{in}$ | $Y_{in}$ | $K_{in}$ | $L^*_{out1}$ | $a^*_{out1}$ | $b^*_{out1}$ | $L^*_{out2}$ | $a^*_{out2}$ | $b^*_{out2}$ |
|---|---|---|---|---|---|---|---|---|---|
| . | . | . | . | . | . | . | . | . | . |
| . | . | . | . | . | . | . | . | . | . |
| . | . | . | . | . | . | . | . | . | . |
| 10 | 20 | 30 | 0 | 73.3 | 6.8 | 15.8 | 77.0 | −0.8 | 18.7 |
| . | . | . | . | . | . | . | . | . | . |
| . | . | . | . | . | . | . | . | . | . |
| . | . | . | . | . | . | . | . | . | . |

In this example, six duplicating pieces of data are integrated into one piece of data so as to achieve the reduction in data by five pieces of data.

The next description is made on exemplary improvement III in accuracy in color drift characteristic determination.

It is also desirable that pixel value association data is distributed throughout a color space of the original image data. While the color drift does not need to be estimated with respect to a color not included in the original image data, a color included in the original image data may not be included in pixel value association data as a result of exclusion of data in the exemplary improvement I in accuracy in color drift characteristic determination or the exemplary improvement II in accuracy in color drift characteristic determination. In that case, the determination of the color drift characteristic is unstable with respect to a color not included in the pixel value association data.

Figure 6:
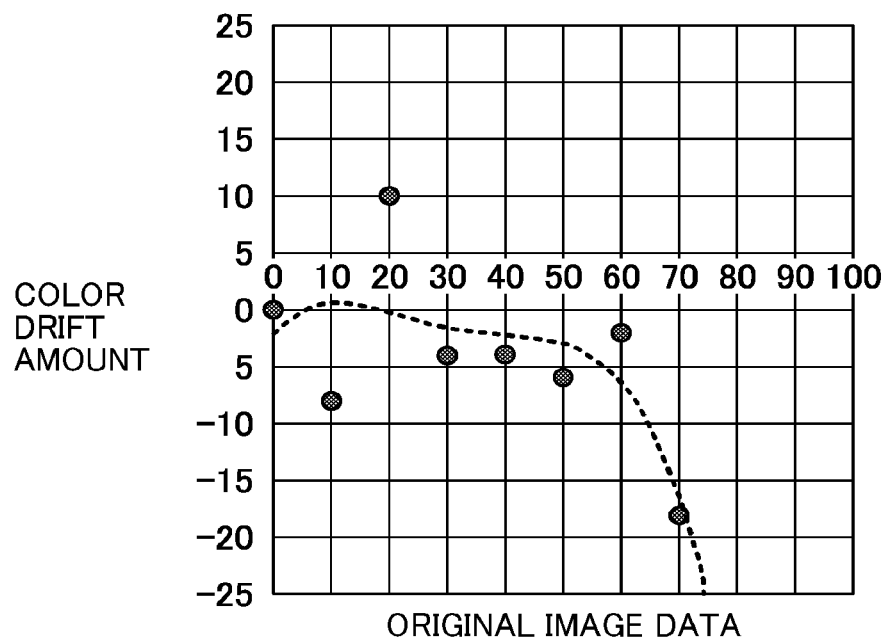
FIG. 6 is a diagram illustrating an example of an unstable result of color drift characteristic determination.

FIG. 6 is a diagram illustrating an example of the case where the determination of the color drift characteristic is unstable. In FIG. 6, the horizontal axis represents the color of the original image data and the vertical axis represents the color drift amount. The color drift amount refers to an amount that indicates to what extent the color of the user read image data differs from the color of the reference read image data as an objective color for each pixel of the original image data.

Black circles for plotting in FIG. 6 each indicate a piece of data included in the pixel value association data. A dotted curve in FIG. 6 represents the result of color drift characteristic determination from the pixel value association data by fourth degree polynomial approximation.

It is seen from FIG. 6 that the determination of the color drift characteristic is unstable in a region where any piece of data is not included in the pixel value association data (region where the color of the original image data exceeds 70). If the original image data does not include any piece of data in such region, even an unstable determination of the color drift characteristic does not affect the color matching.

If, however, the original image data includes any piece of data in such region, the color matching results unexpectedly.

In an exemplary method for suppressing such unexpected color matching, dummy data is added so that the pixel value association data may be distributed throughout the color space of the original image data. The dummy data refers to data with a color drift amount of 0 that has been arranged throughout the color space of the original image data.

Figure 7:
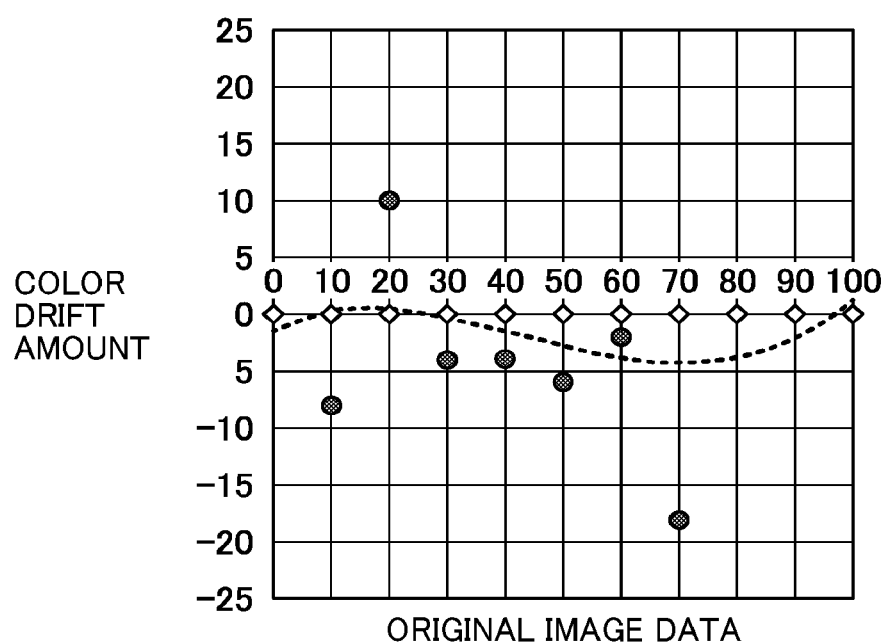
FIG. 7 is a diagram illustrating an example of the result of color drift characteristic determination with dummy data having been added.

FIG. 7 is a diagram illustrating an example of the addition of dummy data. Rhombi "◊" for plotting in FIG. 7 each indicate dummy data added. It is seen from FIG. 7 that, owing to the addition of dummy data, the determination of the color drift characteristic is not unstable but has been stabilized near a color drift amount of 0 even in a region where any piece of data is not included in the pixel value association data (region where the color of the original image data exceeds 70).

The amount of color variation before and after the color matching will be small near a color drift amount of 0, which makes it possible to suppress an unexpected result of color matching.

Referring back to FIG. 5, the processing performed by the image processing system 600 is further described.

In step S56 in FIG. 5, the color drift characteristic determiner 304 calculates the color drift amount based on the pixel value association data generated in step S55 and adds the calculated color drift amount to the pixel value association data. The color drift amount is calculated according to formulae (4) below.

$$L^*_{diff}(n) = L^*_{out1}(n) - L^*_{out2}(n)$$
$$a^*_{diff}(n) = a^*_{out1}(n) - a^*_{out2}(n)$$
$$b^*_{diff}(n) = b^*_{out1}(n) - b^*_{out2}(n) \qquad (4)$$

In formulae (4), L*out1(n) represents the L* component value of the n-th reference read image data registered in the pixel value association data and L*out2(n) represents the L* component value of the n-th user read image data registered in the pixel value association data. Similarly, a*out1(n) represents the a* component value of the n-th reference read image data registered in the pixel value association data and a*out2(n) represents the a* component value of the n-th user read image data registered in the pixel value association data. In addition, b*out1(n) represents the b* component value of the n-th reference read image data registered in the pixel value association data and b*out2(n) represents the b* component value of the n-th user read image data registered in the pixel value association data.

An example of the pixel value association data, to which the color drift amount has been added, is set forth in Table 4 below.

TABLE 4

| $C_{in}$ | $M_{in}$ | $Y_{in}$ | $K_{in}$ | $L^*_{out1}$ | $a^*_{out1}$ | $b^*_{out1}$ | $L^*_{out2}$ | $a^*_{out2}$ | $b^*_{out2}$ | $L^*_{diff}$ | $a^*_{diff}$ | $b^*_{diff}$ |
|---|---|---|---|---|---|---|---|---|---|---|---|---|
| 10 | 0 | 0 | 0 | 93 | −12 | −1 | 88 | −14 | 1 | 5 | 2 | −2 |
| 20 | 0 | 0 | 0 | 92 | −21 | −4 | 87 | −24 | −2 | 5 | 3 | −2 |
| 30 | 0 | 0 | 0 | 91 | −24 | −6 | 85 | −27 | −5 | 6 | 3 | −1 |
| 40 | 0 | 0 | 0 | 90 | −30 | −6 | 84 | −34 | −4 | 6 | 4 | −2 |
| . | . | . | . | . | . | . | . | . | . | . | . | . |
| . | . | . | . | . | . | . | . | . | . | . | . | . |
| . | . | . | . | . | . | . | . | . | . | . | . | . |
| 0 | 0 | 0 | 60 | 53 | 1 | −1 | 48 | −2 | 1 | 5 | 3 | −2 |
| 0 | 0 | o | 70 | 42 | 0 | 0 | 38 | −2 | 1 | 4 | 2 | −1 |
| 0 | 0 | 0 | 80 | 31 | 1 | −1 | 26 | −2 | 2 | 5 | 3 | −3 |
| 0 | 0 | 0 | 90 | 19 | 0 | 0 | 14 | −3 | 2 | 5 | 3 | −2 |
| 0 | 0 | 0 | 100 | 9 | 0 | 0 | 5 | −3 | 2 | 4 | 3 | −2 |

The process in step S56 may be performed by the pixel value associating unit 303.

Then in step S57, the color drift characteristic determiner 304 uses the pixel value association data to determine the color drift characteristic, which represents the correspondence when conversion from the color component values (Cin, Min, Yin, and Kin) of the original image data to color component values (L*diff, a*diff, and b*diff) of the color drift is to be performed.

The method for determining the color drift characteristic is exemplified by polynomial function approximation according to formula (5) below.

$$\hat{Y} = M_s f(X) \cong Y \qquad (5)$$

In formula (5), X represents the color component value [Cin, Min, Yin, Kin]t of the original image data, Y represents the color component value [L*diff, a*diff, b*diff]t of the color drift, MS represents the correction coefficient matrix, and f(X) represents the correction function. The function to be used as the correction function f(X) is exemplified by a function f(X)=[Cin, Min, Yin, Kin, Cin2, Min2, Yin2, Kin2, CinMin, CinYin, CinKin, MinYin, MinKin, YinKin, Cin3, Min3, Yin3, Kin3, . . . , 1]t.

If linear distortion exists between the original image data and the color drift, the linear transformation, in which a correction coefficient matrix MS of 4×3 is applied to four terms of a correction function f(X)=[Cin, Min, Yin, Kin]t, brings about the determination with an adequate accuracy. If, however, complicated nonlinear distortion exists between the original image data and the color drift, it may be required that higher degree function terms be used to determine the color drift characteristic with high accuracy.

The correction coefficient matrix MS can be calculated by the least-squares method. In other words, it is possible to use color component values X(n) (n=1, . . . , N) of the original image data that correspond to N color component values Y(n) (n=1, . . . , N) of the color drift stored in the pixel value association data to calculate the correction coefficient matrix MS by formula (7), according to a condition for minimizing the mean squared error represented by formula (6).

$$E[e^2] = \frac{1}{N}\left[\sum_{n=1}^{N} \|Y(n) - M_S f(X(n))\|^2\right] \quad (6)$$

$$M_S = [Y_N f'(X_N)][f(X_N)f'(X_N)]^{-1} \quad (7)$$

In formula (7), YN and XN each represent N data matrices. YN expressed by formula (8) is the color component value matrix of the color drift, and XN expressed by formula (9) is the color component value matrix of the original image data.

$$Y_N = \begin{bmatrix} L^*_{diff}(1), & L^*_{diff}(2), & ..., & L^*_{diff}(n) \\ a^*_{diff}(1), & a^*_{diff}(2), & ..., & a^*_{diff}(n) \\ b^*_{diff}(1), & b^*_{diff}(2), & ..., & b^*_{diff}(n) \end{bmatrix} \quad (8)$$

$$X_N = \begin{bmatrix} C_{in}(1), & C_{in}(2), & ..., & C_{in}(n) \\ M_{in}(1), & M_{in}(2), & ..., & M_{in}(n) \\ Y_{in}(1), & Y_{in}(2), & ..., & Y_{in}(n) \\ K_{in}(1), & K_{in}(2), & ..., & K_{in}(n) \end{bmatrix} \quad (9)$$

In formulae (8) and (9), L*diff(n) represents the L* component value of the n-th color drift registered in the pixel value association data, and Cin(n) represents the C component value of the n-th original image data registered in the pixel value association data. Similarly, a*diff(n) represents the a* component value of the n-th color drift registered in the pixel value association data, and b*diff(n) represents the b* component value of the n-th color drift registered in the pixel value association data. In addition, Min(n) represents the M component value of the n-th original image data registered in the pixel value association data, Yin(n) represents the Y component value of the n-th original image data registered in the pixel value association data, and Kin(n) represents the K component value of the n-th original image data registered in the pixel value association data.

In formula (7), f(XN) represents the function term matrix of color component values of the original image data, which is a matrix of 15×N expressed by formula (10) below in the case of a quadratic function, for instance.

$$f(X_N) = \begin{bmatrix} C_{in}(1), & C_{in}(2), & ..., & C_{in}(n), \\ M_{in}(1), & M_{in}(2), & ..., & M_{in}(n), \\ Y_{in}(1), & Y_{in}(2), & ..., & Y_{in}(n), \\ K_{in}(1), & K_{in}(2), & ..., & K_{in}(n), \\ C_{in}(1)^2, & C_{in}(2)^2, & ..., & C_{in}(n)^2 \\ M_{in}(1)^2, & M_{in}(2)^2, & ..., & M_{in}(n)^2 \\ Y_{in}(1)^2, & M_{in}(2)^2, & ..., & Y_{in}(n)^2 \\ K_{in}(1)^2, & K_{in}(2)^2, & ..., & K_{in}(n)^2 \\ C_{in}(1)M_{in}(1), & C_{in}(2)M_{in}(2), & ..., & C_{in}(N)M_{in}(N) \\ C_{in}(1)Y_{in}(1), & C_{in}(2)Y_{in}(2), & ..., & C_{in}(N)Y_{in}(N) \\ C_{in}(1)K_{in}(1), & C_{in}(2)K_{in}(2), & ..., & C_{in}(N)K_{in}(N) \\ M_{in}(1)Y_{in}(1), & M_{in}(2)Y_{in}(2), & ..., & M_{in}(N)Y_{in}(N) \\ M_{in}(1)K_{in}(1), & M_{in}(2)K_{in}(2), & ..., & M_{in}(N)K_{in}(N) \\ Y_{in}(1)K_{in}(1), & Y_{in}(2)K_{in}(2), & ..., & Y_{in}(N)K_{in}(N) \\ 1, & 1, & ..., & 1, \end{bmatrix} \quad (10)$$

The function terms to be used for the determination of the color drift characteristic are not limited to those function terms as described above as long as the function terms are multidimensional data originated from a plurality of color component values. While polynomial approximation is mentioned as an exemplary method for determining the color drift characteristic, the color drift characteristic may be determined by a method other than polynomial approximation, such as support vector regression using the pixel value association data as learning data and a neural network method.

If the correspondence has been produced in the pixel value association data generated in step S55 for all the coordinates in the original image data, the color drift in itself may be used as the color drift characteristic.

Next in step S58, the color converter 305 uses the determined color drift characteristic to perform color conversion. The procedure of color conversion using the color drift characteristic Msf(X) as determined is as follows. (1) Using the input profile as used during the printing of a user printed product by the user printer 200, a device-independent color o' is obtained from a color o of the original image data. The input profile refers to the file, in which characteristics of color conversion from a device-dependent color space (RGB color space, CMYK color space or the like) to a device-independent color space are described. (2) The color drift amount d=Msf(o), with which the color o of the original image data is associated, is obtained. (3) The color o of the original image data is converted into a color (o'+d). Such color conversion may directly be reflected on the original image data or reflected not on the original image data but the input profile used during the printing. The reflection on the input profile means that the input value is o and the output value is (o'+d) at each lattice point of the color conversion table in the input profile.

Thus the image processing system 600 is capable of performing color matching between output images.

It is conventionally known that, during the matching of colors between image outputting apparatuses including a printing apparatus and a display, the image outputting apparatuses are used to output color charts and the color charts are subjected to colorimetry so as to update a color profile of each image outputting apparatus. The method for matching colors can roughly be classified into two methods. Taking a printing apparatus as an example, two methods (1) and (2) are described.

Method (1): Colors are to be matched with a standard color chart. A color chart defined as a standard is printed by a printing apparatus, color patches constituting the color chart are each subjected to colorimetry by a colorimeter, and the color profile of the printing apparatus is updated so that the difference between a colorimetric value obtained and an expected value may fall within a specified range.

Method (2): Colors are to be matched with colors of a reference printing apparatus. In an exemplary method, a color as an output from a proofer is made identical to a color of an output image of a printing apparatus. In that case, a color chart is printed by each of the proofer and the printing apparatus, color patches of each color chart are each subjected to colorimetry by a colorimeter, and the color profile of the proofer is updated so that the difference between a colorimetric value of one color chart and a colorimetric value of the other may fall within a specified range.

Both of methods (1) and (2) above depend on the premise that a reference color chart is obtained.

The above methods (1) and (2), each of which is a method for matching colors between the output results of different image outputting apparatuses, may not be applicable under the conditions not allowing the use of a reference color chart. For instance, if the matching of colors with the output result of a printer of a customer is requested of a printing company when the printing company accepts an order for printing business from the customer, it is not possible to output a color chart from the image outputting apparatus as an object of color matching, that is to say, to use a reference color chart.

The printing company is able to meet the customer's request even under such conditions if an appropriate color management is carried out on the customer's side. It, however, is not infrequent that the customer is unfamiliar with color management. The case of color management being appropriately carried out is exemplified by the case where calibration of the image outputting apparatus is periodically performed and the case where a color of image data is managed based on a standardized system such as ICC profile.

The printing company has to manually perform color matching under the conditions not allowing the use of a color chart. Such operation is conducted by trial and error, so that the operation requires considerable time and depends on the experiences and intuition of the operator. Moreover, the result of color matching is sequentially printed and confirmed, so that a huge amount of recording medium such as paper is wasted, which may cause the printing company a loss. The paper to be disposed of is referred to as "loss of paper".

Even under the conditions allowing the use of a color chart, the colorimetry on color patches constituting the output color chart requires a lot of time and effort. Against the background as above, a function of matching colors between the output results of different image outputting apparatuses without using any color charts is desired.

It has been disclosed that, in order to perform color matching between output images without using any color charts, output images are subjected to color conversion based on the result of determination of two mappings indicating color characteristics of two image outputting apparatuses, respectively.

In the disclosed technology, however, the determination of mappings includes errors in no small numbers and the errors accumulate as the number of mappings to be determined is increased, which may prevent the color matching from being performed with high accuracy. Since the mapping determining process is performed twice, the processing time is long, which may prevent the color matching from being rapidly performed.

In the present embodiment, a single mapping is determined for estimating the color drift between the reference read image data (the first output image data) from the reference printer 400 (the first image outputting apparatus) and the original image data and the color drift between the user read image data (the second output image data) from the user printer 200 (the second image outputting apparatus) and the original image data and, based on the mapping, color conversion is performed on the original image data. Performing color conversion using not a plurality of mappings but a single mapping suppresses color drift estimation errors, leading to the color matching with high accuracy. The mapping determining process has only to be performed once, so that the processing time is reduced as compared with the case of the mapping determining process being performed two or more times, which allows the color matching to be rapidly performed.

In the present embodiment, color matching is performed by using the original to be printed, so that it is possible to perform color matching without using any color charts. In addition, color matching is not manually performed, which makes it possible to reduce the time required for color matching and perform color matching independently of the skill of the operator. Moreover, the number of visual confirmations by a person is reduced and, accordingly, the loss of paper is reduced by performing the color matching process.

In the present embodiment, the color drift characteristic determiner (mapping determiner) 304 uses multidimensional data originated from a plurality of color component values of the original image data to determine the mapping. Consequently, color matching is performed with high accuracy even if the difference in color between image outputting apparatuses is linked with each color component.

In the present embodiment, the image reader (color space conversion unit) 301, which converts image data into a device-independent color space, is included, and the color drift characteristic determiner (mapping determiner) 304 uses the reference read image data (the first output image data) and the user read image data (the second output image data), each of which has been converted into a device-independent color space by the image reader (color space conversion unit) 301, to determine the color drift characteristic (mapping). Consequently, the device dependency of the scanner (reading apparatus) 300 is got rid of and the color drift characteristic (mapping) is determined with high accuracy.

In the present embodiment, a contour portion of contents in the original image data, the reference read image data (the first output image data) or the user read image data (the second output image data) is excluded from the pixel value association data generated by the pixel value associating unit 303 so as to determine the color drift characteristic (mapping). As a result of reduction in error and exclusion of a contour portion of contents that is hard to align, the pixel value association is accurately carried out and the accuracy in color drift characteristic determination is improved.

In the present embodiment, the pixel value association data is subjected to data cleansing, so that the quality of the pixel value association data is improved, and the accuracy in color drift characteristic determination is improved.

In the present embodiment, the addition of dummy data throughout the color space of the original image data makes it possible to stably determine the color drift characteristic (mapping) even in a region where any piece of data is not included in the pixel value association data.

Second Embodiment

<Example of General Configuration of Image Processing System 600a>

Figure 8:
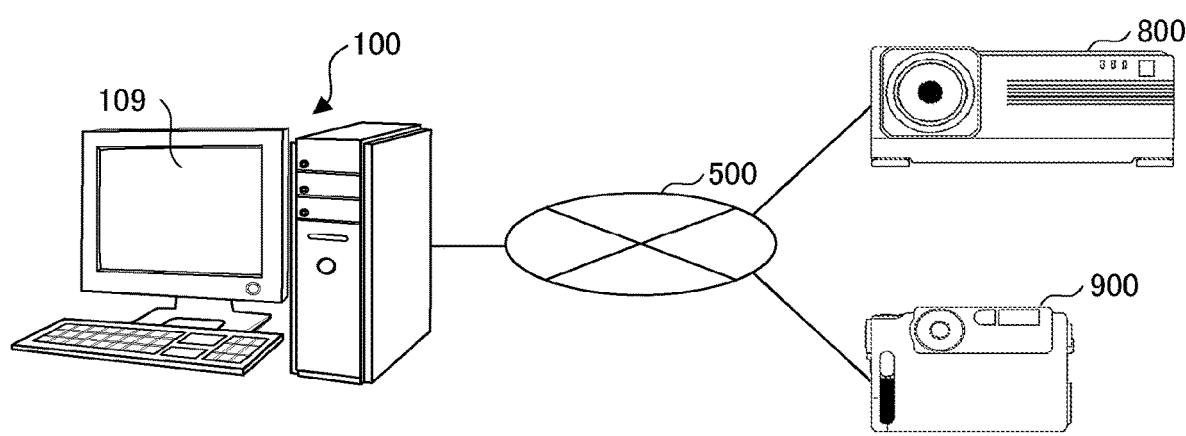
FIG. 8 is a diagram illustrating an example of a general configuration of an image processing system according to a second embodiment.

FIG. 8 is a diagram illustrating an example of a general configuration of an image processing system 600a according to the present embodiment. As illustrated in FIG. 8, the image processing system 600a includes the computer 100, a projector 800, and a digital camera 900 connected to one another over the network 500.

On comparison of the image processing system 600a with the image processing system 600 according to the first embodiment, a) a display 109 corresponds to the reference printer 400 and corresponds to an example of the first image outputting apparatus; b) a reference display screen of the display 109 corresponds to a reference printed product; c) the projector 800 corresponds to the user printer 200 and corresponds to an example of the second image outputting apparatus; d) a user display screen projected by the projector 800 corresponds to a user printed product; and e) the digital camera 900 corresponds to the scanner 300 and corresponds to an example of the reading apparatus.

In the first embodiment, printers are employed as an image outputting apparatus, so that the L*a*b* color space is used as a uniform color space. In the present embodiment, the display 109 and the projector 800 are employed as an image outputting apparatus, so that a L*u*v* color space is used as a uniform color space.

Figure 9:
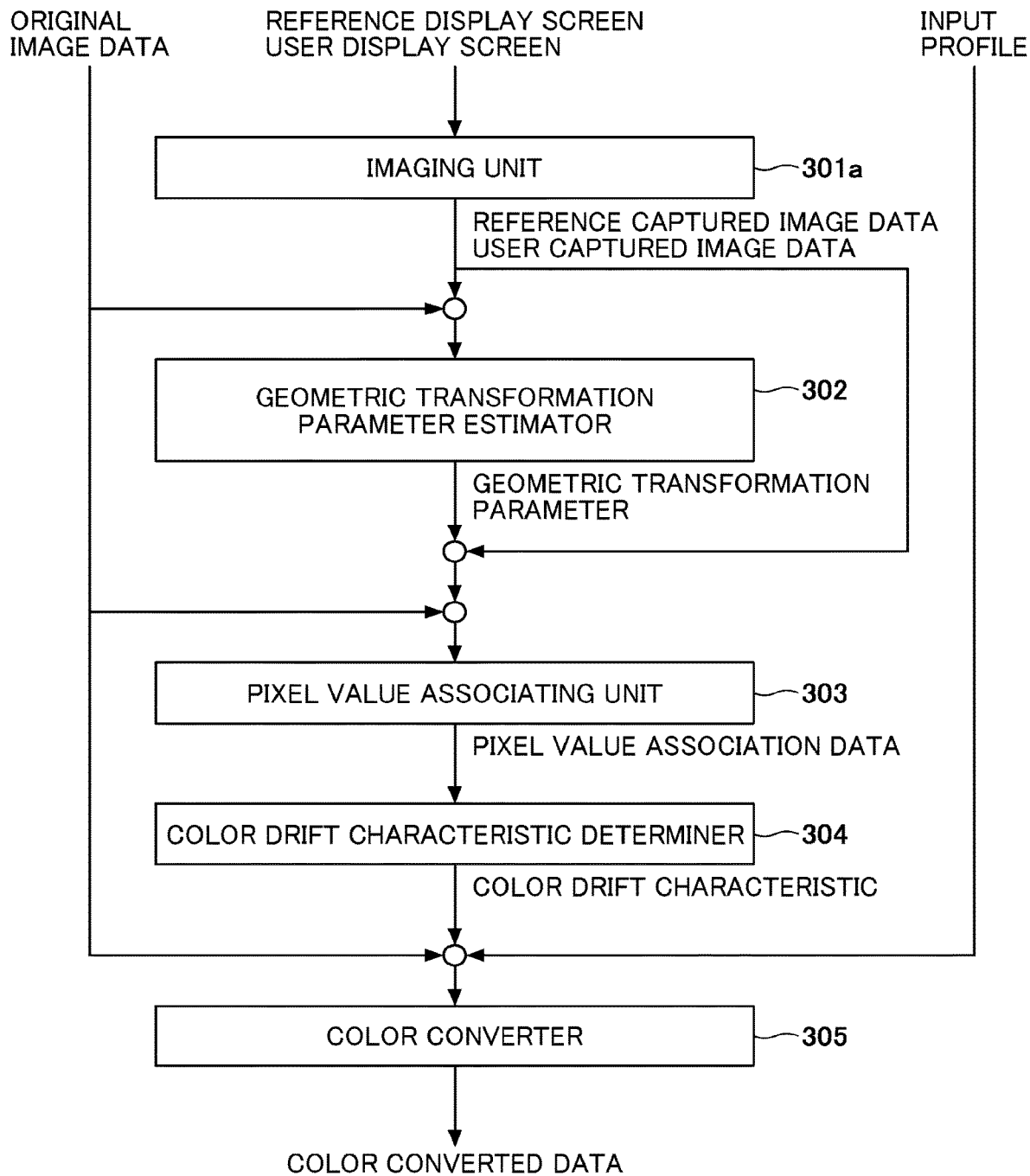
FIG. 9 is a block diagram illustrating an example of a functional configuration of the image processing system according to the second embodiment.

FIG. 9 is a block diagram illustrating an example of a functional configuration of the image processing system 600a. In comparison with the functional configuration (see FIG. 4) of the image processing system 600 according to the first embodiment, the only difference is that the image reader 301, which corresponds to the scanner 300, is replaced by an imaging unit 301a corresponding to the digital camera 900.

The imaging unit 301a images a reference display screen provided by the display of original image data by the display 109 so as to acquire reference captured image data corresponding to the first output image data. The imaging unit 301a also images a user display screen provided by the projection of the original image data by the projector 800 so as to acquire user captured image data corresponding to the second output image data.

Other functions are similar to the functions in FIG. 4 except that targets for processing are changed from the reference read image data and the user read image data to the reference captured image data and the user captured image data, so that a redundant description is omitted.

<Example of Processing by Image Processing System 600a>

Figure 10:
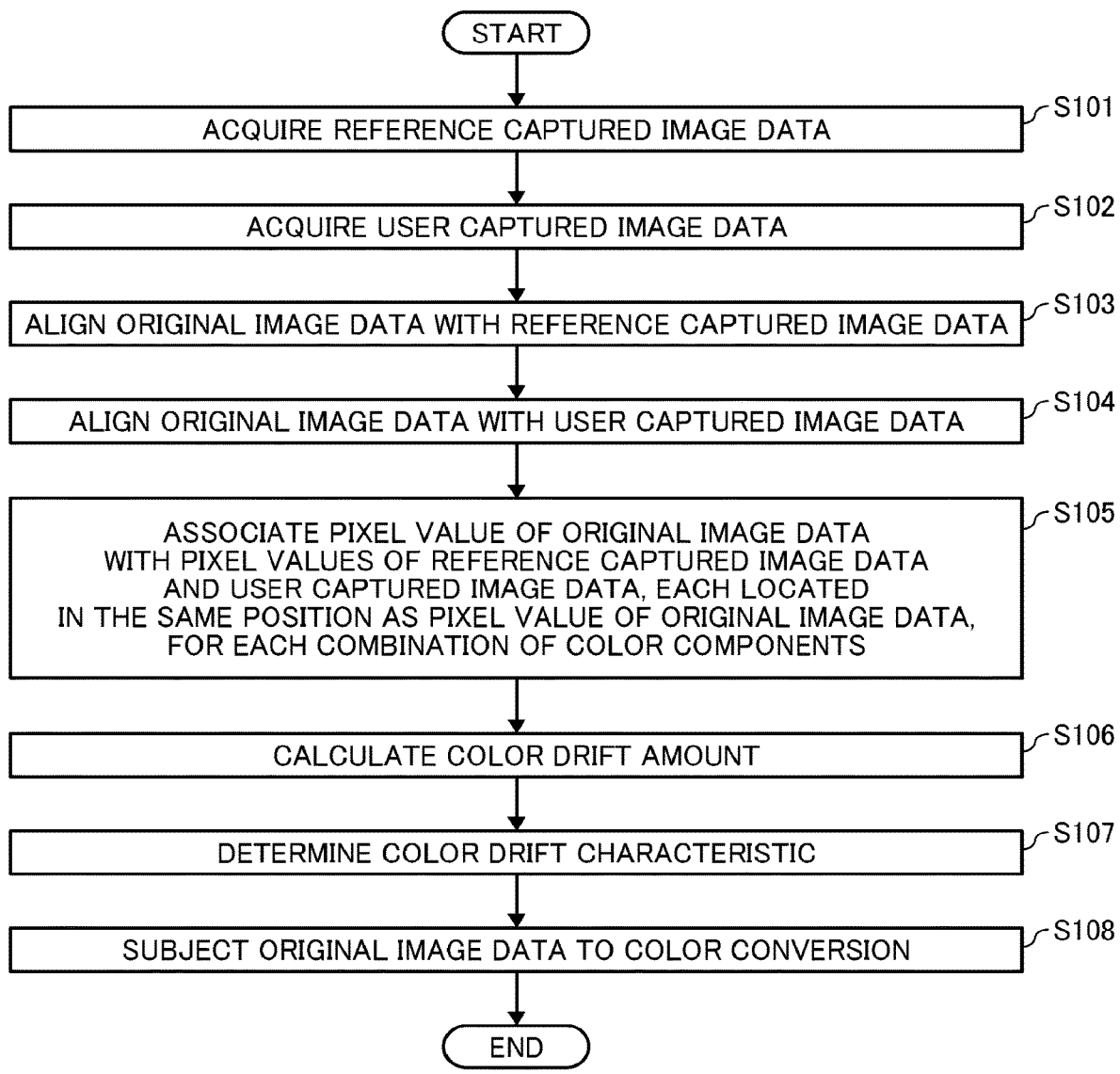
FIG. 10 is a flowchart of an example of processing performed by the image processing system according to the second embodiment.

FIG. 10 is a flowchart illustrating an example of processing performed by the image processing system 600a.

Initially in step S101, the imaging unit 301a images a reference display screen displayed by the display 109 so as to acquire reference captured image data. The reference captured image data is converted into a device-independent color space by using a color profile of the digital camera 900.

Then in step S102, the imaging unit 301a images a user display screen projected by the projector 800 so as to acquire user captured image data. The user captured image data is converted into a device-independent color space by using the color profile of the digital camera 900.

In the present embodiment, the digital camera 900 is used for the imaging unit 301a, so that the reference captured image data and the user captured image data are each converted into a device-independent color space by using the color profile. The conversion into a color space is unnecessary if an XYZ camera or the like is used instead of the digital camera 900 and, accordingly, image data in a device-independent color space is directly acquirable. The processes in step S101 and in step S102 can change the order with each other.

Processes in steps S103 through S108 are similar to the processes in steps S53 through S58 in FIG. 5 except that targets for processing are changed from the reference read image data and the user read image data to the reference captured image data and the user captured image data, so that a redundant description is omitted.

In the present embodiment, a single mapping is determined for estimating the color drift between the reference captured image data (the first output image data) from the display 109 (the first image outputting apparatus) and the original image data and the color drift between the user captured image data (the second output image data) from the projector 800 (the second image outputting apparatus) and the original image data and, based on the mapping, color conversion is performed on the original image data. Performing color conversion using not a plurality of mappings but a single mapping suppresses color drift estimation errors, leading to the color matching with high accuracy. The mapping determining process has only to be performed once, so that the processing time is reduced as compared with the case of the mapping determining process being performed two or more times, which allows the color matching to be rapidly performed.

Effects other than the above are similar to the effects described in the first embodiment, so that a redundant description is omitted.

Third Embodiment

In the present embodiment, unlike the first embodiment, in which the pixel value association data is used intact to determine the color drift characteristic, the pixel value association data is divided into a plurality of partial color spaces and the color drift characteristic is determined for each partial color space provided by the division. Such processing is performed so as to perform color matching with high accuracy even if the color drift characteristic varies with a region in a color space (that is to say, the tendency of color drift is not uniform over the entire color space). The description on figures shared with the first embodiment and the second embodiment is omitted.

To an image processing system 600b according to the present embodiment, the configurations of either of the image processing system 600 according to the first embodiment and the image processing system 600a according to the second embodiment are applicable.

<Example of Functional Configuration of Image Processing System 600b>

Figure 11:
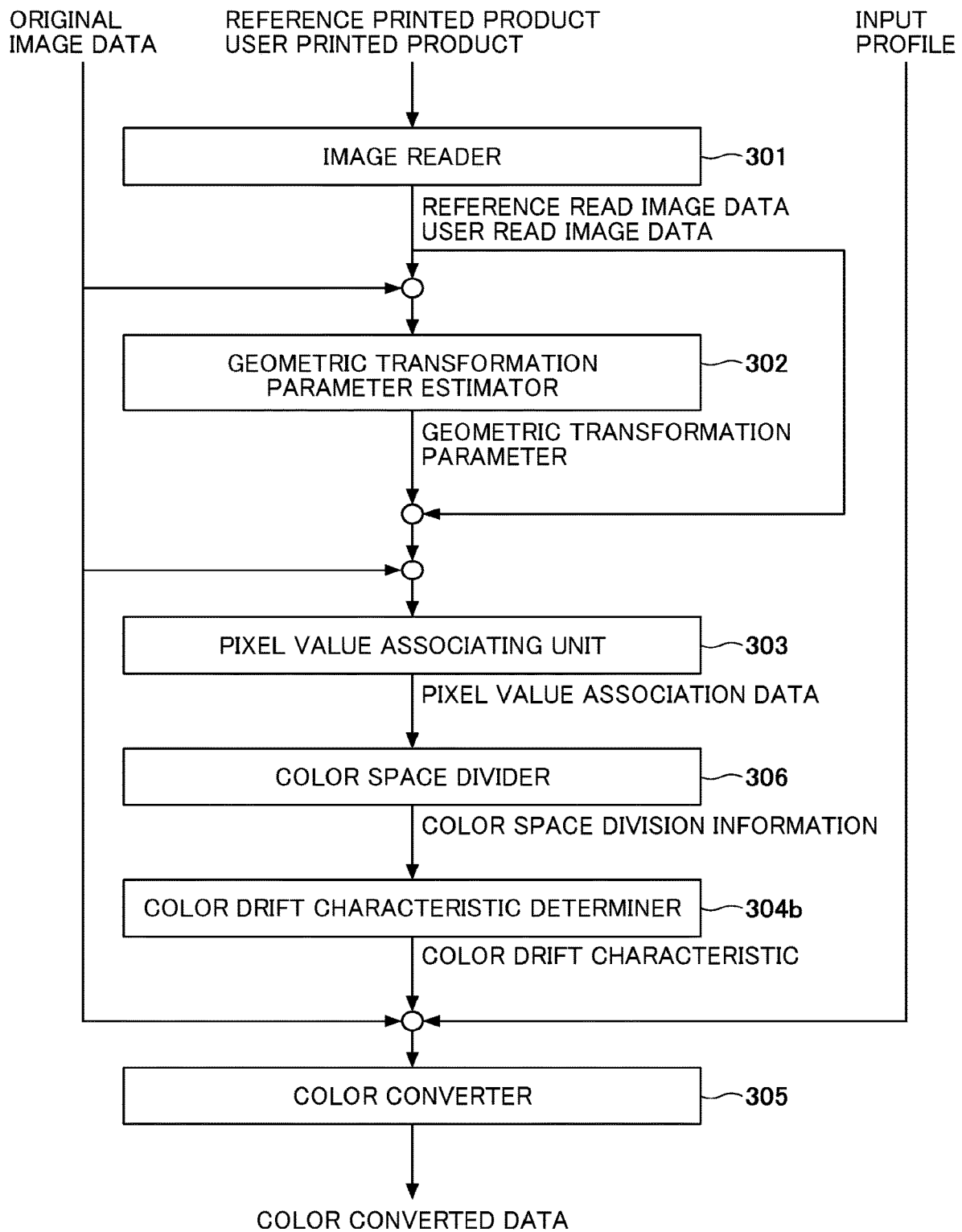
FIG. 11 is a block diagram illustrating an example of a functional configuration of an image processing system according to a third embodiment.

FIG. 11 is a block diagram illustrating an example of a functional configuration of the image processing system 600b. As illustrated in FIG. 11, the image processing system 600b includes a color space divider 306 and a color drift characteristic determiner 304b.

The color space divider 306 divides a color space of the pixel value association data at specified intervals. The color space divider 306 can perform color space division based on the appearance frequency distribution of a pixel value or the cumulative appearance frequency of a pixel value in the color space of the pixel value association data and, moreover, can divide the color space of the pixel value association data by cluster analysis.

The color drift characteristic determiner 304b determines the color drift characteristic between the reference read image data and the user read image data based on the pixel value association data for each partial color space provided by the color space division.

<Example of Processing by Image Processing System 600b>

Figure 12:
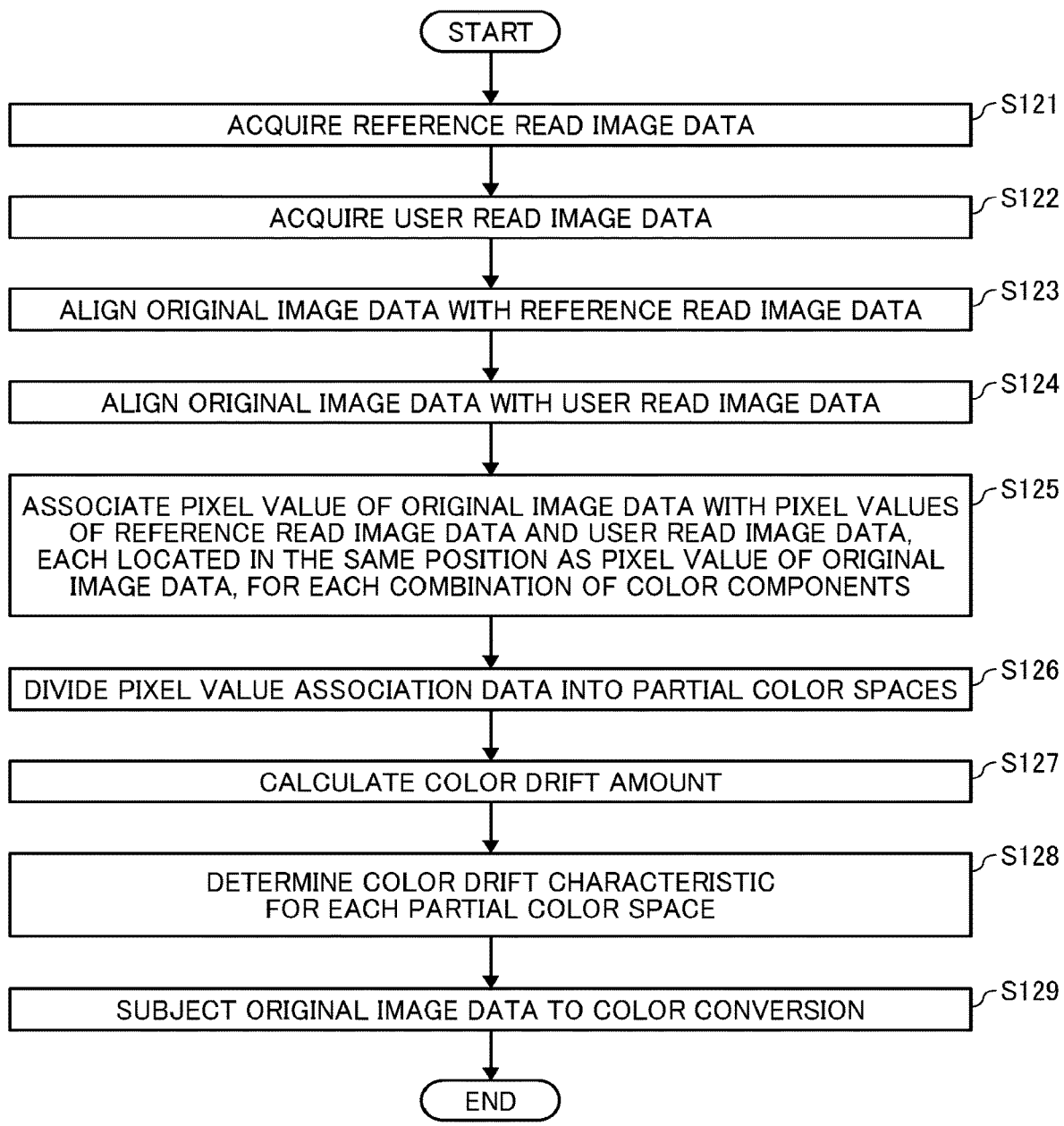
FIG. 12 is a flowchart of an example of processing performed by the image processing system according to the third embodiment.

FIG. 12 is a flowchart illustrating an example of processing performed by the image processing system 600b. FIG. 12 differs from FIG. 5 in that a process in step S126 and a process in step S128 are added. For this reason, the description on processes in steps S121 through S125, S127, and S129 is omitted and the differences are chiefly described.

In step S126, the color space divider 306 divides the pixel value association data generated in step S125, according to the color component values of the original image data.

The division standards may be explained as follows. As an example, it is assumed that the original image data is data on an RGB image and each color component is of 256 gradations.

(A) Division at Equal Intervals.

Figure 13A:
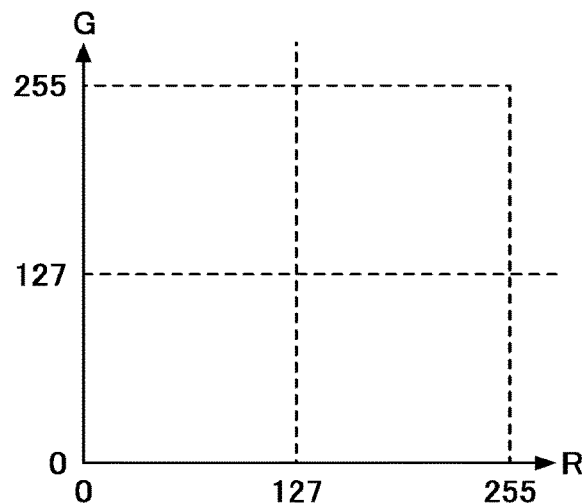
FIGS. 13A and 13B (FIG. 13) are a diagram explaining a case of division at equal intervals.
Figure 13B:
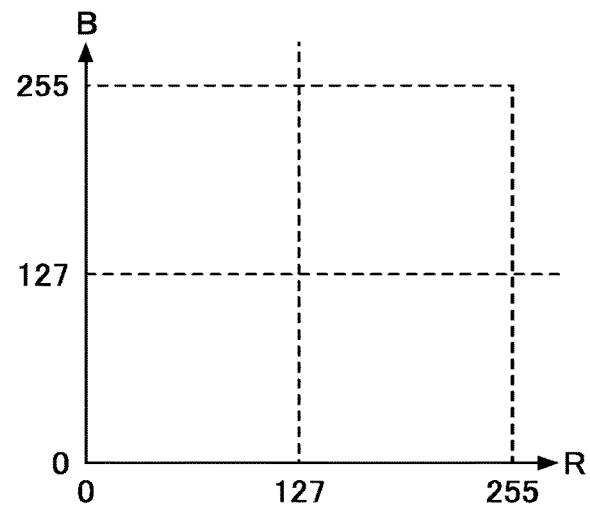

Each of the R axis, the G axis, and the B axis in the color space of the original image data in the pixel value association data is divided at intervals determined in advance or determined by using the number of division determined in advance, so as to create partial color spaces identical in volume to one another. FIGS. 13A and 13B illustrate the case where the R axis, the G axis, and the B axis are each divided into two at equal intervals.

(B) Division at Unequal Intervals.

Figure 14A:
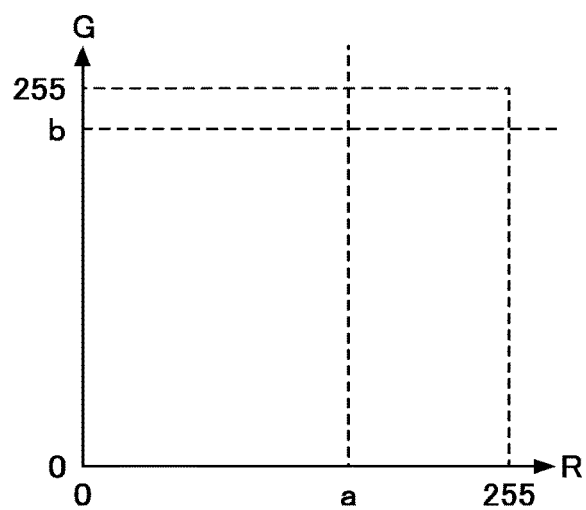
FIGS. 14A and 14B (FIG. 14) are a diagram explaining a case of division at unequal intervals.
Figure 14B:
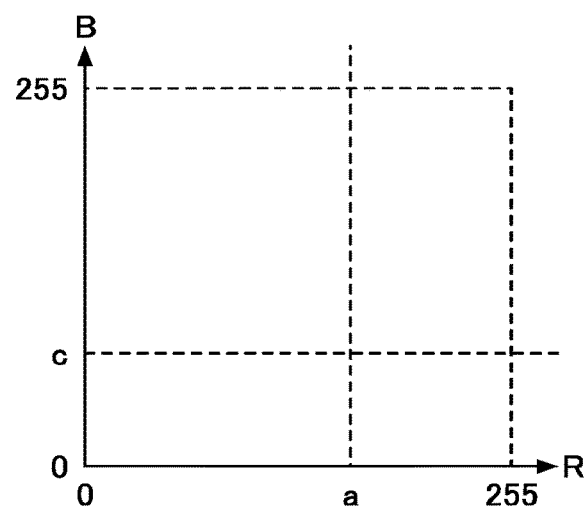

The data quantity belonging to each gradation on each of the R axis, the G axis, and the B axis in the color space of the original image data in the pixel value association data is used to adaptively determine the width of division so that the data quantity of each axis as divided may be a specified quantity or be at a specified ratio. FIGS. 14A and 14B illustrate the case where the R axis, the G axis, and the B axis are each divided into two at unequal intervals. The method for dividing at unequal intervals is exemplified by a method using the frequency distribution of the data quantity belonging to each gradation on each axis.

(B1) Method Using the Cumulative Frequency of the Data Quantity Belonging to Each Gradation on Each Axis.

Figures 15A, 15B, 15C:
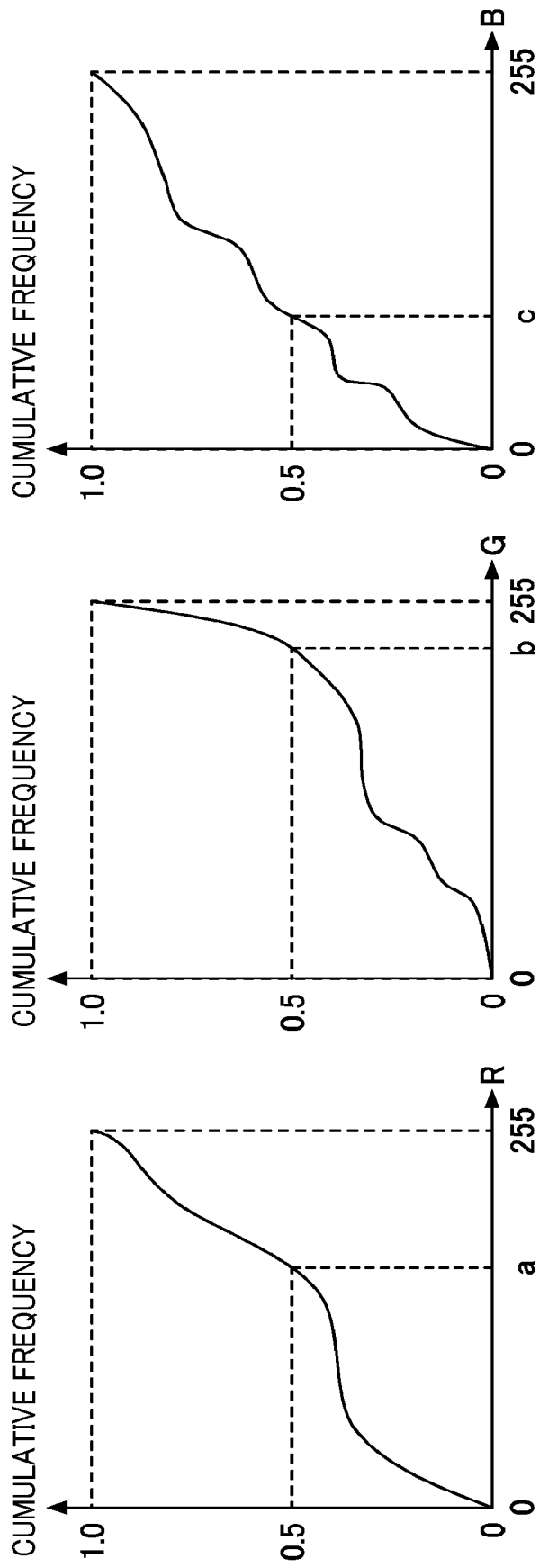
FIGS. 15A, 15B, and 15C (FIG. 15) are a diagram explaining a case of cumulative frequency of a pixel number being used.

In this method, the cumulative frequency of the data quantity belonging to each gradation on each axis is separated at equal intervals so as to perform division at a gradation corresponding to a position of separation. FIGS. 15A to 15C illustrate the case where 256 gradations from 0 to 255 are divided into two at unequal intervals. Assuming that the maximum value of the cumulative frequency on the vertical axis is 1.0, a gradation corresponding to a value of 0.5 is found as a position of separation so as to determine a position of division. In the example illustrated, gradation a on the R axis that corresponds to a cumulative frequency of 0.5, gradation b on the G axis that corresponds to a cumulative frequency of 0.5, and gradation c on the B axis that corresponds to a cumulative frequency of 0.5 are found.

(B2) Method Using the Frequency Distribution of the Data Quantity Belonging to Each Gradation on Each Axis.

Figure 16A:
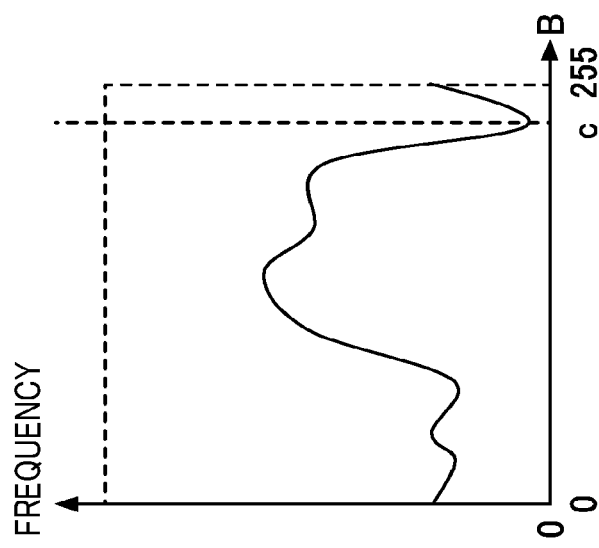
FIGS. 16A, 16B, and 16C (FIG. 16) are a diagram explaining a case of frequency distribution of a pixel number being used.
Figure 16B:
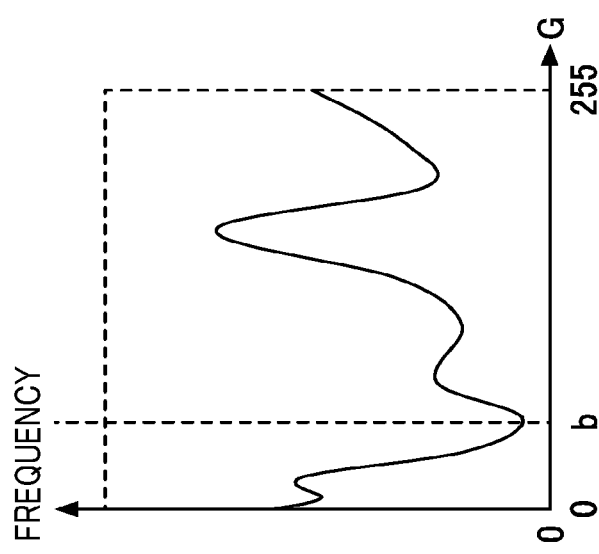
Figure 16C:
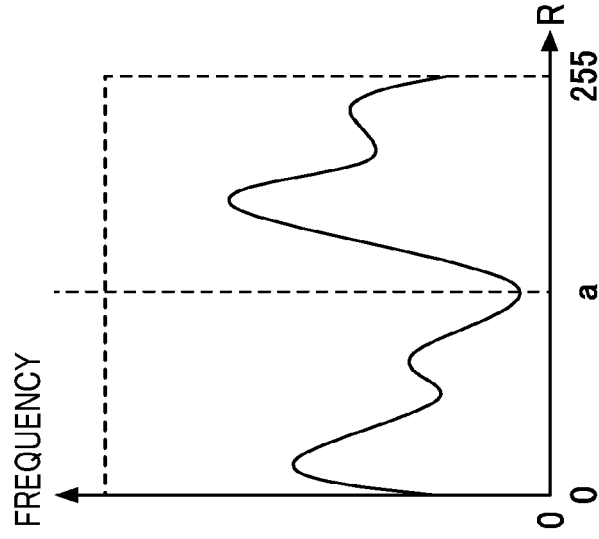
Figure 17A:
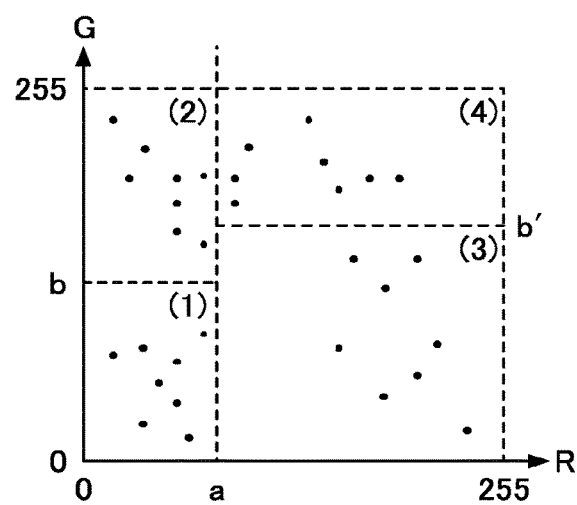
FIGS. 17A to 17E (FIG. 1') are a diagram explaining a case of division being carried out so that the number of colors may be uniform.
Figure 17B:
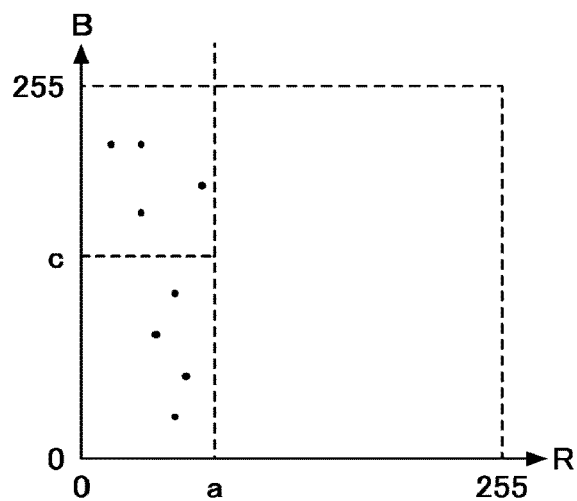
Figure 17C:
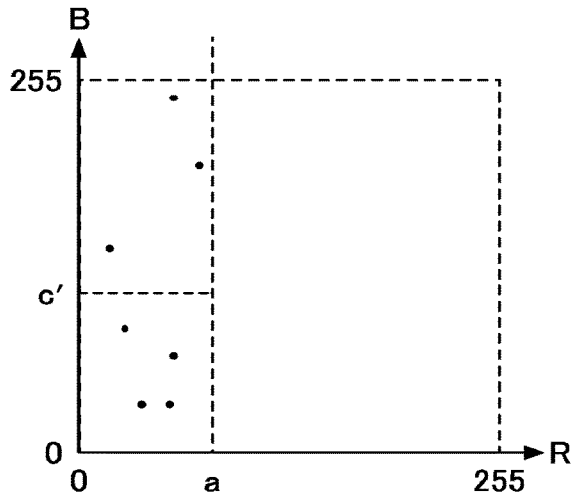
Figure 17D:
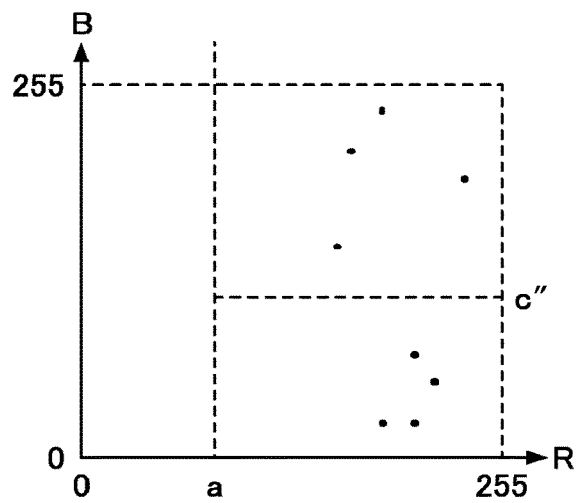
Figure 17E:
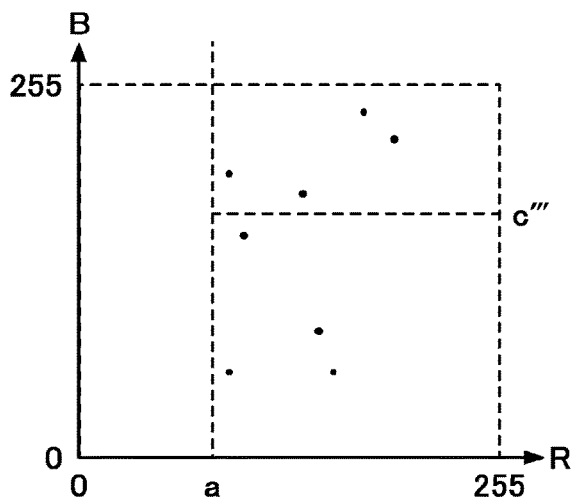

In this method, the frequency distribution of the data quantity belonging to each gradation on each axis is created as illustrated in FIGS. 16A to 16C, so as to perform division at a gradation where the frequency distribution is minimum. In the example illustrated, gradation a on the R axis where the frequency distribution is minimum, gradation b on the G axis where the frequency distribution is minimum, and gradation c on the B axis where the frequency distribution is minimum are found.

(C) Division with the Same Number of Colors.

When the color space of the original image data in the pixel value association data is divided into partial color spaces, a region to be divided is determined so that the same number of colors may be included in each partial color space. FIGS. 17A to 17E illustrate the case where division is carried out so that the same number of colors may be included in each partial color space. An example of the method for performing division so that the number of colors may be uniform is as follows.

(STEP 1): Finding gradation a on the R axis where the number (32) of colors of the original image data is halved (to 16).

(STEP 2): Finding gradation b on the G axis where the number (16) of colors included in a region extending from gradation 0 to gradation (a−1) on the R axis is halved (to 8) and gradation b' on the G axis where the number (16) of colors included in a region extending from gradation a to gradation 255 on the R axis is halved (to 8).

(STEP 3): Finding gradation c on the B axis where the number (8) of colors included in a region i (extending from gradation 0 to gradation (a−1) on the R axis and, at the same time, from gradation 0 to gradation (b−1) on the G axis) is halved (to 4), gradation c' on the B axis where the number (8) of colors included in a region ii (extending from gradation 0 to gradation (a−1) on the R axis and, at the same time, from gradation b to gradation 255 on the G axis) is halved (to 4), gradation c" on the B axis where the number (8) of colors included in a region iii (extending from gradation a to gradation 255 on the R axis and, at the same time, from gradation 0 to gradation (b'−1) on the G axis) is halved (to 4), and gradation c'" on the B axis where the number (8) of colors included in a region iv (extending from gradation a to gradation 255 on the R axis and, at the same time, from gradation b' to gradation 255 on the G axis) is halved (to 4). The order of division of the R, G, and B axes is not particularly limited to the above order (that is to say, dividing the R axis, then the G axis, and finally the B axis).

(D) Division Using Cluster Analysis.

When the color space of the original image data in the pixel value association data is divided into partial color spaces, cluster analysis is applied to each pixel included in the original image data so as to determine a region to be divided. An exemplary clustering process is K-means algorithm. The K-means algorithm refers to the technology for clustering, in which the number of clusters is determined in advance to be K and centers of K clusters are randomly determined so as to calculate the distance between a sample point and K cluster centers and classify the sample point into the nearest cluster.

During the clustering, the center of gravity of sample points applying to one and the same cluster is calculated so as to update the center of the cluster repeatedly, and the process is terminated if the update of cluster centers has converged. The number of division (the number of clusters, K) may be determined in advance or experientially determined according to the pixel number or the like.

Figure 18A:
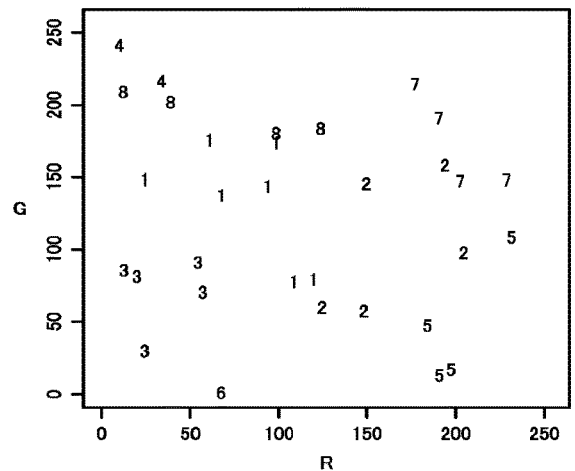
FIGS. 18A to 18C are diagrams explaining a case of division using cluster analysis, with FIG. 18C illustrating plotting in a two-dimensional space and FIGS. 18A and 18B illustrating plotting in a three-dimensional space.
Figure 18B:
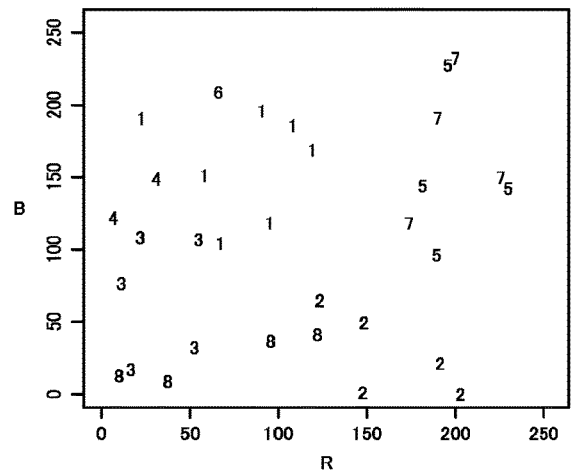
Figure 18C:
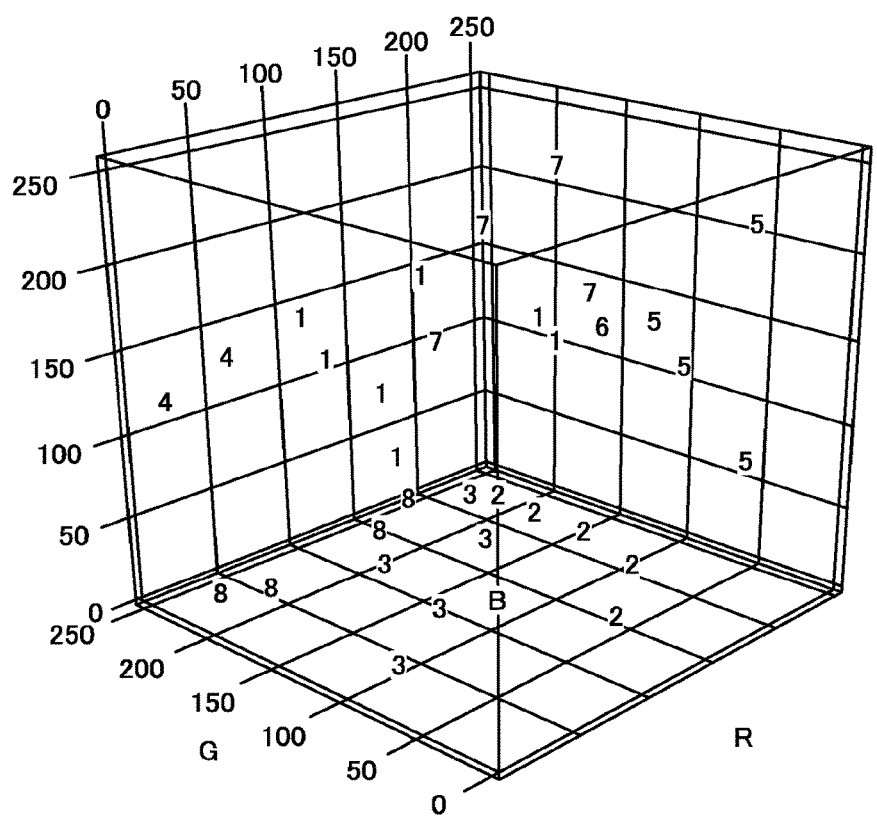

FIGS. 18A and 18B are diagrams illustrating the case where K-means algorithm is used to divide pixels of the original image data into eight clusters. FIGS. 18A and 18B illustrate plotting in a two-dimensional space with the R axis and the G axis and a two-dimensional space with the R axis and the B axis, and FIG. 18C illustrates plotting in a three-dimensional space with the R axis, the G axis, and the B axis. In each illustrated case, data is the same. Numerals 1 through 8 in the figures represent cluster numbers (1 through 8). Color space division information as a result of the division by the color space divider 306 is added to the pixel value association data and stored.

Referring back to FIG. 12, the processing performed by the image processing system 600b is further described.

In step S128, the color drift characteristic determiner 304b determines the color drift characteristic for each partial color space. Specifically, the color drift characteristic determiner 304b uses the pixel value association data to determine, for each partial color space, the color drift characteristic (mapping), which represents the correspondence when color conversion from the color component values (Cin, Min, Yin, and Kin) of the original image data to the color component values (L*diff, a*diff, and b*diff) of the color drift amount is to be performed. The process for determining the color drift characteristic is similar to the process described in step S57 in FIG. 5, so that the description is omitted.

Next in step S129, the color converter 305 uses the determined color drift characteristic to perform color conversion on the original image data for each partial color space. The procedure of color conversion using the color drift characteristic Msf(X) is as follows. (1) Using the input profile as used during the printing by the reference printer 400, a device-independent color o' is obtained from a color o of the original image data. (2) The color drift amount d=Msf(o), with which the color o of the original image data is associated, is obtained from the color drift characteristic of the partial color space, to which the color o of the original image data belongs. (3) The color o of the original image data is converted into a color (o'+d).

The color conversion in the above step (3) may directly be reflected on the original image data or reflected not on the original image data but the input profile used during the printing. The reflection on the input profile means that the input value is o and the output value is (o'+d) at each lattice point of the color conversion table in the input profile.

Thus the image processing system 600b is capable of performing color matching between output images.

In the present embodiment, the pixel value association data is divided into a plurality of partial color spaces and the color drift characteristic is determined for each partial color space provided by the color space division. Consequently, it is possible to perform color matching with high accuracy even if the color drift characteristic varies with a region in a color space (that is to say, the tendency of color drift is not uniform over the entire color space).

Effects other than the above are similar to the effects described in the first embodiment, so that a redundant description is omitted.

Fourth Embodiment

In the present embodiment, when a color space of the pixel value association data is divided into partial color spaces (refer to the third embodiment), the color space of the pixel value association data is not used intact but converted into a color space allowing the expression of the hue, the brightness, and the saturation, and the color space thus obtained is divided into partial color spaces. Such processing is performed so as to perform color matching with high accuracy even if the hue or brightness or the saturation varies with a region in a color space (that is to say, the tendency of color drift is not uniform over the entire color space).

To an image processing system 600c according to the present embodiment, the configurations of either of the image processing system 600 according to the first embodiment and the image processing system 600a according to the second embodiment are applicable. The functional configuration of the image processing system 600c is similar to the functional configuration illustrated in FIG. 11 except that the function of the color space divider 306 is partially different, so that a redundant description is omitted.

<Example of Processing by Image Processing System 600c>

Figure 19:
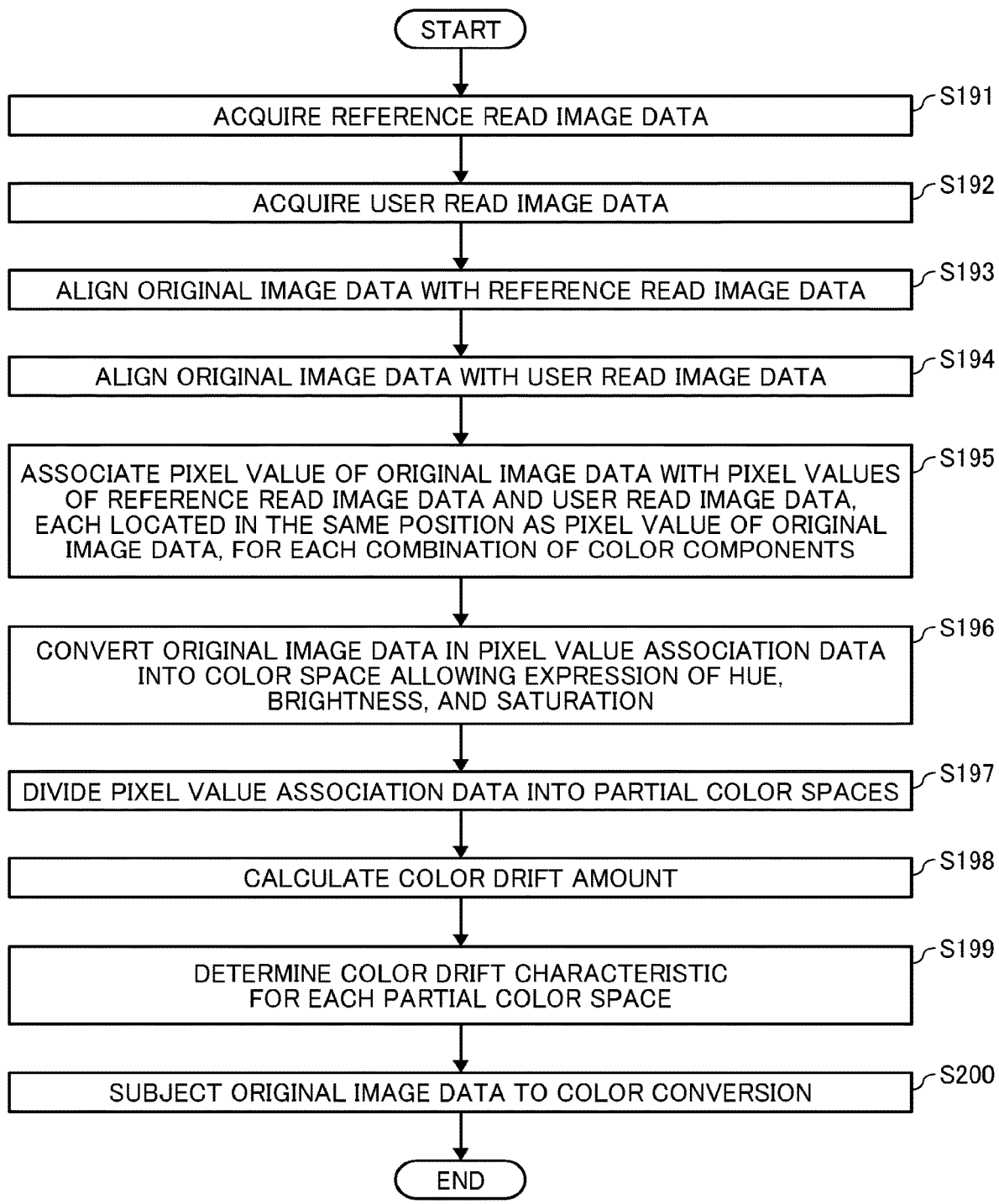
FIG. 19 is a flowchart of an example of processing performed by an image processing system according to a fourth embodiment.

FIG. 19 is a flowchart illustrating an example of processing performed by the image processing system 600c.

FIG. 19 differs from FIG. 12 in that a process in step S196 is added and a process in step S197 differs in contents from the corresponding process in step S126. For this reason, a redundant description on processes in steps S191 through S195 and S198 through S200 is omitted and the differences are chiefly described.

In step S196, the color space divider 306 converts the color space of the pixel value association data into a color space allowing the expression of the hue, the brightness, and the saturation. The color space allowing the expression of the hue, the brightness, and the saturation is exemplified by an HSV color space, an HLS color space, a YCbCr color space, a L*a*b* color space, and a L*u*v* color space.

Then in step S197, the color space divider 306 uses at least one of the hue, the brightness, and the saturation to divide each color space after the conversion in step S196.

The division standards may be explained as follows. As an example, it is assumed that the color space of the original image data is converted into a L*a*b* color space. The hue h and the saturation C* in a L*a*b* color space are defined by formulae (11) and (12) below, respectively.

$$h = \tan^{-1}\left(\frac{b^*}{a^*}\right) \qquad (11)$$

$$C^* = \sqrt{(a^*)^2 + (b^*)^2} \qquad (12)$$

(A) Division Based on the Hue.

Figure 20:
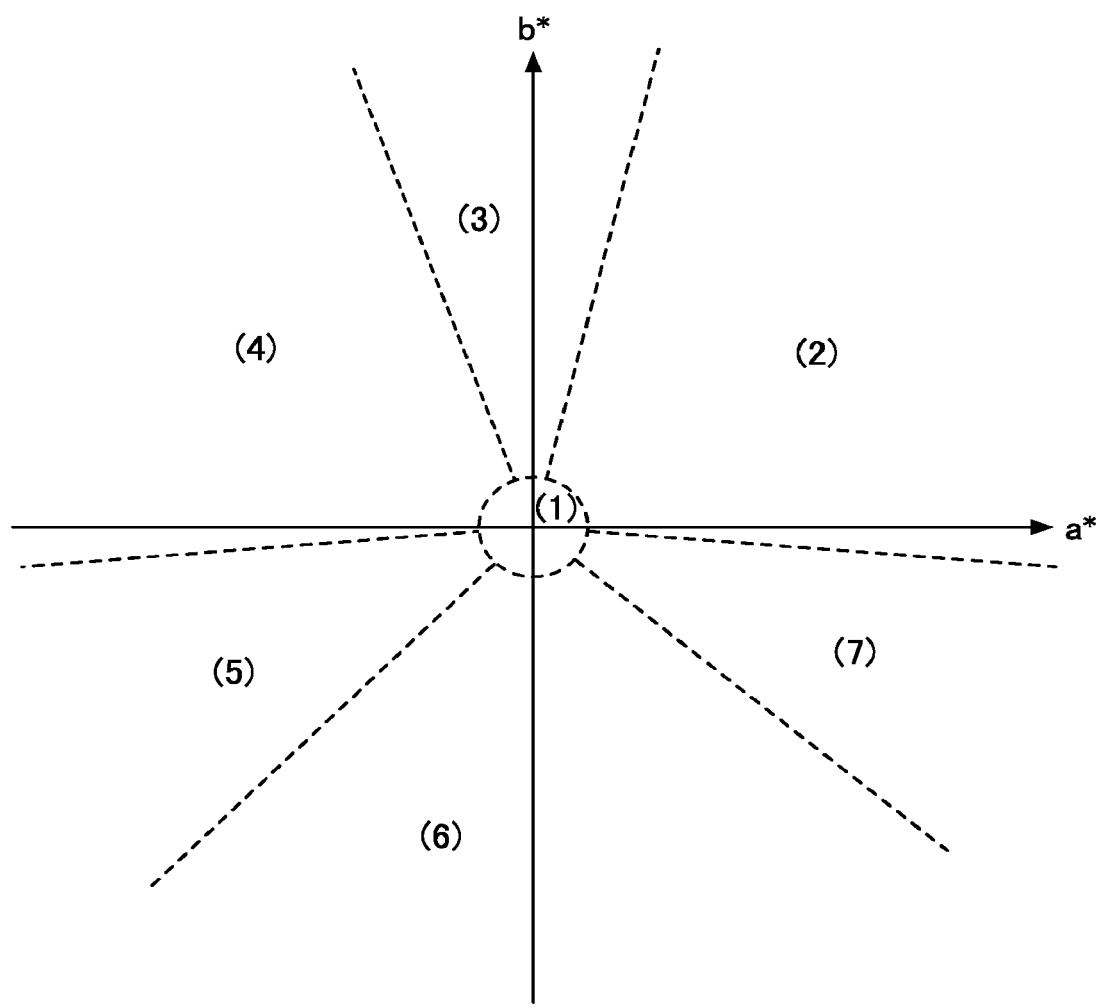
FIG. 20 is a diagram explaining a case of division using hue.

Values of the saturation C* and the hue h in a L*a*b* color space are used to perform division into partial color spaces based on the hue. FIG. 20 is a diagram illustrating the case where a L*a*b* color space is divided according to the hue in the color space. A region (1) is a region representing an achromatic color with a saturation C* equal to or less than a certain threshold. A region (2) is a region representing a "red" color with a hue h falling within a certain range. A region (3) is a region representing a "yellow" color, a region (4) is a region representing a "green" color, a region (5) is a region representing a "cyan" color, a region (6) is a region representing a "blue" color, and a region (7) is a region representing a "magenta" color. The number of division as well as the threshold of the saturation C* and the hue h for division may each be of an experientially specified value or may be determined so that regions may be uniform in number of colors.

(B) Division Based on the Brightness.

Figure 21:
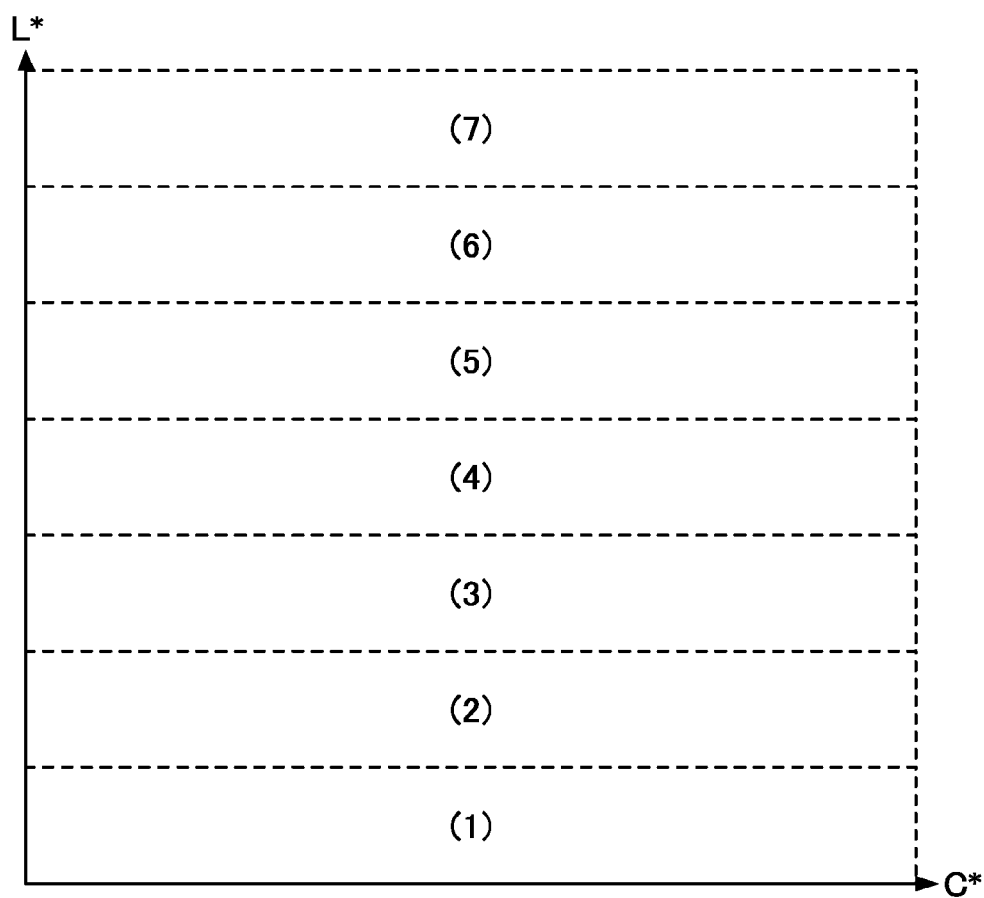
FIG. 21 is a diagram explaining a case of division using brightness.

Values of the brightness L* in a L*a*b* color space are used to perform division into partial color spaces based on the brightness. FIG. 21 is a diagram illustrating the case where a L*a*b* color space is divided according to the brightness in the color space. The number of division and the threshold of the brightness L* for division may each be of an experientially specified value or may be determined so that regions may be uniform in number of colors.

(C) Division Based on the Saturation.

Figure 22:
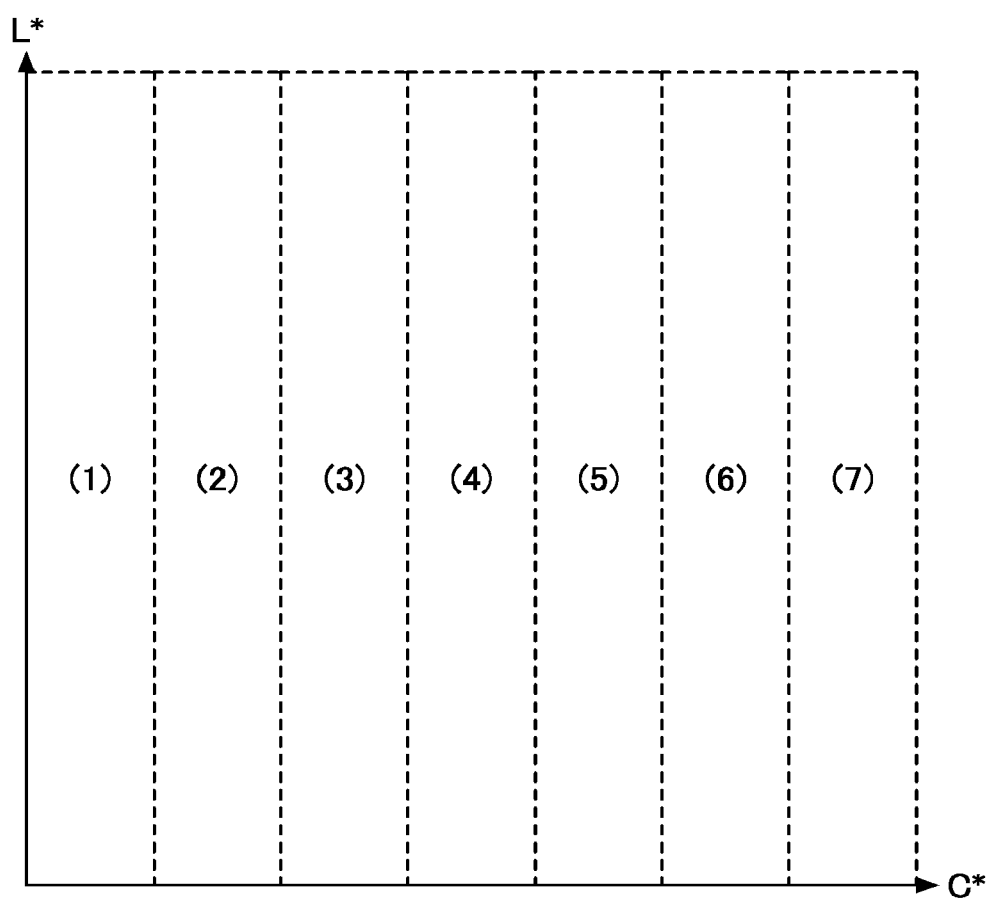
FIG. 22 is a diagram explaining a case of division using saturation.

Values of the saturation C* in a L*a*b* color space are used to perform division into partial color spaces based on the saturation. FIG. 22 is a diagram illustrating the case where a L*a*b* color space is divided according to the saturation in the color space. The number of division and the threshold of the saturation C* for division may each be of an experientially specified value or may be determined so that regions may be uniform in number of colors.

Apart from the above methods (A), (B), and (C), any combination of methods (A), (B), and (C) may be used for the division. For instance, the color space, which has been divided by method (A) based on the hue, may further be divided by method (B) or (C) for each hue.

(D) Division Using Cluster Analysis.

Cluster analysis is applied to each pixel included in the original image data in a L*a*b* color space so as to determine a region to be divided. The number of division may be determined in advance or experientially determined according to the pixel number or the like.

In the method for dividing the color space of the original image data, the original image data is converted into a L*a*b* color space and then cluster analysis is applied to each pixel so as to determine a region to be divided. An exemplary clustering process is K-means algorithm.

Figure 23:
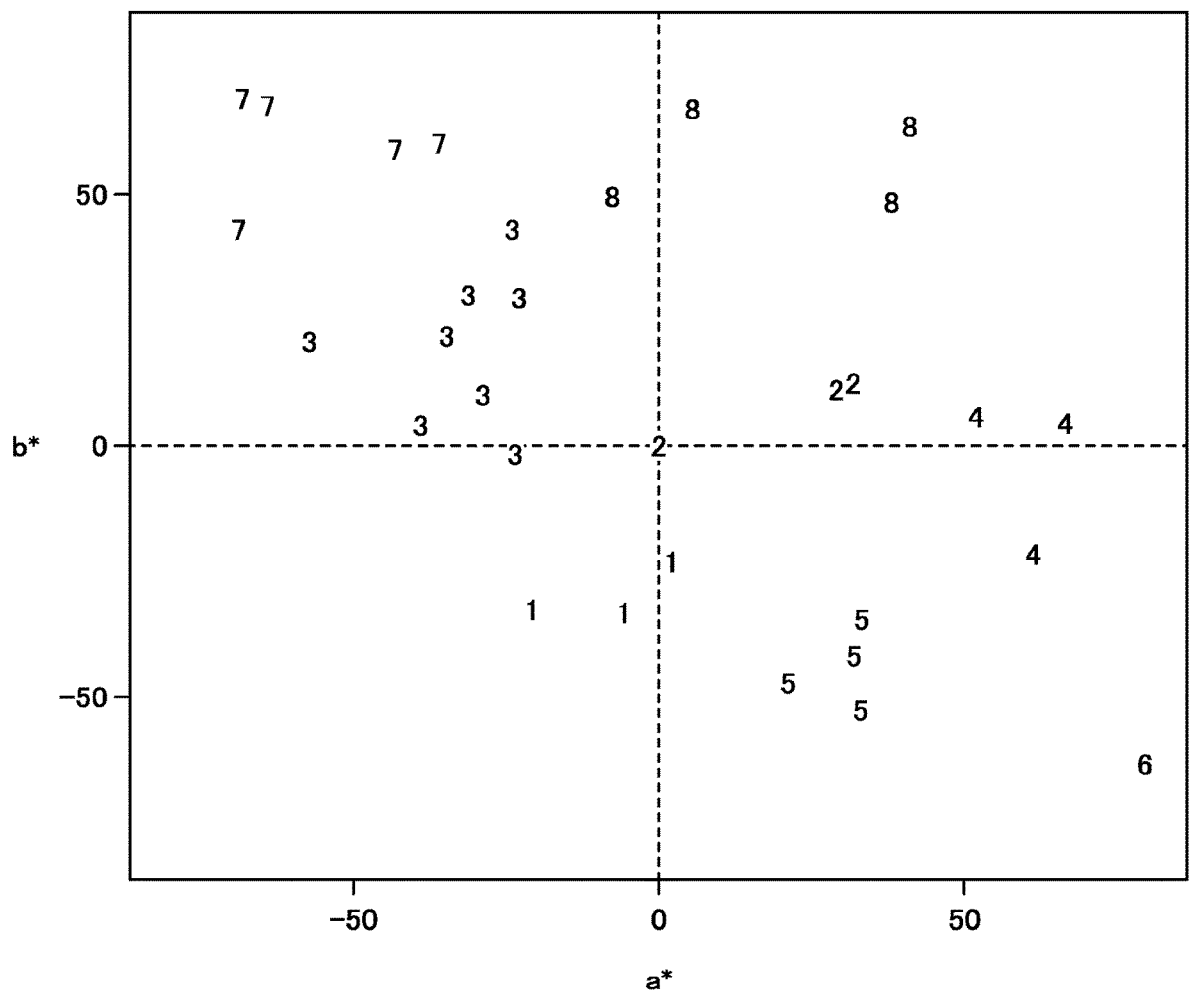
FIG. 23 is a diagram explaining a case of division using cluster analysis.

FIG. 23 is a diagram illustrating the case where K-means algorithm is used to divide values of a* and b* of each pixel of the original image data into eight clusters. In FIG. 23, plotting is performed in a two-dimensional space with the a* axis and the b* axis. Numerals 1 through 8 in FIG. 23 represent cluster numbers (1 through 8).

Thus the image processing system 600c is capable of performing color matching between output images.

In the present embodiment, when a color space of the pixel value association data is divided into partial color spaces, a color space of the original image data is not used intact but converted into a color space allowing the expression of the hue, the brightness, and the saturation before the division into partial color spaces. Consequently, it is possible to perform color matching with high accuracy even if the hue or brightness or the saturation varies with a region in a color space (that is to say, the tendency of color drift is not uniform over the entire color space).

Effects other than the above are similar to the effects described in the first embodiment, so that a redundant description is omitted.

Fifth Embodiment

In the present embodiment, the pixel value association data is not used intact to determine the color drift characteristic, but the pixel value association data is divided into a plurality of partial color spaces, representative data is determined for each partial color space provided by the division, and representative pixel value association data with a reduced bias of distribution is used to determine the color drift characteristic for each partial color space provided by the division. Such processing is performed so as to rapidly perform color matching with high accuracy even if pieces of pixel value association data are gathering in a small region in a color space (that is to say, not uniformly distributed with no biases).

While, in the present embodiment, description is made on the case where a color space of the pixel value association data is used intact when the color space is to be divided, as is the case with the third embodiment, the color space may be converted into a color space allowing the expression of the hue, the brightness, and the saturation and then divided into partial color spaces, as is the case with the fourth embodiment.

To an image processing system 600d according to the present embodiment, the configurations of either of the image processing system 600 according to the first embodiment and the image processing system 600a according to the second embodiment are applicable.

Figure 24:
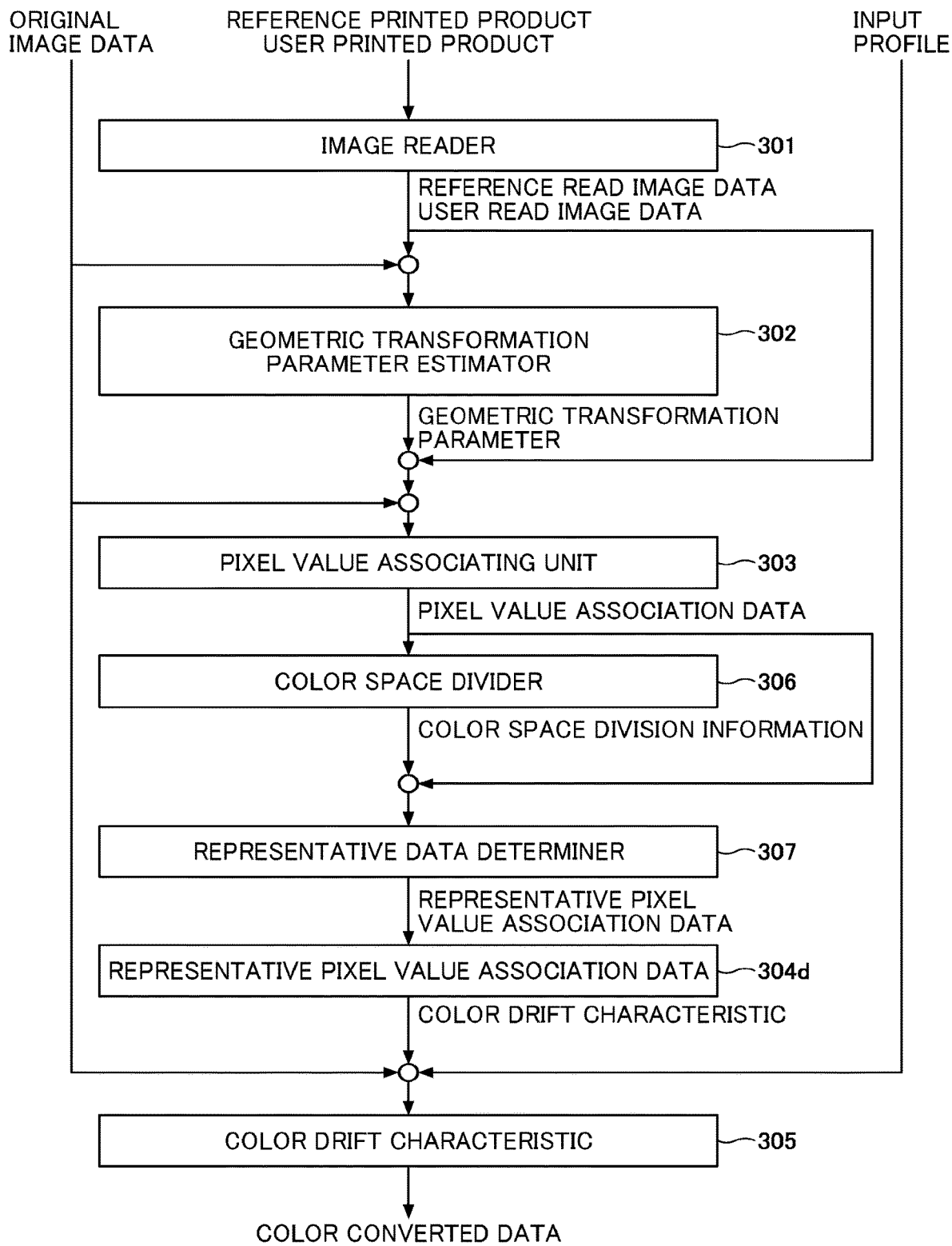
FIG. 24 is a block diagram illustrating an example of a functional configuration of an image processing system according to a fifth embodiment.

FIG. 24 is a block diagram illustrating an example of a functional configuration of the image processing system 600d. As illustrated in FIG. 24, the image processing system 600d includes a representative data determiner 307 and a color drift characteristic determiner 304d.

The representative data determiner 307 determines representative pixel value association data for each of the partial color spaces of the pixel value association data as divided. The representative data determiner 307 is capable of determining the data quantity of the representative pixel value association data according to the data quantity included in the partial color spaces provided by the color space division.

The color drift characteristic determiner 304d is capable of determining the color drift characteristic between the reference read image data and the user read image data based on the representative pixel value association data.

<Example of Processing by Image Processing System 600d>

Figure 25:
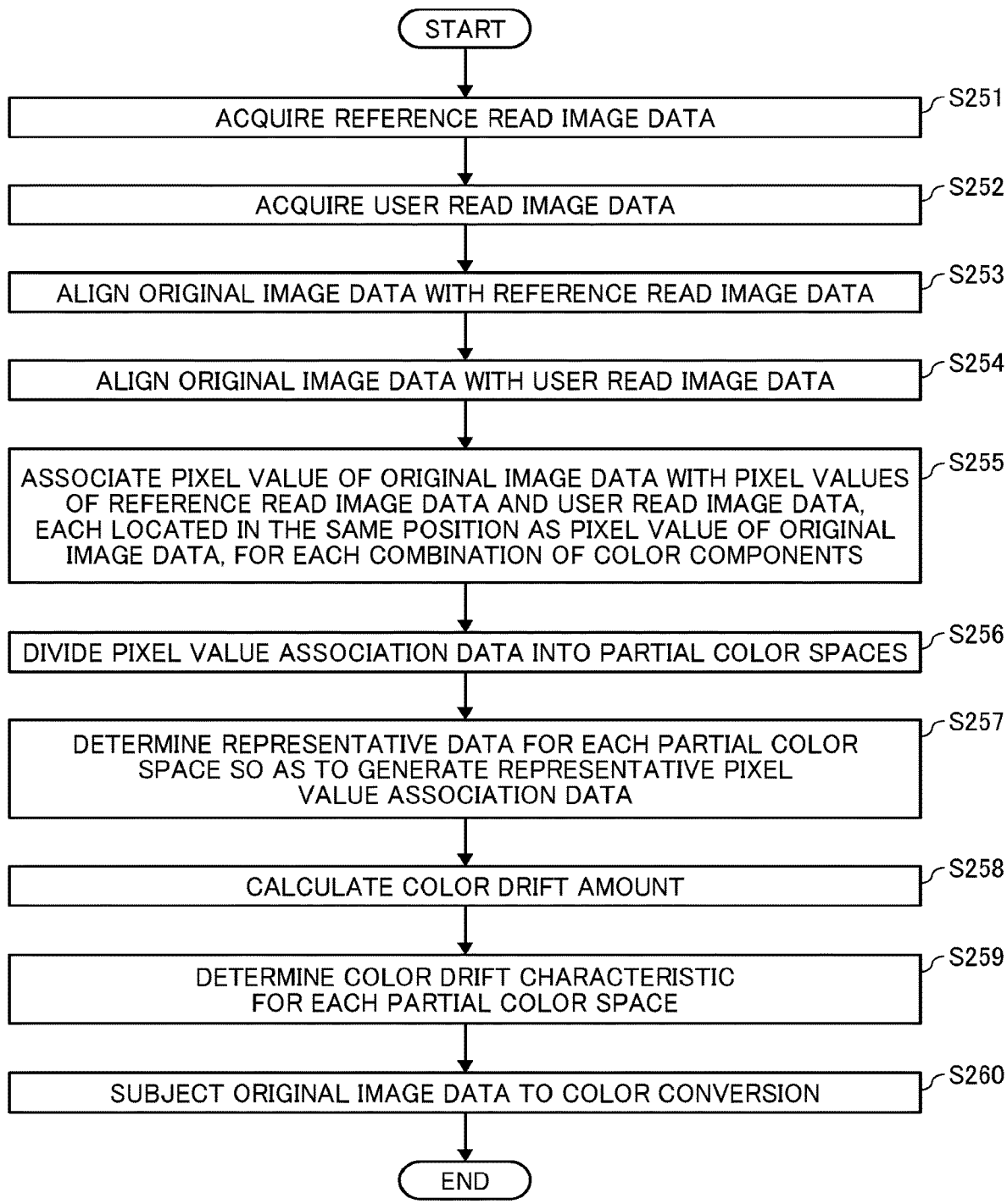
FIG. 25 is a flowchart of an example of processing performed by the image processing system according to the fifth embodiment.

FIG. 25 is a flowchart illustrating an example of processing performed by the image processing system 600d.

FIG. 25 differs from FIG. 12 in that a process in step S257 is added and a process in step S259 differs in contents from the corresponding process in step S128. For this reason, a redundant description on processes in steps S251 through S256, S258, and S260 is omitted and the differences are chiefly described.

In step S257, the representative data determiner 307 determines representative pixel value association data for each of the partial color spaces of the pixel value association data as divided and generates the representative pixel value association data.

The method for determining representative data is exemplified by a method using the mean of pieces of data belonging to the same partial color space, a method using the median of pieces of data belonging to the same partial color space, and a method using the mode of pieces of data belonging to the same partial color space. The representative data determined for each partial color space is generated as representative pixel value association data.

In step S259, the color drift characteristic determiner 304d determines the color drift characteristic between the reference read image data and the user read image data based on the representative pixel value association data.

Thus the image processing system 600d is capable of performing color matching between output images.

In the present embodiment, the pixel value association data is not used intact to determine the color drift characteristic, but the pixel value association data is divided into a plurality of partial color spaces, representative data is determined for each partial color space provided by the division, and representative pixel value association data with a reduced bias of distribution is used to determine the color drift characteristic for each partial color space provided by the division. Consequently, it is possible to rapidly perform color matching with high accuracy even if pieces of pixel value association data are gathering in a small region in a color space (that is to say, not uniformly distributed with no biases).

Effects other than the above are similar to the effects described in the first embodiment, so that a redundant description is omitted.

Sixth Embodiment

In the present embodiment, unlike the fifth embodiment, in which one piece of representative data is determined for each partial color space, representative data quantity is determined according to the data quantity included in the partial color spaces. Such processing is performed so as to reduce the bias of distribution in a color space of the pixel value association data taking an essential distribution into consideration.

While, in the present embodiment, description is made on the case where a color space of the pixel value association data is used intact when the color space is to be divided, as is the case with the third embodiment, the color space may be converted into a color space allowing the expression of the hue, the brightness, and the saturation and then divided into partial color spaces, as is the case with the fourth embodiment.

To an image processing system 600e according to the present embodiment, the configurations of either of the image processing system 600 according to the first embodiment and the image processing system 600a according to the second embodiment are applicable. The functional configuration of the image processing system 600e is similar to the functional configuration illustrated in FIG. 24 except that the function of the representative data determiner 307 is partially different, so that a redundant description is omitted.

<Example of Processing by Image Processing System 600e>

Figure 26:
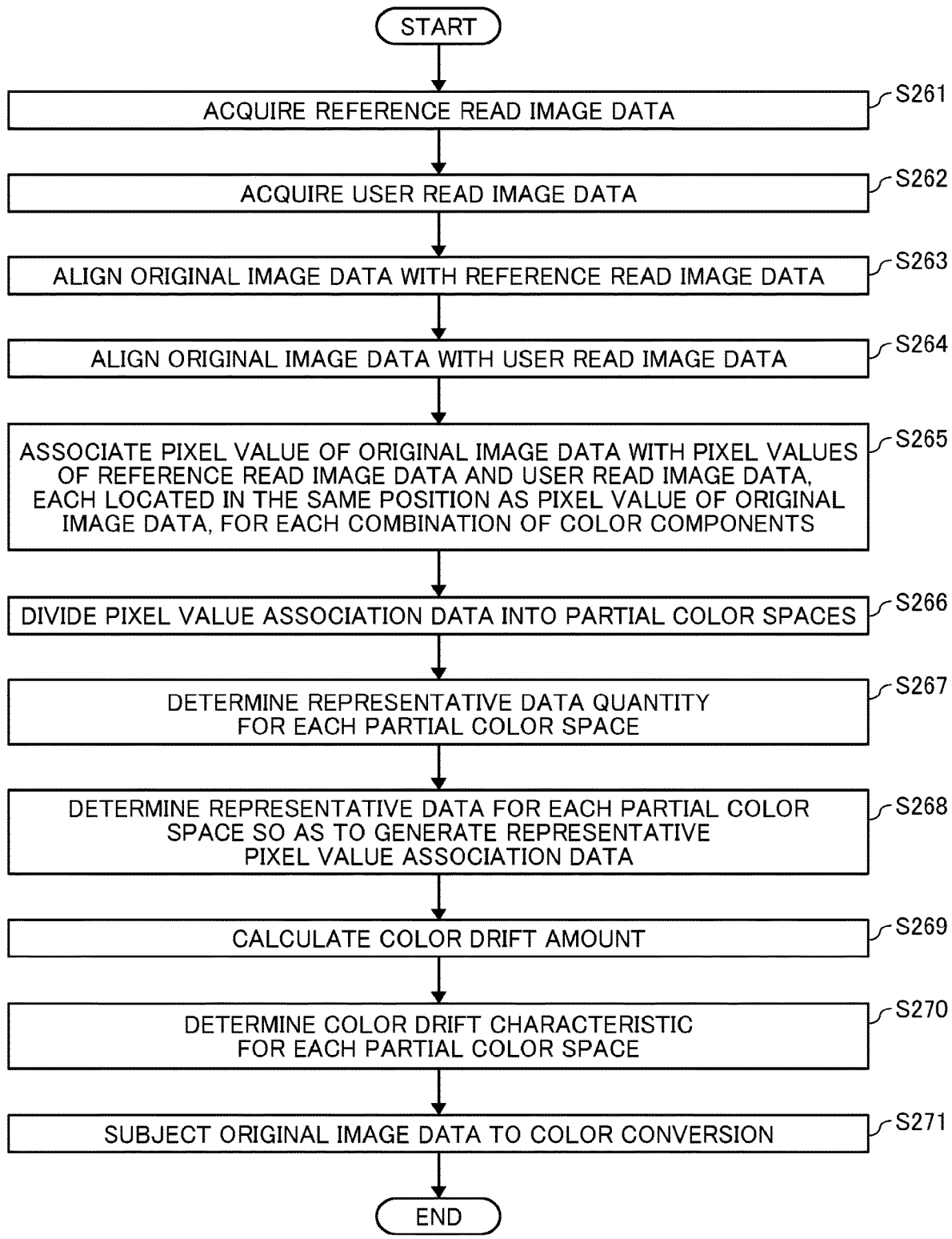
FIG. 26 is a flowchart of an example of color conversion processing according to a sixth embodiment.

FIG. 26 is a flowchart illustrating an example of processing performed by the image processing system 600e.

FIG. 26 differs from FIG. 25 in that a process in step S267 is added and a process in step S268 differs in contents from the corresponding process in step S257. For this reason, a redundant description on processes in steps S261 through S266 and S269 through S271 is omitted and the differences are chiefly described.

In step S267, the representative data determiner 307 determines representative data quantity according to the data quantity included in a partial color space provided by the division in step S266. The method for determining representative data quantity is exemplified by the method, in which the relationship between the data quantity in the partial color space and the representative data quantity is stored in advance in a lookup table (LUT).

Figure 27:
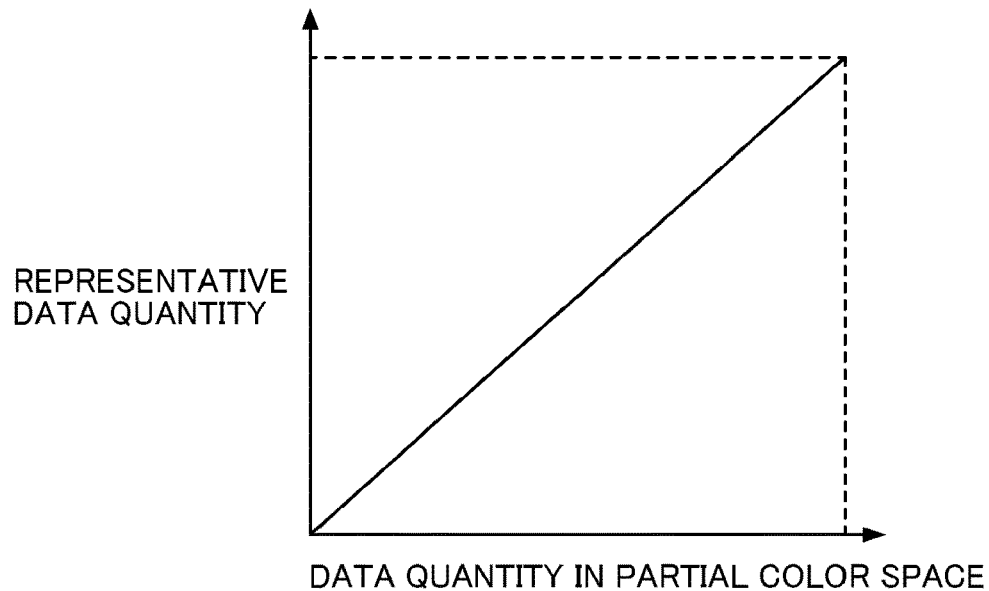
FIG. 27 is a diagram illustrating a case where a R axis, a G axis, and a B axis are each divided into two at equal intervals.
Figure 28:
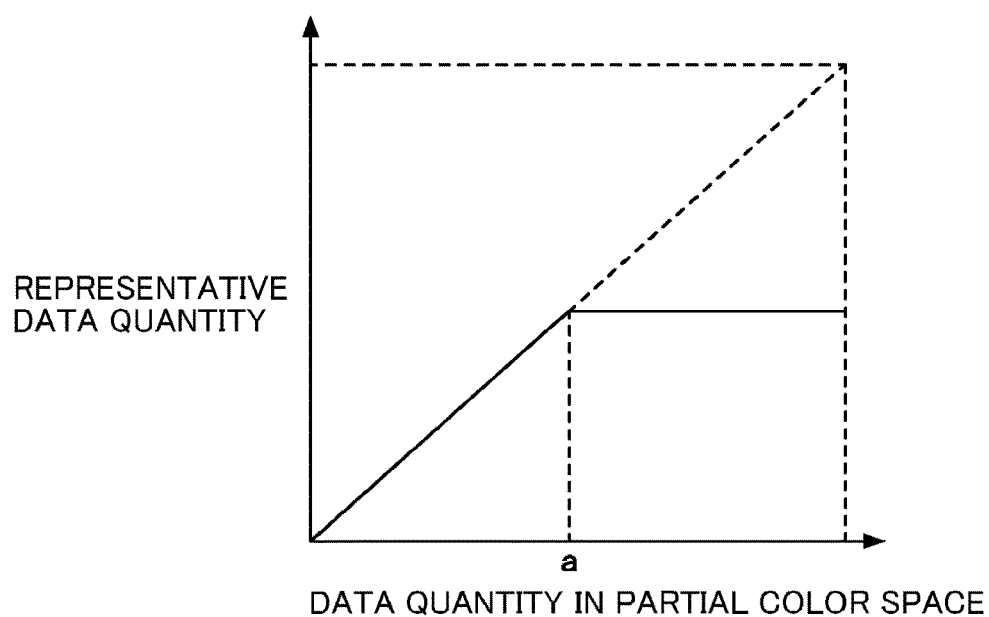
FIG. 28 is a diagram illustrating a case where the R axis, the G axis, and the B axis are each divided into two at unequal intervals.
Figure 29:
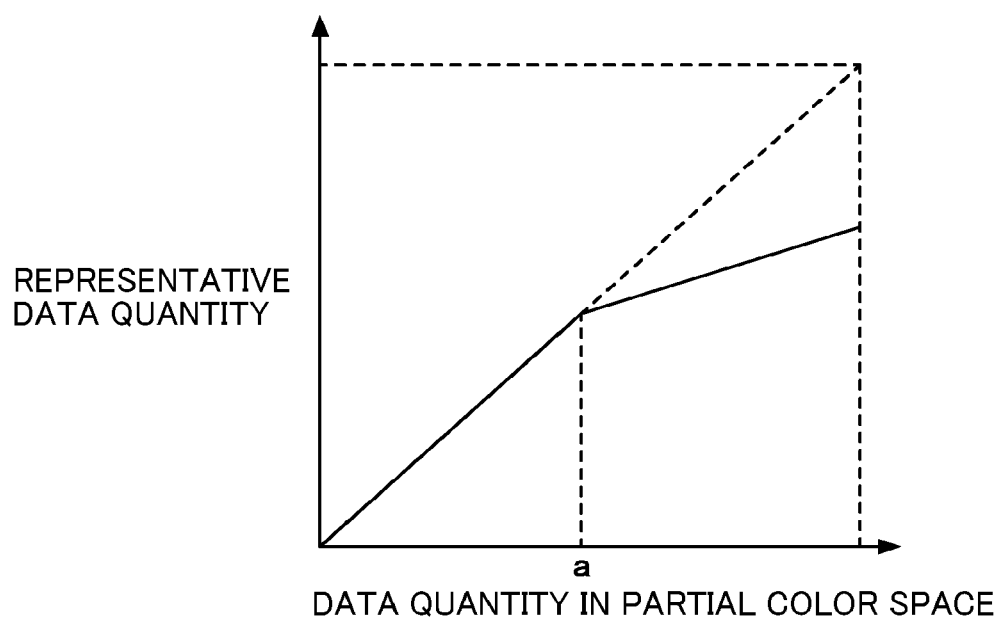
FIG. 29 is a diagram illustrating a case where 256 gradations are divided into two at unequal intervals.

FIGS. 27 through 29 illustrate examples of the LUT. In the example in FIG. 27, the data quantity in the partial color space and the representative data quantity are identical to each other and all the data in the partial color space is used as representative data. In the example in FIG. 28, the data quantity in the partial color space and the representative data quantity are identical to each other until a specified threshold of a of the data quantity in the partial color space. If the data quantity in the partial color space exceeds the threshold of a, the representative data quantity is always determined to be a. In the example in FIG. 29, the data quantity in the partial color space and the representative data quantity are identical to each other until a specified threshold of a of the data quantity in the partial color space. If the data quantity in the partial color space exceeds the threshold of a, the gradient of the increase in representative data quantity is made gentler. The gradient is made to be 0.5 in the example in FIG. 29.

The determination of the representative data quantity by such method makes it possible to reduce the bias of distribution of the pixel value association data taking an essential distribution into consideration. In other words, the data quantity is maintained in a region from zero to the threshold of a where the number of colors is essentially small and reduced in a region over the threshold of a where the number of colors is large, as is the case with the examples illustrated in FIGS. 28 and 29, which leads to the reduction in bias of distribution.

Referring back to FIG. 26, the processing performed by the image processing system 600e is further described.

In step S268, the representative data determiner 307 determines representative data for each partial color space and generates representative pixel value association data. The method for determining the representative data is exemplified by the following methods.

(A) In the case where the representative data quantity indicates one piece of data, the representative data is determined by a process similar to the process in step S257 in FIG. 25.

(B) If the data quantity in the partial color space and the representative data quantity are identical to each other, all the data in the partial color space is assumed as representative data.

(C) If the representative data quantity is less than the data quantity in the partial color space, the partial color space is further divided based on the representative data quantity. Such division may be performed by method (C), in which division is performed so that the number of colors may be uniform, or method (D), in which cluster analysis is used for division, in step S126 in FIG. 12. The method for determining the representative data from color spaces provided by the division based on the representative data quantity is similar to the method achieved by the process in step S257 in FIG. 25.

Thus the image processing system 600e is capable of performing color matching between output images.

In the present embodiment, unlike the fifth embodiment, in which one piece of representative data is determined for each partial color space, representative data quantity is determined according to the data quantity included in the partial color spaces. Consequently, it is possible to reduce the bias of distribution in a color space of the pixel value association data taking an essential distribution into consideration.

Effects other than the above are similar to the effects described in the first embodiment, so that a redundant description is omitted.

Seventh Embodiment

In the present embodiment, unlike the first embodiment, in which the reference read image data and the user read image data are used intact to determine the color drift characteristic, correction is made so that a paper color (hereinafter referred to as "ground color") of the reference read image data may agree with a white point of the original image data and a ground color of the user read image data may agree with the white point of the original image data. Such processing is performed so as to absorb the difference between the ground color of the reference read image data and the ground color of the user read image data and perform color matching with a suppressed color overlap even if the ground colors are different. The color overlap refers to the duplication of colors.

To an image processing system 600f according to the present embodiment, the configurations of either of the image processing system 600 according to the first embodiment and the image processing system 600a according to the second embodiment are applicable.

Figure 30:
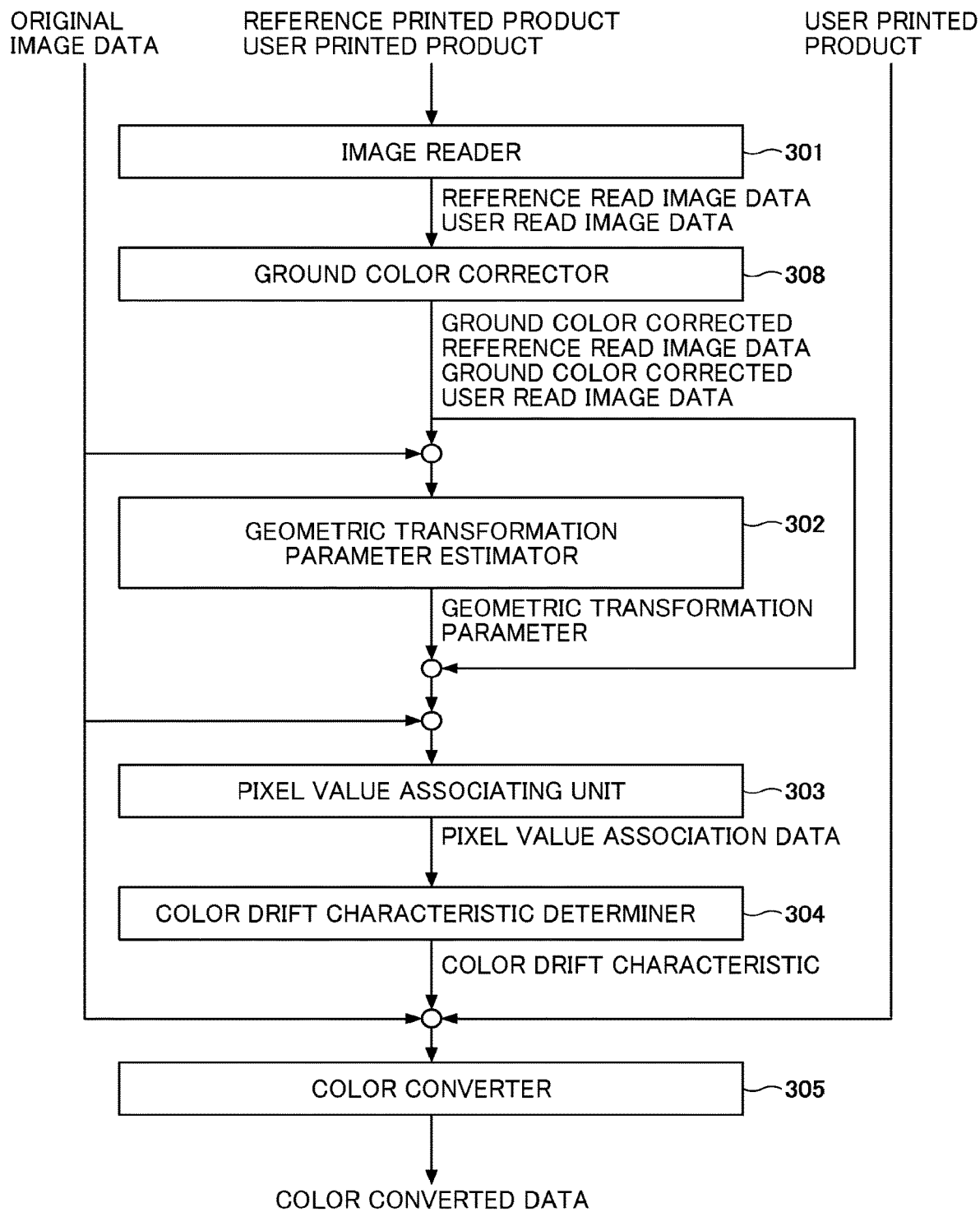
FIG. 30 is a block diagram illustrating an example of a functional configuration of an image processing system according to a seventh embodiment.

FIG. 30 is a block diagram illustrating an example of a functional configuration of the image processing system 600f. As illustrated in FIG. 30, the image processing system 600f includes a ground color corrector 308.

The ground color corrector 308 corrects a pixel value of the reference read image data or a pixel value of the user read image data based on at least one of the ground color of the reference read image data (exemplifying a first ground color) and the ground color of the user read image data (exemplifying a second ground color). Specifically, the ground color corrector 308 uses the ground color of the reference read image data and the ground color of the user read image data, both given in advance, to perform a correction process according to the ground colors.

The geometric transformation parameter estimator 302 estimates a geometric transformation parameter for the original image data and the reference read image data as subjected to ground color correction and a geometric transformation parameter for the original image data and the user read image data as subjected to the ground color correction.

The pixel value associating unit 303 uses the geometric transformation parameters to detect pixels of the reference read image data as subjected to the ground color correction and the user read image data as subjected to the ground color correction, each located in a position corresponding to a pixel of the original image data, and associate pixel values of such pixels for each combination of color components so as to generate pixel value association data.

The color drift characteristic determiner 304 uses the pixel value association data to determine the color drift characteristic between the reference read image data as subjected to the ground color correction and the user read image data as subjected to the ground color correction.

<Example of Processing by Image Processing System 600f>

Figure 31:
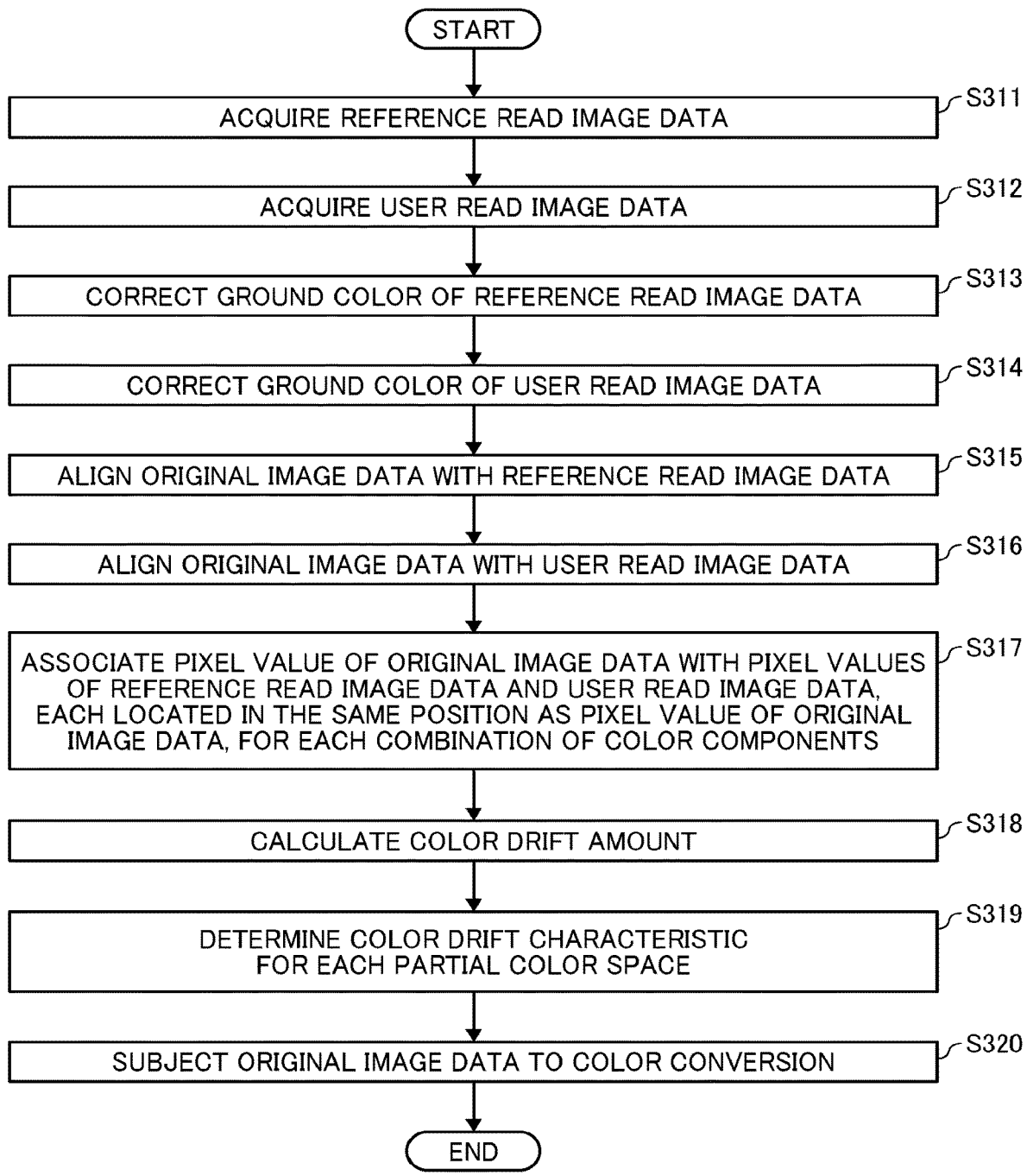
FIG. 31 is a flowchart of an example of processing performed by the image processing system according to the seventh embodiment.

FIG. 31 is a flowchart illustrating an example of processing performed by the image processing system 600f.

FIG. 31 differs from FIG. 5 in that processes in steps S313 and S314 are added. For this reason, a redundant description on processes in steps S311, S312, and S315 through S320 is omitted and the differences are chiefly described.

In step S313, the ground color corrector 308 uses a ground color of the reference read image data that is given in advance to perform a color correction process according to the ground color. In the present embodiment, color correction is performed on the entire reference read image data so that the ground color of the reference read image data may agree with the white point of the original image data.

The ground color of the reference read image data is given as color values in a specified color space, such as an RGB color space, an XYZ color space, and a L*a*b* color space. As the color values, values obtained in advance by measuring the ground color with a colorimeter or values obtained by the scanning with the same scanner as the scanner having read a reference printed product can be used. Under the conditions allowing a color profile of a scanner to be used for the conversion into a device-independent color space, values read by a scanner different from the scanner having read a reference printed product may be used.

The method for performing color correction on the entire reference read image data so that the ground color of the reference read image data may agree with the white point of the original image data is exemplified by the following methods.

(A) Method Shifting the Ground Color of the Reference Read Image Data to the White Point of the Original Image Data.

As an example, it is assumed that the reference read image data is a L*a*b* color space. A process for shifting the ground color of the reference read image data to a point (L*=100.0, a*=0.0, b*=0.0) as a white point in view of the standards in the L*a*b* color space is performed on the entire reference read image data. As a result, the ground color of the reference read image data is allowed to agree with the white point of the original image data. This method is expressed by formulae (13) through (15) below.

$$L_{ref}'^* = L_{ref}^* + (100.0 - L_{refW}^*) \tag{13}$$

$$a_{ref}'^* = a_{ref}^* + (0.0 - a_{refW}^*) \tag{14}$$

$$b_{ref}'^* = b_{ref}^* + (0.0 - b_{refW}^*) \tag{15}$$

In the formulae, Lref*, aref*, and bref* represent the L*, a*, and b* values of the reference read image data before the ground color correction, respectively, LrefW*, arefW*, and brefW* represent the L*, a*, and b* values of the ground color of the reference read image data, respectively, and Lref'*, aref'*, and bref'* represent the L*, a*, and b* values of the reference read image data after the ground color correction, respectively.

(B) Method Using Ratio Change.

As an example, it is assumed that the reference read image data is an RGB color space with 256 gradations. The R, G, and B values of the reference read image data are multiplied by values obtained by dividing the white point (R=255, G=255, B=255) of the original image data by the R, G, and B values of the ground color of the reference read image data, respectively, so as to make the ground color of the reference read image data agree with the white point of the original image data. This method is expressed by formulae (16) through (18) below.

$$R'_{ref} = R_{ref} * \frac{255}{R_{refW}} \tag{16}$$

$$G'_{ref} = G_{ref} * \frac{255}{G_{refW}} \tag{17}$$

$$B'_{ref} = B_{ref} * \frac{255}{B_{refW}} \tag{18}$$

In the formulae, Rref, Gref, and Bref represent the R, G, and B values of the reference read image data before the ground color correction, respectively, RretW, GretW, and BrefW represent the R, G, and B values of the ground color of the reference read image data, respectively, and Rref', Bref', and Bref' represent the R, G, and B values of the reference read image data after the ground color correction, respectively.

Figure 32A:
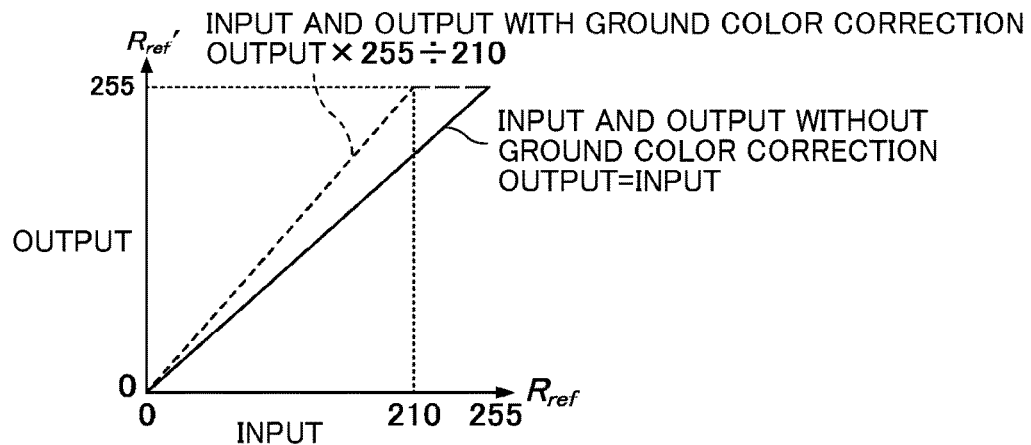
FIGS. 32A, 32B, and 32C (FIG. 32) are a diagram illustrating R, G, and B values before and after ground color correction on reference read image data.
Figure 32B:
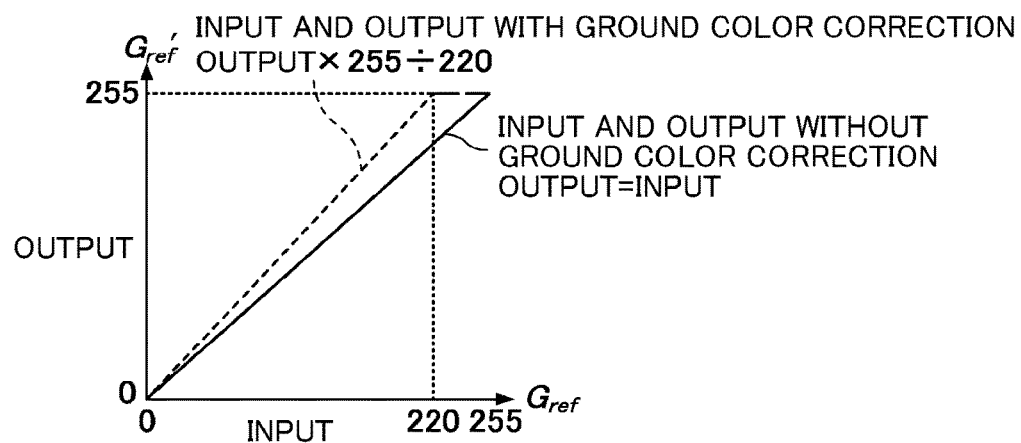
Figure 32C:
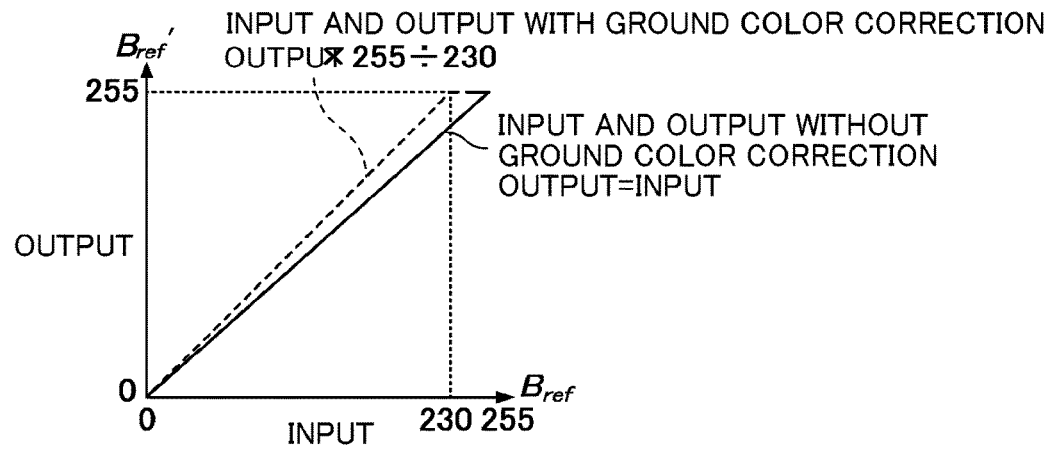

FIGS. 32A to 32C are a diagram illustrating the R, G, and B values of the reference read image data before and after the ground color correction when RrefW, GrefW, and BrefW of the ground color of the reference read image data are 210, 220, and 230, respectively.

As another example, it is assumed that the reference read image data is a device-independent XYZ color space. In that case, for instance, the X, Y, and Z values of the white point (D50 or the like) of the original image data are established in the XYZ color space and divided by the X, Y, and Z values of the ground color of the reference read image data, respectively and the X, Y, and Z values of the reference read image data are multiplied by values obtained by such division. This method is expressed by formulae (19) through (21) below.

$$X'_{ref} = X_{ref} * \frac{X_n}{X_{refW}} \quad (19)$$

$$Y'_{ref} = Y_{ref} * \frac{Y_n}{Y_{refW}} \quad (20)$$

$$Z'_{ref} = Z_{ref} * \frac{Z_n}{Z_{refW}} \quad (21)$$

In the formulae, Xref, Yref, and Zref represent the X, Y, and Z values of the reference read image data before the ground color correction, respectively, Xn, Yn, and Zn represent the X, Y, and Z values of the white point of the original image data, respectively, XrefW, YrefW, and ZrefW represent the X, Y, and Z values of the ground color of the reference read image data, respectively, and Xref', Yref', and Zref' represent the X, Y, and Z values of the reference read image data after the ground color correction, respectively.

(C) Method using a color perception model. A so-called color perception model for making the color appearance uniform under different light sources is used. Using the von Kries transform as an example of the color perception model, description is made on the method for performing color correction so that the ground color of the reference read image data may agree with the white point of the original image data.

The von Kries transform refers to a method for making a change in ratio of W2'/W1' in a human color perception space PQR in order to convert the X, Y, and Z values under a light source W1 into the X, Y, and Z values under a light source W2. Based on the understanding that the human color perception adapts to the ground color rather than to the white point of a light source, the von Kries transform is used to perform color correction so that a color of the reference read image data may agree with the white point of the original image data. If the reference read image data is a device-independent XYZ color space, the relationship expressed by formulae (22) through (26) below is obtained according to the von Kries transform.

$$\begin{bmatrix} X'_{ref} \\ Y'_{ref} \\ Z'_{ref} \end{bmatrix} = [M^{-1}] \begin{bmatrix} P_n/P_{refW} & 0 & 0 \\ 0 & Q_n/Q_{refW} & 0 \\ 0 & 0 & R_n/R_{refW} \end{bmatrix} [M] \begin{bmatrix} X_{ref} \\ Y_{ref} \\ Z_{ref} \end{bmatrix} \quad (22)$$

$$\begin{bmatrix} P_{refW} \\ Q_{refW} \\ R_{refW} \end{bmatrix} = [M] \begin{bmatrix} X_{refW} \\ Y_{refW} \\ Z_{refW} \end{bmatrix} \quad (23)$$

$$\begin{bmatrix} P_n \\ Q_n \\ R_n \end{bmatrix} = [M] \begin{bmatrix} X_n \\ Y_n \\ Z_n \end{bmatrix} \quad (24)$$

$$[M] = \begin{bmatrix} 0.40024 & 0.70760 & -0.08081 \\ -0.22630 & 1.16532 & 0.04570 \\ 0 & 0 & 0.91822 \end{bmatrix} \quad (25)$$

$$[M^{-1}] = \begin{bmatrix} 1.85995 & -1.12939 & 0.21990 \\ 0.36119 & 0.63881 & 0 \\ 0 & 0 & 1.08906 \end{bmatrix} \quad (26)$$

The above description is made on the example, in which the von Kries transform is used, although the color perception model is not limited to the von Kries transform. Bradford transformation, CIECAM97s or CIECAM02 may be made use of.

Referring back to FIG. 31, the processing performed by the image processing system 600f is further described.

In step S314, the ground color corrector 308 uses a ground color of the user read image data that is given in advance to perform a color correction process according to the ground color. The method for performing the color correction process is similar to the method in step S313, so that a redundant description is omitted.

The processes in the steps following step S314 are performed on the reference read image data as subjected to the ground color correction and the user read image data as subjected to the ground color correction.

Thus the image processing system 600f is capable of performing color matching between output images.

In the present embodiment, unlike the first embodiment, in which the reference read image data and the user read image data are used intact to determine the color drift characteristic, correction is made so that a ground color of the reference read image data may agree with a white point of the original image data and a ground color of the user read image data may agree with the white point of the original image data. Consequently, it is possible to absorb the difference between the ground color of the reference read image data and the ground color of the user read image data and perform color matching with a suppressed color overlap even if the ground colors are different.

Effects other than the above are similar to the effects described in the first embodiment, so that a redundant description is omitted.

Eighth Embodiment

In the seventh embodiment, correction is made so that a ground color of the reference read image data may agree with a white point of the original image data and a ground color of the user read image data may agree with the white point of the original image data. In the present embodiment, correction is made so that the ground color of the user read image data may agree with the ground color of the reference read image data.

To an image processing system 600g according to the present embodiment, the configurations of either of the image processing system 600 according to the first embodiment and the image processing system 600a according to the second embodiment are applicable. The functional configuration of the image processing system 600g is similar to the functional configuration of the image processing system 600f except that the ground color corrector 308 does not correct the ground color of the reference read image data, so that a redundant description is omitted.

<Example of Processing by Image Processing System 600g>

Figure 33:
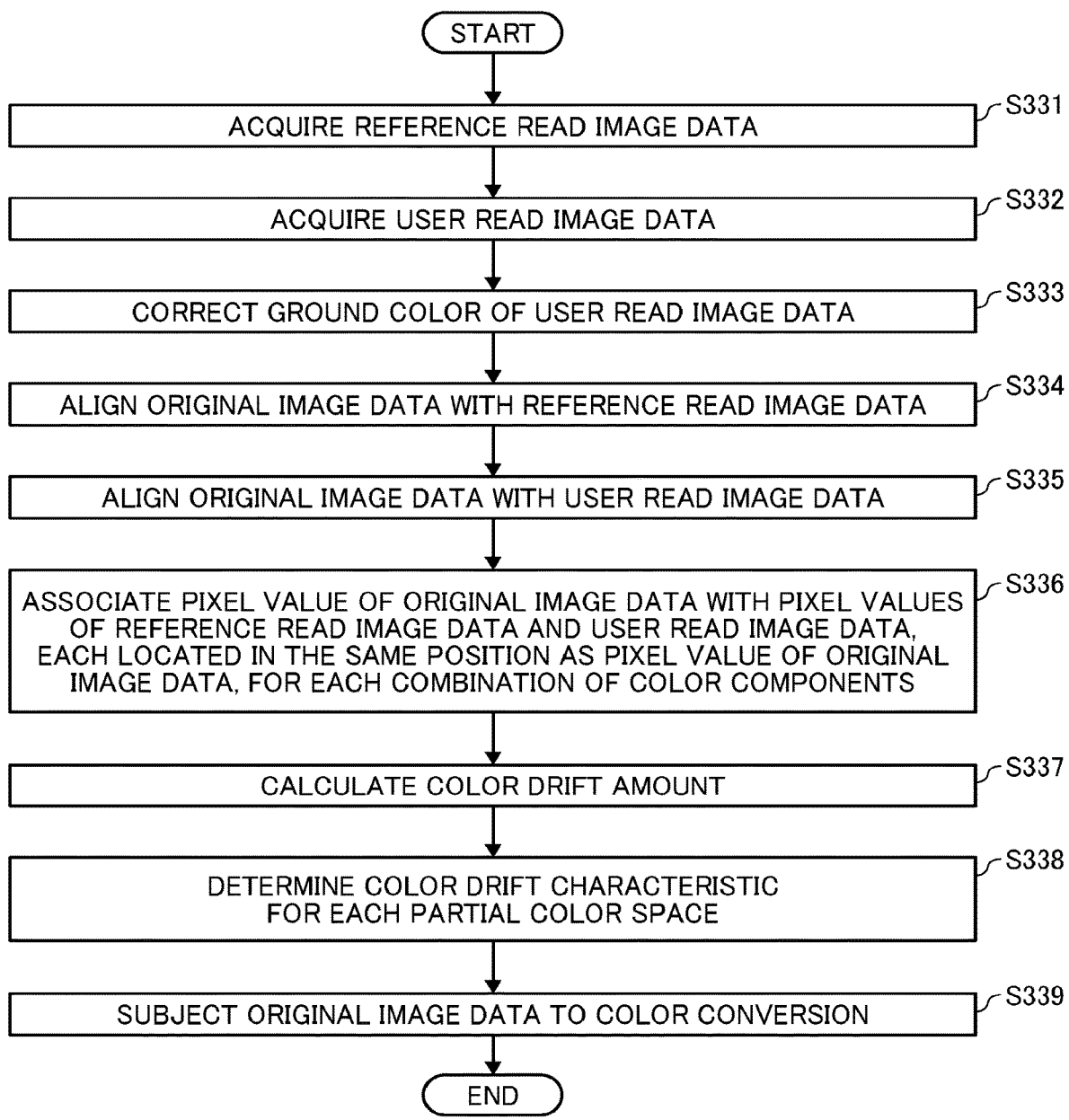
FIG. 33 is a flowchart of an example of processing performed by an image processing system according to an eighth embodiment.

FIG. 33 is a flowchart illustrating an example of processing performed by the image processing system 600g.

FIG. 33 differs from FIG. 31 in that correction is not made on the ground color of the reference read image data. The description below is chiefly made on the differences.

In step S333, the ground color corrector 308 uses ground colors of the reference read image data and the user read image data that are given in advance to perform a color correction process according to the ground colors. In the present embodiment, color correction is performed on the entire user read image data so that the ground color of the user read image data may agree with the ground color of the reference read image data.

The ground colors of the reference read image data and the user read image data are each given as color values in a specified color space, such as an RGB color space, an XYZ color space, and a L*a*b* color space. As the color values, values obtained in advance by measuring each ground color with a colorimeter or values read by the same scanner as the scanner having read a user printed product can be used. Under the conditions allowing a color profile of a scanner to be used for the conversion into a device-independent color space, values read by a scanner different from the scanner having read a user printed product may be used.

The method for performing color correction on the entire user read image data so that the ground color of the user read image data may agree with the ground color of the reference read image data is exemplified by the following methods.

(A) Method Shifting the Ground Color of the User Read Image Data to the Ground Color of the Reference Read Image Data.

As an example, it is assumed that the reference read image data and the user read image data are each a L*a*b* color space. A process for shifting the ground color of the user read image data to the ground color of the reference read image data is performed on the entire user read image data so as to make the ground color of the user read image data agree with the ground color of the reference read image data. This method is expressed by formulae (27) through (29) below.

$$L_{tgt}'^{*} = L_{tgt}^{*} + (L_{refW}^{*} - L_{tgtW}^{*}) \quad (27)$$

$$a_{tgt}'^{*} = a_{tgt}^{*} + (a_{refW}^{*} - a_{tgtW}^{*}) \quad (28)$$

$$b_{tgt}'^{*} = b_{tgt}^{*} + (b_{refW}^{*} - b_{tgtW}^{*}) \quad (27)$$

In the formulae, Ltgt*, atgt*, and btgt* represent the L*, a*, and b* values of the user read image data before the ground color correction, respectively, LretW*, arefW*, and brefW* represent the L*, a*, and b* values of the ground color of the reference read image data, respectively, LtgtW*, atgtW*, and btgtW* represent the L*, a*, and b* values of the ground color of the user read image data, respectively, and Ltgt'*, atgt'*, and btgt'* represent the L*, a*, and b* values of the user read image data after the ground color correction, respectively.

(B) Method Using Ratio Change.

As an example, it is assumed that the reference read image data and the user read image data are each an RGB color space with 256 gradations. The R, G, and B values of the user read image data are multiplied by values obtained by dividing the R, G, and B values of the ground color of the reference read image data by the R, G, and B values of the ground color of the user read image data, respectively, so as to make the ground color of the user read image data agree with the ground color of the reference read image data. This method is expressed by formulae (30) through (32) below.

$$R_{tgt}' = R_{tgt} * \frac{R_{refW}}{R_{tgtW}} \quad (30)$$

$$G_{tgt}' = G_{tgt} * \frac{G_{refW}}{G_{tgtW}} \quad (31)$$

$$B_{tgt}' = B_{tgt} * \frac{B_{refW}}{B_{tgtW}} \quad (32)$$

In the formulae, Rtgt, Gtgt, and Btgt represent the R, G, and B values of the user read image data before the ground color correction, respectively, RrefW, GrefW, and BrefW represent the R, G, and B values of the ground color of the reference read image data, respectively, RtgtW, GtgtW, and BtgtW represent the R, G, and B values of the ground color of the user read image data, respectively, and Rtgt', Gtgt', and Btgt' represent the R, G, and B values of the user read image data after the ground color correction, respectively.

Figure 34A:
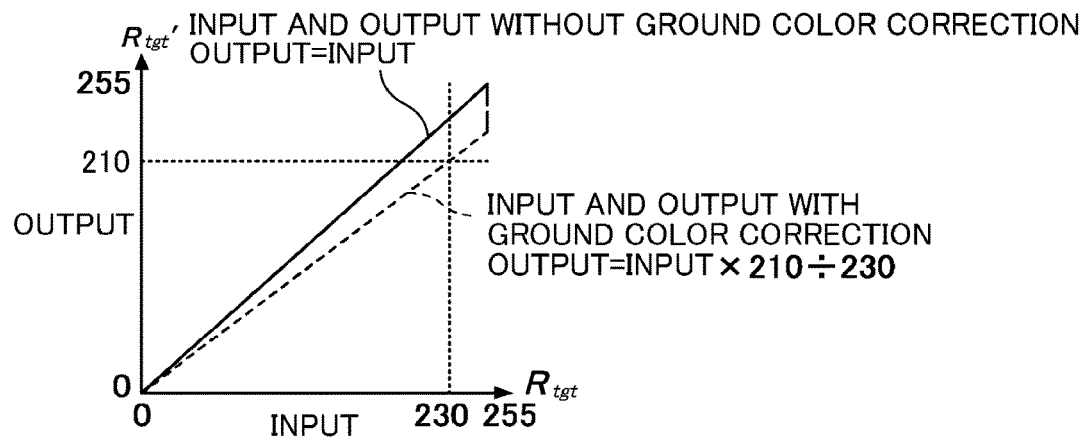
FIGS. 34A, 34B, and 34C (FIG. 34) are a diagram illustrating R, G, and B values before and after ground color correction on user read image data.
Figure 34B:
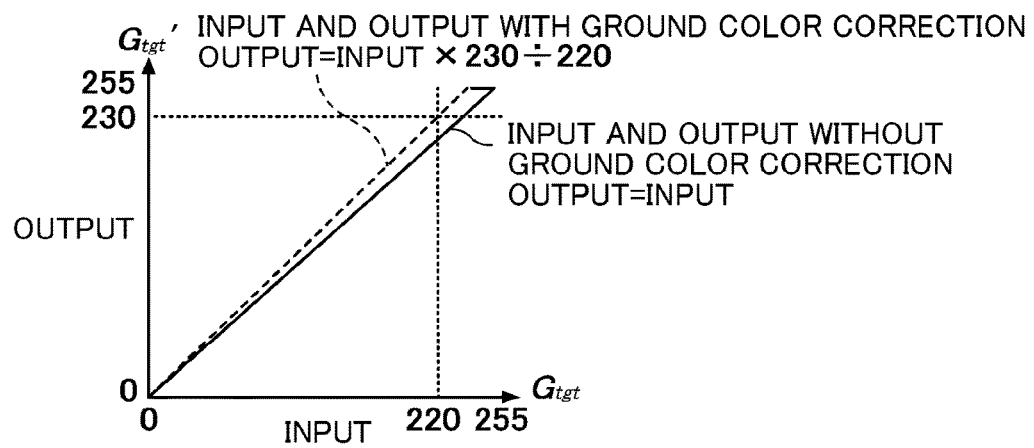
Figure 34C:
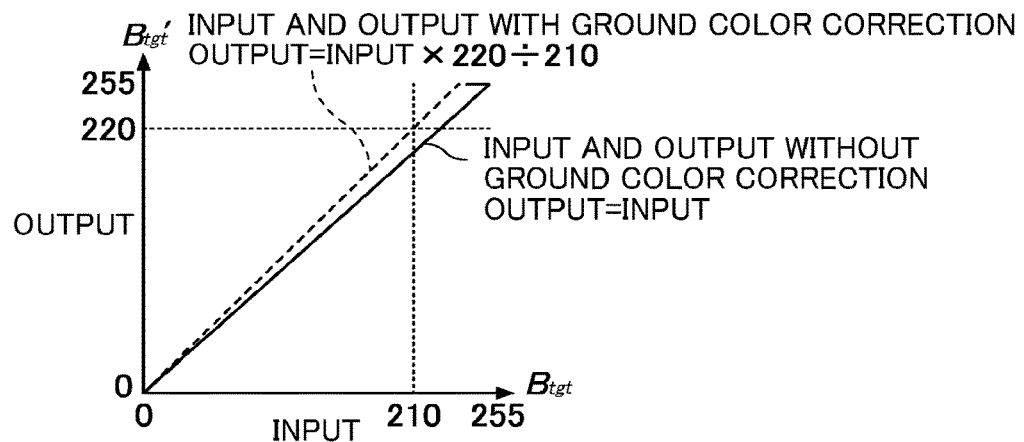

FIGS. 34A to 34C (FIG. 34) illustrate the R, G, and B values of the user read image data before and after the ground color correction when RrefW, GrefW, and BrefW of the ground color of the reference read image data are 210, 230, and 220, respectively and RtgtW, GtgtW, and BtgtW of the ground color of the user read image data are 230, 220, and 210, respectively.

As another example, it is assumed that the reference read image data and the user read image data are each a device-independent XYZ color space. In that case, for instance, the X, Y, and Z values of the user read image data are multiplied by values obtained by dividing the X, Y, and Z values of the ground color of the reference read image data by the X, Y, and Z values of the ground color of the user read image data, respectively in the XYZ color space. This method is expressed by formulae (33) through (35) below.

$$X_{tgt}' = X_{tgt} * \frac{X_{refW}}{X_{tgtW}} \quad (33)$$

$$Y_{tgt}' = Y_{tgt} * \frac{Y_{refW}}{Y_{tgtW}} \quad (34)$$

$$Z_{tgt}' = Z_{tgt} * \frac{Z_{refW}}{Z_{tgtW}} \quad (35)$$

In the formulae, Xtgt, Ytgt, and Ztgt represent the X, Y, and Z values of the user read image data before the ground color correction, respectively, XrefW, YrefW, and ZrefW represent the X, Y, and Z values of the ground color of the reference read image data, respectively, XtgtW, YtgtW, and ZtgtW represent the X, Y, and Z values of the ground color of the user read image data, respectively, and Xtgt', Ytgt', and Ztgt' represent the X, Y, and Z values of the user read image data after the ground color correction, respectively.

(C) Method Using a Color Perception Model.

A so-called color perception model for making the color appearance uniform under different light sources is used. Using the von Kries transform as an example of the color perception model, description is made on the method for performing color correction so that the ground color of the user read image data may agree with the ground color of the reference read image data.

The von Kries transform is used to perform color correction so that the ground color of the user read image data may agree with the ground color of the reference read image data. If the reference read image data and the user read image data are each a device-independent XYZ color space, the relationship expressed by formulae (36) through (40) below is obtained according to the von Kries transform.

$$\begin{bmatrix} X'_{tgt} \\ Y'_{tgt} \\ Z'_{tgt} \end{bmatrix} = [M^{-1}] \begin{bmatrix} P_{refW}/P_{tgtW} & 0 & 0 \\ 0 & Q_{refW}/Q_{tgtW} & 0 \\ 0 & 0 & R_{refW}/R_{tgtW} \end{bmatrix} [M] \begin{bmatrix} X_{tgt} \\ Y_{tgt} \\ Z_{tgt} \end{bmatrix} \quad (36)$$

$$\begin{bmatrix} P_{tgtW} \\ Q_{tgtW} \\ R_{tgtW} \end{bmatrix} = [M] \begin{bmatrix} X_{tgtW} \\ Y_{tgtW} \\ Z_{tgtW} \end{bmatrix} \quad (37)$$

$$\begin{bmatrix} P_{refW} \\ Q_{refW} \\ R_{refW} \end{bmatrix} = [M] \begin{bmatrix} X_{refW} \\ Y_{refW} \\ Z_{refW} \end{bmatrix} \quad (38)$$

$$[M] = \begin{bmatrix} 0.40024 & 0.70760 & -0.08081 \\ -0.22630 & 1.16532 & 0.04570 \\ 0 & 0 & 0.91822 \end{bmatrix} \quad (39)$$

$$[M^{-1}] = \begin{bmatrix} 1.85995 & -1.12939 & 0.21990 \\ 0.36119 & 0.63881 & 0 \\ 0 & 0 & 1.08906 \end{bmatrix} \quad (40)$$

The above description is made on the example, in which the von Kries transform is used, although the color perception model is not limited to the von Kries transform. Bradford transformation, CIECAM97s or CIECAM02 may be made use of.

Referring back to FIG. 33, the processing performed by the image processing system 600g is further described.

The processes in the steps beginning with step S334 are performed on the reference read image data and the user read image data, which has been subjected to the ground color correction.

Thus the image processing system 600g is capable of performing color matching between output images.

In the present embodiment, correction is made so that the ground color of the user read image data may agree with the ground color of the reference read image data. Consequently, it is possible to absorb the difference between the ground color of the reference read image data and the ground color of the user read image data and perform color matching with a suppressed color overlap even if the ground colors are different.

Effects other than the above are similar to the effects described in the first embodiment, so that a redundant description is omitted.

Ninth Embodiment

In the seventh embodiment, correction is made so that a ground color of the reference read image data may agree with a white point of the original image data and a ground color of the user read image data may agree with the white point of the original image data. In the present embodiment, correction is made so that the ground color of the reference read image data may agree with the ground color of the user read image data.

To an image processing system 600h according to the present embodiment, the configurations of either of the image processing system 600 according to the first embodiment and the image processing system 600a according to the second embodiment are applicable. The functional configuration of the image processing system 600h is similar to the functional configuration of the image processing system 600f except that the ground color corrector 308 does not correct the ground color of the user read image data, so that a redundant description is omitted.

<Example of Processing by Image Processing System 600h>

Figure 35:
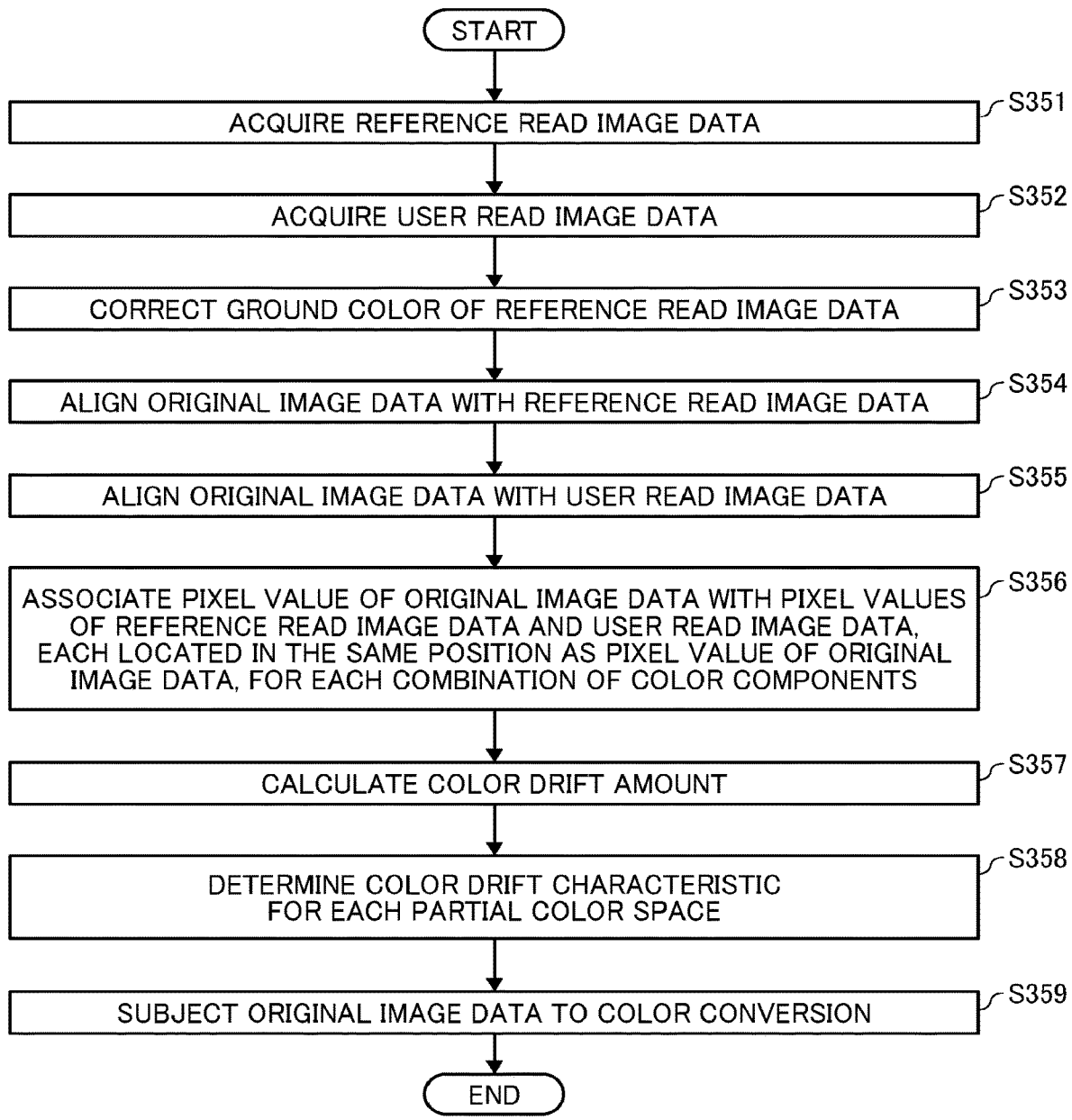
FIG. 35 is a flowchart of an example of processing performed by an image processing system according to a ninth embodiment.

FIG. 35 is a flowchart illustrating an example of processing performed by the image processing system 600h.

FIG. 35 differs from FIG. 31 in that correction is not made on the ground color of the user read image data. The description below is chiefly made on the differences.

In step S353, the ground color corrector 308 uses ground colors of the reference read image data and the user read image data that are given in advance to perform a color correction process according to the ground colors. In the present embodiment, color correction is performed on the entire reference read image data so that the ground color of the reference read image data may agree with the ground color of the user read image data.

The ground colors of the reference read image data and the user read image data are each given as color values in a specified color space, such as an RGB color space, an XYZ color space, and a L*a*b* color space. As the color values, values obtained in advance by measuring each ground color with a colorimeter or values read by the same scanner as the scanner having read a reference printed product can be used. Under the conditions allowing a color profile of a scanner to be used for the conversion into a device-independent color space, values read by a scanner different from the scanner having read a reference printed product may be used. The method for performing color correction so that the ground color of the reference read image data may agree with the ground color of the user read image data is exemplified by the following methods.

(A) Method Shifting the Ground Color of the Reference Read Image Data to the Ground Color of the User Read Image Data.

As an example, it is assumed that the reference read image data and the user read image data are each a L*a*b* color space. A process for shifting the ground color of the reference read image data to the ground color of the user read image data is performed on the entire reference read image data so as to make the ground color of the reference read image data agree with the ground color of the user read image data. This method is expressed by formulae (41) through (43) below.

$$L_{ref}'^* = L_{ref}^* + (L_{tgtW}^* - L_{refW}^*) \quad (41)$$

$$a_{ref}'^* = a_{ref}^* + (a_{tgtW}^* - a_{refW}^*) \quad (42)$$

$$b_{ref}'^* = b_{ref}^* + (b_{tgtW}^* - b_{refW}^*) \quad (43)$$

In the formulae, $L_{ref}^*$, $a_{ref}^*$, and $b_{ref}^*$ represent the L*, a*, and b* values of the reference read image data before the ground color correction, respectively, $L_{tgtW}^*$, $a_{tgtW}^*$, and $b_{tgtW}^*$ represent the L*, a*, and b* values of the ground color of the user read image data, respectively, $L_{refW}^*$, $a_{refW}^*$, and $b_{refW}^*$ represent the L*, a*, and b* values of the ground color of the reference read image data, respectively, and $L_{ref}'^*$, $a_{ref}'^*$, and $b_{ref}'^*$ represent the L*, a*, and b* values of the reference read image data after the ground color correction, respectively.

(B) Method Using Ratio Change.

As an example, it is assumed that the reference read image data and the user read image data are each an RGB color space with 256 gradations. The R, G, and B values of the reference read image data are multiplied by values obtained by dividing the R, G, and B values of the ground color of the user read image data by the R, G, and B values of the ground color of the reference read image data, respectively, so as to make the ground color of the reference read image data agree with the ground color of the user read image data. This method is expressed by formulae (44) through (46) below.

$$R'_{ref} = R_{ref} * \frac{R_{tgtW}}{R_{refW}} \quad (44)$$

$$G'_{ref} = G_{ref} * \frac{G_{tgtW}}{B_{refW}} \quad (45)$$

$$B'_{ref} = B_{ref} * \frac{B_{tgtW}}{B_{refW}} \quad (46)$$

In the formulae, Rref, Gref, and Bref represent the R, G, and B values of the reference read image data before the ground color correction, respectively, RrefW, GrefW, and BrefW represent the R, G, and B values of the ground color of the reference read image data, respectively, RtgtW, GtgtW, and BtgtW represent the R, G, and B values of the ground color of the user read image data, respectively, and Rref', Gref', and Bref' represent the R, G, and B values of the reference read image data after the ground color correction, respectively.

Figure 36A:
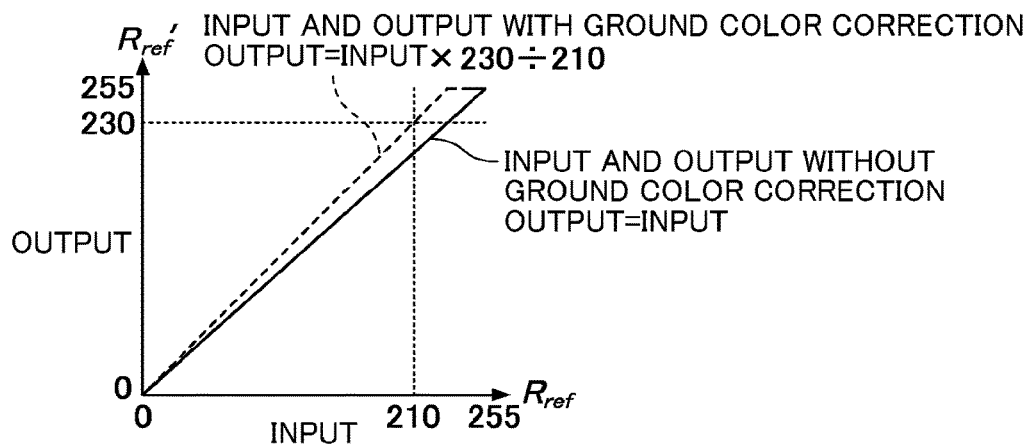
FIGS. 36A, 36B, and 36C (FIG. 36) are a diagram illustrating R, G, and B values before and after the ground color correction on the user read image data.
Figure 36B:
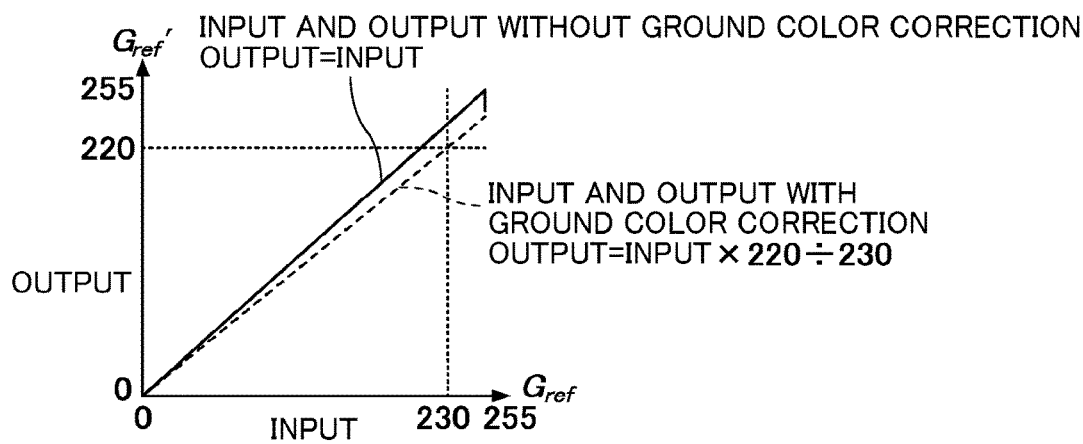
Figure 36C:
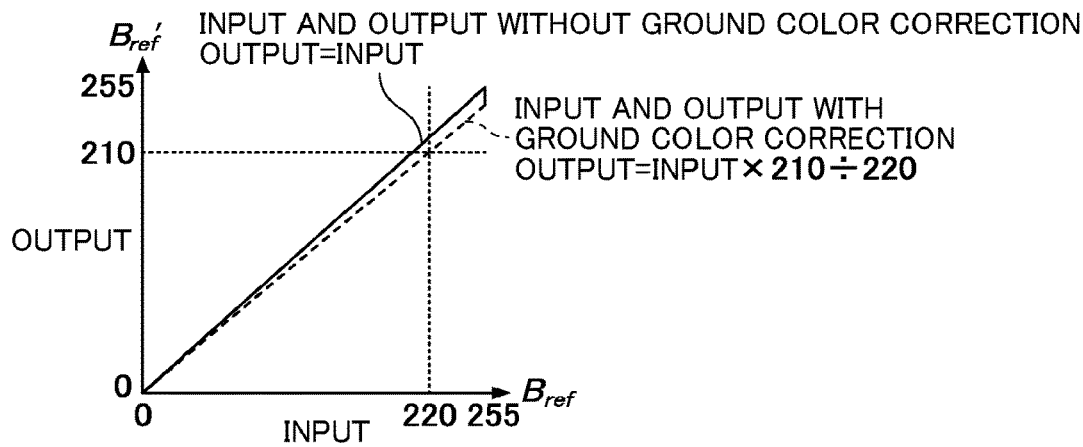

FIGS. 36A to 36C illustrate the R, G, and B values of the reference read image data before and after the ground color correction when RrefW, GrefW, and BrefW of the ground color of the reference read image data are 210, 230, and 220, respectively and RtgtW, GtgtW, and BtgtW of the ground color of the user read image data are 230, 220, and 210, respectively. As another example, it is assumed that the reference read image data and the user read image data are each a device-independent XYZ color space. In that case, for instance, the X, Y, and Z values of the reference read image data are multiplied by values obtained by dividing the X, Y, and Z values of the ground color of the user read image data by the X, Y, and Z values of the ground color of the reference read image data, respectively in the XYZ color space. This method is expressed by formulae (47) through (49) below.

$$X'_{ref} = X_{ref} * \frac{X_{tgtW}}{X_{refW}} \quad (47)$$

$$Y'_{ref} = Y_{ref} * \frac{Y_{tgtW}}{Y_{refW}} \quad (48)$$

$$Z'_{ref} = Z_{ref} * \frac{Z_{tgtW}}{Z_{refW}} \quad (49)$$

In the formulae, Xref, Yref, and Zref represent the X, Y, and Z values of the reference read image data before the ground color correction, respectively, XrefW, YrefW, and ZrefW represent the X, Y, and Z values of the ground color of the reference read image data, respectively, XtgtW, YtgtW, and ZtgtW represent the X, Y, and Z values of the ground color of the user read image data, respectively, and Xref', Yref', and Zref' represent the X, Y, and Z values of the reference read image data after the ground color correction, respectively.

(C) Method Using a Color Perception Model.

A so-called color perception model for making the color appearance uniform under different light sources is used. Using the von Kries transform as an example of the color perception model, description is made on the method for performing color correction so that the ground color of the reference read image data may agree with the ground color of the user read image data.

The von Kries transform is used to perform color correction so that the ground color of the reference read image data may agree with the ground color of the user read image data. If the reference read image data and the user read image data are each a device-independent XYZ color space, the relationship expressed by formulae (50) through (54) below is obtained according to the von Kries transform.

$$\begin{bmatrix} X'_{ref} \\ Y'_{ref} \\ Z'_{ref} \end{bmatrix} = [M^{-1}] \begin{bmatrix} P_{tgtW}/P_{refW} & 0 & 0 \\ 0 & Q_{tgtW}/Q_{refW} & 0 \\ 0 & 0 & R_{tgtW}/R_{refW} \end{bmatrix} [M] \begin{bmatrix} X_{ref} \\ Y_{ref} \\ Z_{ref} \end{bmatrix} \quad (50)$$

$$\begin{bmatrix} P_{refW} \\ Q_{refW} \\ R_{refW} \end{bmatrix} = [M] \begin{bmatrix} X_{refW} \\ Y_{refW} \\ Z_{refW} \end{bmatrix} \quad (51)$$

$$\begin{bmatrix} P_{tgtW} \\ Q_{tgtW} \\ R_{tgtW} \end{bmatrix} = [M] \begin{bmatrix} X_{tgtW} \\ Y_{tgtW} \\ Z_{tgtW} \end{bmatrix} \quad (52)$$

$$[M] = \begin{bmatrix} 0.40024 & 0.70760 & -0.08081 \\ -0.22630 & 1.16532 & 0.04570 \\ 0 & 0 & 0.91822 \end{bmatrix} \quad (53)$$

$$[M^{-1}] = \begin{bmatrix} 1.85995 & -1.12939 & 0.21990 \\ 0.36119 & 0.63881 & 0 \\ 0 & 0 & 1.08906 \end{bmatrix} \quad (54)$$

The above description is made on the example, in which the von Kries transform is used, although the color perception model is not limited to the von Kries transform. Bradford transformation, CIECAM97s or CIECAM02 may be made use of.

Referring back to FIG. 35, the processing performed by the image processing system 600h is further described.

The processes in the steps beginning with step S354 are performed on the reference read image data, which has been subjected to the ground color correction, and the user read image data.

Thus the image processing system 600h is capable of performing color matching between output images.

In the present embodiment, correction is made so that the ground color of the reference read image data may agree with the ground color of the user read image data. Consequently, it is possible to absorb the difference between the ground color of the reference read image data and the ground color of the user read image data and perform color matching with a suppressed color overlap even if the ground colors are different.

Effects other than the above are similar to the effects described in the first embodiment, so that a redundant description is omitted.

Tenth Embodiment

In the present embodiment, ground colors of the reference read image data and the user read image data are detected on condition that the ground colors are unknown. Based on the detected ground colors, correction is made so that the ground color of the reference read image data may agree with a white point of the original image data and so that the ground color of the user read image data may agree with the white point of the original image data. To an image processing system 600i according to the present embodiment, the configurations of either of the image processing system 600 according to the first embodiment and the image processing system 600a according to the second embodiment are applicable.

Figure 37:
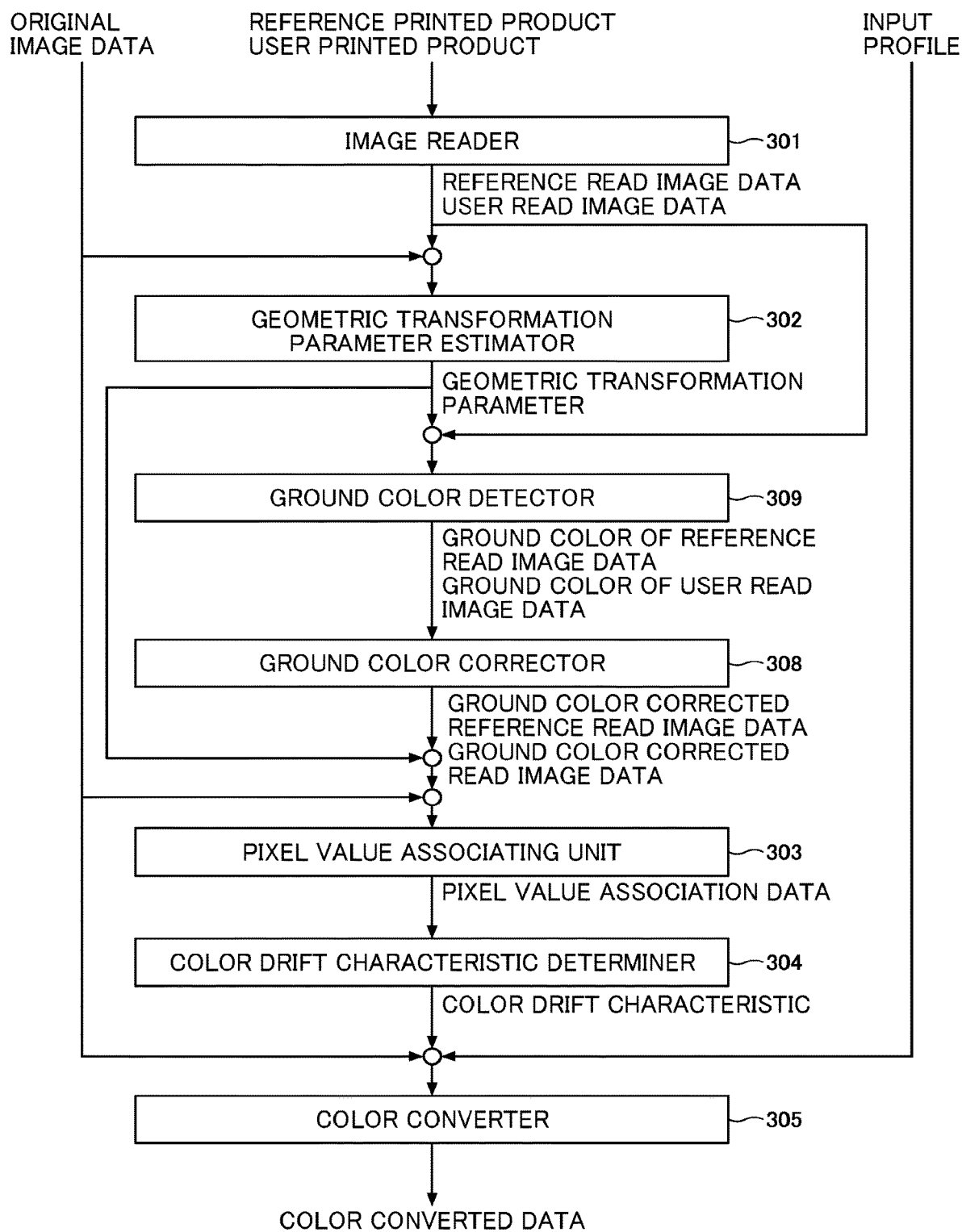
FIG. 37 is a block diagram illustrating an example of a functional configuration of an image processing system according to a tenth embodiment.

FIG. 37 is a block diagram illustrating an example of a functional configuration of the image processing system 600i. As illustrated in FIG. 37, the image processing system 600i includes a ground color detector 309.

The ground color detector 309 detects the ground color of the reference read image data based on a geometric transformation parameter for the original image data and the reference read image data, and detects the ground color of the user read image data based on a geometric transformation parameter for the original image data and the user read image data. The ground color corrector 308 uses the ground color of the reference read image data and the ground color of the user read image data, both detected by the ground color detector 309, to perform a correction process according to the ground colors.

<Example of Processing by Image Processing System 600i>

Figure 38:
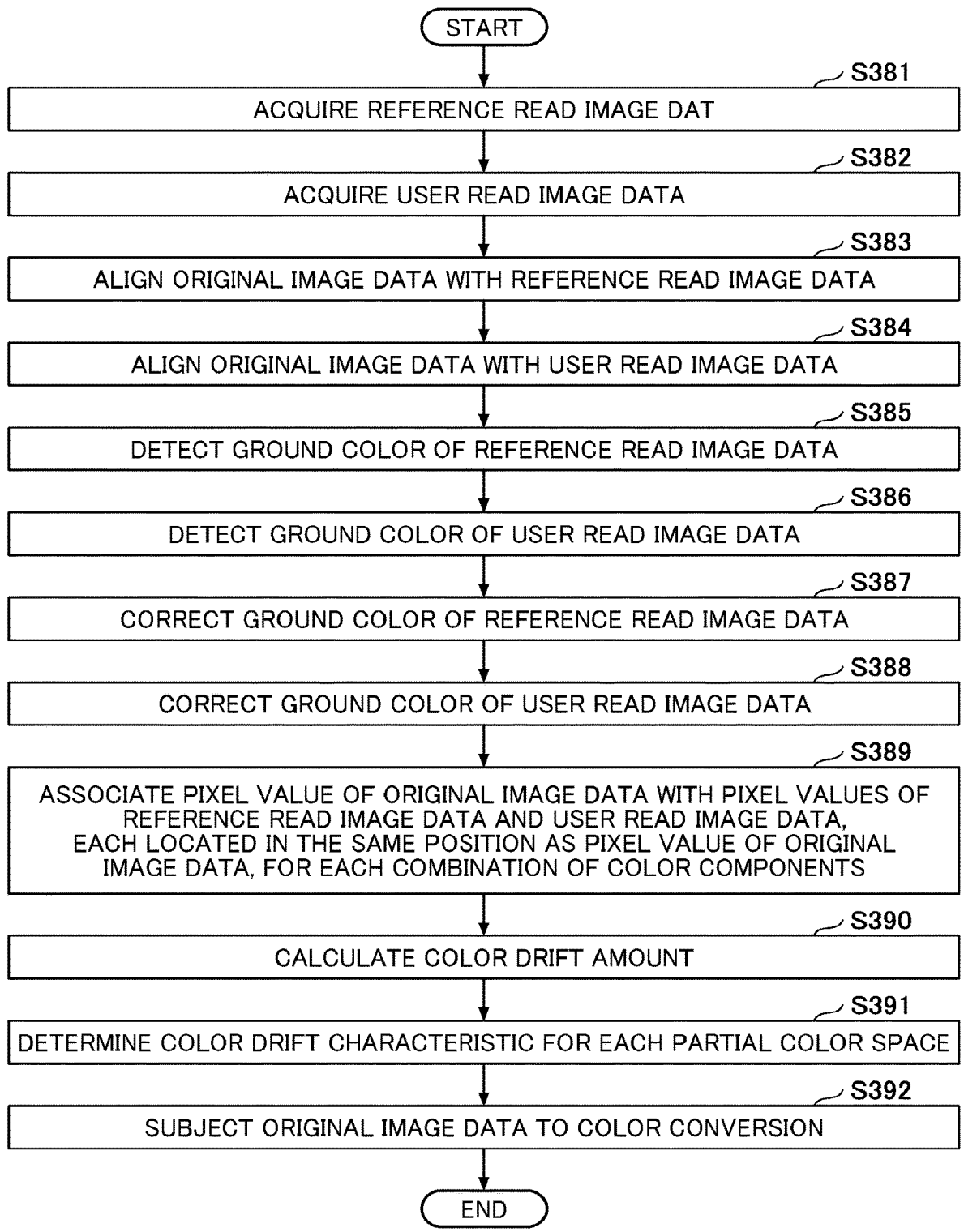
FIG. 38 is a flowchart of an example of processing performed by the image processing system according to the tenth embodiment.

FIG. 38 is a flowchart illustrating an example of processing performed by the image processing system 600i.

FIG. 38 differs from FIG. 31 in that processes in steps S385 and S386 are added. The description below is chiefly made on the differences.

In step S385, the ground color detector 309 detects the ground color of the reference read image data based on the geometric transformation parameter for the original image data and the reference read image data. The method for detecting the ground color of the reference read image data is exemplified by methods (A) and (B) below.

(A) Method Using Color Values of a Margin.

Color values of a marginal region around an original image in a reference printed product are detected as a ground color. In the present embodiment, a region several pixels outside the region of the original image in the reference read image data is determined to be the marginal region so as to specify and detect the ground color. The value to be used for the ground color is exemplified by:

the mean of color values of the marginal region;
the median of color values of the marginal region; and
the mode of color values of the marginal region.

When a reference printed product is read so as to acquire reference read image data, something other than the reference printed product may also be read, so that it is not appropriate to determine the whole except for the region of the original image in the reference read image data to be the marginal region. For instance, a scanner having a reading range larger than a printed product may read a so-called platen back (namely, a cover surface of a backing member of an original table) along with the printed product. The region of the read platen back applies to the region of something other than the reference printed product.

(B) Method Using Color Values in a Region of an Original Image in the Reference Read Image Data.

If no marginal region is present around an original image in a reference printed product during the frameless printing, for instance, color values in the region of the original image in the reference read image data are used to detect the ground color. The value to be used for the ground color is exemplified by the brightest color value in the region of the original image.

In step S386, the ground color detector 309 detects the ground color of the user read image data based on the geometric transformation parameter for the original image data and the user read image data. The method for detecting the ground color of the user read image data is similar to the method for detecting the ground color of the reference read image data, so that a redundant description is omitted.

Thus the image processing system 600i is capable of performing color matching between output images.

In the present embodiment, ground colors of the reference read image data and the user read image data are detected on condition that the ground colors are unknown. Based on the detected ground colors, correction is made so that the ground color of the reference read image data may agree with a white point of the original image data and so that the ground color of the user read image data may agree with the white point of the original image data. Consequently, it is possible to absorb the difference between the ground color of the reference read image data and the ground color of the user read image data and perform color matching with a suppressed color overlap even under the condition that the ground colors of the reference read image data and the user read image data are unknown.

In an exemplary ground color correction method mentioned in the present embodiment, correction is made so that the ground color of the reference read image data may agree with the white point of the original image data and the ground color of the user read image data may agree with the white point of the original image data, although the ground color correction method is not limited to such example. It is also possible to make correction so that the ground color of the user read image data may agree with the ground color of the reference read image data (refer to the eighth embodiment) and to make correction so that the ground color of the reference read image data may agree with the ground color of the user read image data (refer to the ninth embodiment).

Effects other than the above are similar to the effects described in the first embodiment, so that a redundant description is omitted.

The preferred embodiments and others have been detailed in the above. The present invention is not limited to the embodiments as described above, and various modifications and replacements can be given to the above embodiments without departing from the scope of the present invention as recited in the claims.

The printers used in the above embodiments may each be a printer using an electrophotographic method for printing or a printer using other printing method such as an inkjet method.

All the numbers used in the embodiments, including ordinal numbers and numbers representing the quantity, are exemplary numbers for specifically describing the technology of the present invention, to which exemplary numbers the present invention is not limited. The embodiments as described above each include an image processing method. In addition, the connecting relationship between components is an exemplary relationship for specifically describing the technology of the present invention, to which exemplary relationship the connecting relationship, which realizes the functions of the present invention, is not limited.

In the function block diagrams, division of blocks is merely an example. A plurality of blocks may be integrated into one block, one block may be divided into two or more, and/or part of the function of a block may be transferred to another block. Similar functions of a plurality of blocks may be implemented by a single element of hardware or software in a parallel or time-shared manner.

The embodiments as described above each include an image processing method. The image processing method is, for instance, an image processing method followed by an image processing apparatus that reproduces a color of a first output result as a result of output of original image data by a first image outputting apparatus in a second output result as a result of output of the original image data by a second image outputting apparatus. The image processing method includes: estimating a first geometric transformation parameter for aligning first output image data acquired by reading of the first output result by a reading apparatus with the original image data and estimating a second geometric transformation parameter for aligning second output image data acquired by reading of the second output result by the reading apparatus with the original image data; associating, based on the first geometric transformation parameter and the second geometric transformation parameter, combinations of color components of the first output image data and the second output image data, which combinations correspond to a pixel of the original image data, so as to generate pixel value association data; determining, based on the pixel value association data, a mapping for estimating color drift between the first output image data and the second output image data from the original image data; and subjecting the original image data to color conversion based on the mapping. Such image processing method makes it possible to achieve effects similar to the effects of the image processing systems as described above.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An image processing apparatus for reproducing a color of a first output result of original image data by circuitry of a first image outputting apparatus, in a second output result of the original image data by circuitry of a second image outputting apparatus, the image processing apparatus comprising circuitry configured to:
   estimate a first geometric transformation parameter for aligning first output image data with the original image data and a second geometric transformation parameter for aligning second output image data with the original image data, the first output image data being acquired by reading the first output result with a reading apparatus, the second output image data being acquired by reading the second output result with the reading apparatus;
   associate, based on the first geometric transformation parameter and the second geometric transformation parameter, combinations of color components of the first output image data and the second output image data, which combinations correspond to pixels of the original image data, to generate pixel value association data;
   determine, based on a fourth degree polynomial approximation using the pixel value association data, a single mapping for estimating color drift between the first output image data and the second output image data from the original image data; and
   subject the original image data to color conversion based on the single mapping.

2. The image processing apparatus according to claim 1, wherein the circuitry of the image processing apparatus uses multidimensional data originated from a plurality of color component values of the original image data to determine the single mapping.

3. The image processing apparatus according to claim 1, wherein the circuitry of the image processing apparatus is further configured to convert image data into a device-independent color space, and determine the single mapping using the first output image data and the second output image data, each of which has been converted into the device-independent color space.

4. The image processing apparatus according to claim 1, wherein the circuitry of the image processing apparatus excludes a contour portion of contents comprising pixels in one of the original image data, the first output image data, or the second output image data from the pixel value association data.

5. The image processing apparatus according to claim 1, wherein the circuitry of the image processing apparatus performs data cleansing on the pixel value association data.

6. The image processing apparatus according to claim 1, wherein the circuitry of the image processing apparatus adds dummy data throughout a color space of the original image data, wherein said dummy data comprises data with a color drift amount of 0.

7. The image processing apparatus according to claim 1, wherein the circuitry of the image processing apparatus is further configured to divide a color space of the pixel value association data into a plurality of partial color spaces, and determine the single mapping for each of the plurality of partial color spaces based on the pixel value association data.

8. The image processing apparatus according to claim 7, wherein the circuitry of the image processing apparatus divides the color space of the pixel value association data at specified intervals.

9. The image processing apparatus according to claim 7, wherein the circuitry of the image processing apparatus performs color space division based on appearance frequency distribution of a pixel value or cumulative appearance frequency of a pixel value in the color space of the pixel value association data.

10. The image processing apparatus according to claim 7, wherein the circuitry of the image processing apparatus divides the color space of the pixel value association data by cluster analysis.

11. The image processing apparatus according to claim 7, wherein the circuitry of the image processing apparatus converts the color space of the pixel value association data into a color space allowing expression of hue, brightness, and saturation, and uses at least one of the hue, the brightness, and the saturation to divide each color space after conversion.

12. The image processing apparatus according to claim 11, wherein the circuitry of the image processing apparatus divides a color space after the conversion by cluster analysis using at least one of the hue, the brightness, and the saturation.

13. The image processing apparatus according to claim 7, wherein the circuitry of the image processing apparatus is further configured to determine representative pixel value association data for each of the plurality of partial color spaces of the pixel value association data divided, and determine the single mapping based on the representative pixel value association data.

14. The image processing apparatus according to claim 13, wherein the circuitry of the image processing apparatus determines data quantity of the representative pixel value association data according to data quantity included in the plurality of partial color spaces resulting from color space division.

15. The image processing apparatus according to claim 1, wherein the circuitry of the image processing apparatus is further configured to correct the first output image data or the second output image data based on at least one of a first ground color representing a ground color of the first output result and a second ground color representing a ground color of the second output result, and associate, based on the first geometric transformation parameter and the second geometric transformation parameter, combinations of color components of the first output image data that is corrected and the second output image data that is corrected, which combinations correspond to pixels of the original image data, to generate the pixel value association data.

16. The image processing apparatus according to claim 15, wherein the circuitry of the image processing apparatus is further configured to detect the first ground color based on the first geometric transformation parameter and detect the second ground color based on the second geometric transformation parameter, and correct the first output image data or the second output image data based on at least one of the first ground color and the second ground color.

17. The image processing apparatus according to claim 15, wherein the circuitry of the image processing apparatus corrects the first output image data to make the first ground color agree with a white point of the original image data, and corrects the second output image data to make the second ground color agree with the white point of the original image data.

18. The image processing apparatus according to claim 15, wherein the circuitry of the image processing apparatus corrects the first output image data or the second output image data to make the first ground color and the second ground color agree with each other.

19. An image processing system comprising:
a first image outputting apparatus including circuitry configured to output a first output result from original image data;
a second image outputting apparatus including circuitry configured to output a second output result from the original image data;
a reading apparatus including circuitry configured to read the first output result and the second output result; and
the image processing apparatus according to claim 1, configured to determine the single mapping to cause a color of the second output result to approximate to a color of the first output result.

20. An image processing method performed by an image processing apparatus that reproduces a color of a first output result of original image data by a first image outputting apparatus in a second output result of the original image data by a second image outputting apparatus, the image processing method comprising:
estimating a first geometric transformation parameter for aligning first output image data with the original image data, the first output image data being acquired by reading the first output result with circuitry of a reading apparatus;
estimating a second geometric transformation parameter for aligning second output image data with the original image data, the second output image data being acquired by reading the second output result with the circuitry of the reading apparatus;
associating, based on the first geometric transformation parameter and the second geometric transformation parameter, combinations of color components of the first output image data and the second output image data, which combinations correspond to pixels of the original image data, so as to generate pixel value association data;
determining, based on a fourth degree polynomial approximation using the pixel value association data, a single mapping for estimating color drift between the first output image data and the second output image data from the original image data; and
subjecting the original image data to color conversion based on the single mapping.

* * * * *